United States Patent
Kawanishi et al.

(10) Patent No.: US 7,504,139 B2
(45) Date of Patent: Mar. 17, 2009

(54) OPTICAL CELLULOSE ACYLATE FILM, POLARIZING PLATE AND LIQUID CRYSTAL DISPLAY

(75) Inventors: Hiroyuki Kawanishi, Kanagawa (JP); Sumio Ohtani, Kanagawa (JP); Yosuke Nishiura, Kanagawa (JP); Tadashi Ito, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 425 days.

(21) Appl. No.: 11/019,473

(22) Filed: Dec. 23, 2004

(65) Prior Publication Data
US 2005/0142304 A1    Jun. 30, 2005

(30) Foreign Application Priority Data

Dec. 26, 2003  (JP) ............................. 2003-434145
Jun. 14, 2004  (JP) ............................. 2004-175118
Sep. 16, 2004  (JP) ............................. 2004-269819

(51) Int. Cl.
*C08B 3/18* (2006.01)
*G02F 1/13363* (2006.01)

(52) U.S. Cl. ............... 428/1.54; 428/1.33; 106/168.01; 349/96; 349/117

(58) Field of Classification Search ............ 428/1.1, 428/1.3, 1.31, 1.33, 154; 349/193, 96, 117; 524/40; 106/168.01; 264/187, 197, 200
See application file for complete search history.

(56) References Cited

U.S. PATENT DOCUMENTS

| | | | | |
|---|---|---|---|---|
| 6,630,973 B1 * | 10/2003 | Matsuoka et al. | ........... | 349/117 |
| 6,844,033 B2 * | 1/2005 | Shimizu et al. | ............ | 428/1.33 |
| 6,984,730 B2 * | 1/2006 | Yamada et al. | ................. | 536/56 |
| 7,163,723 B2 * | 1/2007 | Tanaka et al. | ................. | 428/1.1 |
| 2002/0192397 A1 * | 12/2002 | Tsujimoto | .................. | 428/1.31 |
| 2003/0218709 A1 * | 11/2003 | Ito et al. | ...................... | 349/117 |
| 2004/0036828 A1 * | 2/2004 | Aminaka et al. | ............ | 349/117 |
| 2004/0077752 A1 * | 4/2004 | Matsufuji et al. | ............. | 524/37 |

FOREIGN PATENT DOCUMENTS

| | | | |
|---|---|---|---|
| EP | 0 911 656 A2 | | 4/1999 |
| EP | 1341007 A1 | * | 9/2003 |
| JP | 2587398 B2 | | 12/1996 |
| JP | 11005851 A | * | 1/1999 |
| JP | 2000275434 A | * | 10/2000 |
| JP | 2002-71957 A | | 3/2002 |
| JP | 2002-187960 A | | 7/2002 |

OTHER PUBLICATIONS

Machine translation of Matsuoka et al. (JP 2000-275434).*
Machine translation of Murayama et al. (JP 11-005851).*

* cited by examiner

*Primary Examiner*—D. Lawrence Tarazano
*Assistant Examiner*—Sophie Hon
(74) *Attorney, Agent, or Firm*—Buchanan Ingersoll & Rooney PC

(57) ABSTRACT

To provide an optical film which exhibits excellent retardation values both in the film plane and along the direction perpendicular to the film plane and shows little change in retardation values depending on environmental factors such as humidity, a liquid crystal display showing little change in viewing angle characteristics due to an environmental (humidity) change, and a polarizing plate to be used in the liquid crystal display, the cellulose acylate contains a cellulose acylate which is a mixed fatty acid ester of a cellulose and satisfies formulae specified in the specification, and a polarizing plate and a liquid crystal display using this cellulose acylate film.

26 Claims, 1 Drawing Sheet

OBSERVER SIDE

| TAC2 |
|---|
| POLARIZER |
| TAC1 |

| TAC1 |
|---|
| POLARIZER |
| TAC2 |

LIGHT SOURCE SIDE

OPTICAL CELLULOSE ACYLATE FILM, POLARIZING PLATE AND LIQUID CRYSTAL DISPLAY

BACKGROUND OF THE INVENTION

1. Field of the Invention

This invention relates to an optical cellulose acylate film, and a polarizing plate and a liquid crystal display with the use of the same as an optical compensation sheet.

2. Background Art

Because of having various merits, for example, being available at low voltage, using less power and being available in downsized and thinned form, liquid crystal displays have been widely employed in monitors of personal computers, cell phones and TV sets. According to alignment of liquid crystal molecules in a cell, various display modes are proposed. Among these methods, TN mode, wherein liquid crystal molecules are aligned in a twisted state by about 90° from the lower substrate toward the upper substrate, has been mainly employed so far.

In general, a liquid crystal display generally has a liquid crystal cell, an optical compensation sheet and a polarizer. The optical compensation sheet is employed to prevent a displayed image from coloration and enlarge a viewing angle. As the optical compensation sheet, a stretched birefringent polymer film and a transparent film with a liquid crystal-coating have been conventionally used. For example, Japanese Patent No. 2587398 discloses a technique whereby an optical compensation sheet, which is formed by coating discostic liquid crystal molecules on a triacetyl cellulose film and aligning and solidifying thereon, to a TN mode liquid crystal cell to thereby give an enlarged viewing angle. In a liquid crystal display for a wide-screen TV which is to be viewed from various angles, however, strenuous requirements are imposed on view angle dependency and, therefore, the above-described technique is still insufficient to satisfy these requirements. Accordingly, intensive studies have been made on liquid crystal displays of various types different from the TN mode, for example, IPS (in-plane switching) mode, OCB (optically compensatory bend) mode, STN (super twisted nematic) mode and VA (vertically aligned) mode. Among all, the VA mode has attracted public attention as a TV liquid crystal display since it brings about sharp contrast and can be produced at a relatively high yield.

Compared with other polymer films, a cellulose acylate film has a characteristic of having a high optical isotropy (i.e., having a low retardation value). Owing to this characteristic, a cellulose acylate film is commonly employed for purposes with a need for high optical isotropy such as a polarizing plate.

On the contrary thereto, an optical compensation sheet (a phase retarder film) of a liquid crystal display should have a high optical anisotropy (i.e., a high retardation value). In particular, an optical compensation sheet for the VA mode should have a retardation value in a film plane (Re) of 30 to 200 nm and a retardation value in a direction perpendicular to the film plane (Rth) of 70 to 400 nm. Therefore, it has been a practice to employ a synthetic polymer film having a high retardation value such as a polycarbonate film or a polysulfone film as an optical compensation sheet therefor. The retardation value in the film plane and the retardation value in the direction perpendicular to the film plane, which are values representing optical characteristics, are calculated in accordance respectively with the following formula:

$$Re = (nx - ny) \times d$$

$$Rth = \{(nx + ny)/2 - nz\} \times d$$

wherein nx is a refractive index along the x axis in the film plane; ny is a refractive index along the y axis in the film plane; nz is a refractive index along the direction perpendicular to the film plane; and d is the thickness (μm) of the film.

As discussed above, it has been a general principle in the field of optical material technology that a synthetic polymer film is employed in the case with a need of a polymer film having an optical anisotropy (i.e., a high retardation value) while a cellulose acylate film is employed in the case with a need of a polymer having an optical isotropy (i.e., a low retardation value).

EP 0911656 A2 proposes a cellulose acetate film having a high retardation value which is also usable in a case with a need for an optical anisotropy, thereby overturning the common traditional rule. According to this proposal, the high retardation value is established by adding an aromatic compound having at least two aromatic rings, in particular, 1,3,5-triazine ring and effecting a stretching treatment. It is generally known that a cellulose triacetate is a hardly stretchable polymer material and it is difficult to elevate the birefringence index thereof. In the above document, however, the additive is simultaneously aligned in the stretching treatment and thus the birefringence index can be elevated. This film also serves as a protective film for a polarizing plate, which brings about a merit of providing a thin film liquid crystal display at a low cost.

JP-A-2002-71957 discloses an optical film containing cellulose ester which satisfies the requirements $2.0 \leq A+B \leq 3.0$ and $A<2.4$, in the case where the degree of substitution by an acetyl group is represented by A and the degree of substitution by a propionyl or butyryl group by B. In this optical film, furthermore, the refractive index Nx of the optical film at 590 nm wavelength in the direction of the slow axis and the refractive index Ny in the direction of the fast axis satisfy the requirement $0.0005 \leq Nx - Ny \leq 0.0050$.

JP-A-2002-187960 discloses a polarizing plate to be used in a liquid crystal display of VA mode wherein the polarizing plate has a polarizer and a mixed fatty acid cellulose ester film which is an optically biaxial film, and the mixed fatty acid cellulose ester film is provided between a liquid crystal cell and the polarizer.

SUMMARY OF THE INVENTION

The methods disclosed in the documents cited above are efficacious in providing less expensive and thin liquid crystal displays. In recent years, however, liquid crystal displays are frequently used under various environmental conditions, e.g., at a high humidity or a high temperature and cellulose ester films obtained by using these techniques suffer from a problem that the optically compensatory functions thereof are worsened under such conditions. In the case of a cellulose ester film having a high Re retardation value and a high Rth retardation value obtained by using the above techniques, in particular, there arises a problem that its Re retardation value and Rth retardation value vary depending on temperature and humidity and, in its turn, the optically compensating ability thereof also varies.

Accordingly, it has been required to develop a film which shows little change in optically compensating ability depending on the environment and yet makes it possible to provide a less expensive and thin liquid crystal display.

An object of the invention is to provide an optical film which exhibits excellent retardation values both in the film plane and along the direction perpendicular to the film plane and shows little change in retardation values depending on environmental factors such as humidity. Another object of the invention is to provide a liquid crystal display showing little change in viewing angle characteristics due to an environmental (humidity) change and a polarizing plate to be used in a liquid crystal display.

To overcome the above problems, the inventors conducted intensive studies. As a result, they found out that it is efficacious for establish the object to control the degree of substitution in cellulose acylate to be used as the starting material of a cellulose acylate film As the results of further studies, it is found out that the above object can be achieved by controlling the degree of substitution to a definite level, thereby completing the invention.

Accordingly, the above object has been achieved by the present invention with the use of the following means.

(1) A cellulose acylate film for an optical material, which comprises a cellulose acylate, wherein the cellulose acylate is a mixed fatty acid ester of a cellulose; a hydroxyl group of the cellulose is substituted by an acetyl group; and another hydroxyl group of the cellulose is substituted by an acyl group having 3 or more carbon atoms, wherein, the cellulose acylate satisfies formulae (I) and (II):

$$2.0 \leq A+B \leq 3.0 \quad (I)$$

$$0.9 \leq B \quad (II)$$

wherein A is a degree of substitution by the acetyl group; and B is a degree of substitution by the acyl group having 3 or more carbon atoms.

(2) The cellulose acylate film as described in item (1), wherein the acyl group comprises a butanoyl group.

(3) The cellulose acylate film as described in item (1) or (2), wherein the acyl group is a propionyl group; and B is 1.3 or more.

(4) The cellulose acylate film as described in any one of items (1) to (3), wherein a total degree of substitution of a hydroxyl group at 6-position of the cellulose is 0.75 or more.

(5) The cellulose acylate film as described in any one of items (1) to (4), wherein $Re(\lambda)$ and $Rth(\lambda)$, which are defined by formulae (III) and (IV), satisfy formulae (V) and (VI):

$$Re(\lambda)=(nx-ny)\times d \quad (III)$$

$$Rth(\lambda)=\{(nx+ny)/2-nz\}\times d \quad (IV)$$

$$30 \text{ nm} \leq Re_{(633)} \leq 200 \text{ nm} \quad (V)$$

$$70 \text{ nm} \leq Rth_{(633)} \leq 400 \text{ nm} \quad (VI)$$

wherein $Re(\lambda)$ is a retardation value in a film plane of the cellulose acylate film at a wavelength of $\lambda$ nm, and the retardation value is expressed in nm;

$Rth(\lambda)$ is a retardation value in a direction perpendicular to the film plane at the wavelength of $\lambda$ nm, and the retardation value is expressed in nm;

nx is a refractive index along a slow axis in the film plane;
ny is a refractive index along a fast axis in the film plane;
nz is a refractive index along the direction perpendicular to the film plane; and
"d" is a film thickness of the cellulose acylate film.

(6) The cellulose acylate film as described in item (5), wherein $Rth_{(633)}$ satisfies formula (VII):

$$230 \text{ nm} \leq Rth_{(633)} \leq 300 \text{ nm}. \quad (VII)$$

(7) The cellulose acylate film as described in any one of items (1) to (6), which comprises a retardation increasing agent comprising at least one of a rod-like compound and a discotic compound.

(8) The cellulose acylate film as described in any one of items (1) to (7), which further comprises at least one of a plasticizer, an ultraviolet absorbing agent and a peeling accelerator.

(9) The cellulose acylate film as described in any one of items (1) to (8), which has a film thickness of 40 to 180 µm.

(10) The cellulose acylate film as described in any one of items (1) to (9), which has a glass transition temperature Tg of 70 to 150° C.

(11) The cellulose acylate film as described in any one of items (1) to (10), which has an elastic modulus of 1500 to 4000 MPa.

(12) The cellulose acylate film as described in any one of items (1) to (11), which has $\Delta Re$ of 0 to 10 nm and $\Delta Rth$ of 0 to 30 nm, wherein $\Delta Re$ represents a difference between a Re value of a wavelength of 633 nm at 25° C. and 10% RH and another Re value of the wavelength of 633 nm at 25° C. and 80% RH; and $\Delta Rth$ represents a difference between a Rth value of the wavelength of 633 nm at 25° C. and 10% RH and another Rth value of the wavelength of 633 nm at 25° C. and 80% RH.

(13) The cellulose acylate film as described in any one of items (1) to (12), which has a $Re_{(633)}$ and $Rth_{(633)}$ value at 25° C. and 60% RH, the $Re_{(633)}$ and $Rth_{(633)}$ value satisfying formulae (A) to (C):

$$46 \leq Re_{(633)} \leq 150 \quad (A)$$

$$Rth_{(633)}=a-5.9Re_{(633)} \quad (B)$$

$$580 \leq a \leq 670 \quad (C)$$

wherein $Re_{(633)}$ is a retardation value in a film plane of the cellulose acylate film at a wavelength of 633 nm, and the retardation value is expressed in nm;

$Rth_{(633)}$ is a retardation value by nm in a direction perpendicular to the film plane at the wavelength of 633 nm, and the retardation value is expressed in nm; and "a" is an adjustable parameter of optical characteristics, and the adjustable parameter is expressed in nm.

(14) The cellulose acylate film as described in any one of items (1) to (13), which has an equilibrium moisture content of 3.2% or less at 25° C. and 80% RH.

(15) The cellulose acylate film as described in any one of items (1) to (14), which has a water vapor permeability of 400 g/m²·24 hr to 1800 g/m²·24 hr in terms of a film thickness of 80 µm under a condition of 60° C. and 95% RH for 24 hours.

(16) The cellulose acylate film as described in any one of items (1) to (15), which has a haze of 0.01 to 2%.

(17) The cellulose acylate film as described in any one of items (1) to (16), which comprises a silicon dioxide particle having an average secondary particle size of 0.2 to 1.5 µm.

(18) The cellulose acylate film as described in any one of items (1) to (17), which shows a weight change of 0 to 5% in the case of allowed to stand at 80° C. and 90% RH for 48 hours.

(19) The cellulose acylate film as described in any one of items (1) to (18), which shows a dimensional change of 0 to 5% in each of the cases of allowed to stand at 60° C. and 95% RH for 24 hours and allowed to stand at 90° C. and 5% RH for 24 hours.

(20) The cellulose acylate film as described in any one of items (1) to (19), which has a photoelastic coefficient of $50 \times 10^{-3}$ cm²/dyne or less.

(21) A polarizing plate comprising:

a polarizer; and two protective films for the polarizer, wherein at least one of the two protective films comprising a cellulose film as described in any one of items (1) to (20).

(22) The polarizing plate as described in item (21), which satisfies at least one of formulae (a) to (d):

$$40.0 \leq TT \leq 45.0 \quad (a)$$

$$30.0 \leq PT \leq 40.0 \quad (b)$$

$$CT \leq 2.0 \quad (c)$$

$$95.0 \leq P \quad (d)$$

wherein TT represents a single plate transmittance at 25° C. and 60% RH;

PT represents a parallel transmittance at 25° C. and 60% RH;

CT represents a cross transmittance at 25° C. and 60% RH; and

P represents a polarization degree at 25° C. and 60% RH.

(23) The polarizing plate as described in item (21) or (22), which satisfies at least one of formulae (e) to (g):

$$T(380) \leq 2.0 \quad (e)$$

$$T(410) \leq 1.0 \quad (f)$$

$$T(700) \leq 0.5 \quad (g)$$

wherein $T(\lambda)$ represents a cross transmittance at the wavelength of $\lambda$ nm.

(24) The polarizing plate as described in any one of items (21) to (23), which satisfies at least one of formulae (j) and (k):

$$-6.0 \leq \Delta CT \leq 6.0 \quad (j)$$

$$-10.0 \leq \Delta P \leq 0.0 \quad (k)$$

wherein $\Delta CT$ and $\Delta P$ represents a change in cross transmittance and polarization degree, respectively, in a test that the polarizing plate is allowed to stand at 60° C. and 95% RH for 500 hours; and the change means a value calculated by subtracting a measurement value before the test from a measurement value after the test.

(25) The polarizing plate as described in any one of items (21) to (24), which satisfies at least one of formulae (h) and (i):

$$-6.0 \leq \Delta CT \leq 6.0 \quad (h)$$

$$-10.0 \leq \Delta P \leq 0.0 \quad (i)$$

wherein $\Delta CT$ and $\Delta P$ represents a change in cross transmittance and polarization degree, respectively, in a test that the polarizing plate is allowed to stand at 60° C. and 90% RH for 500 hours.

(26) The polarizing plate as described in any one of items (21) to (25), which satisfies at least one of formulae (l) and (m):

$$-6.0 \leq \Delta CT \leq 6.0 \quad (l)$$

$$-10.0 \leq \Delta P \leq 0.0 \quad (m)$$

wherein $\Delta CT$ and $\Delta P$ represents a change in cross transmittance and polarization degree, respectively, in a test that the polarizing plate is allowed to stand at 80° C. for 500 hours.

(27) The polarizing plate as described in any one of items (21) to (26), which one of the two protective films comprises at least one of a hard coat layer, an antiglare layer and an antireflective layer.

(28) A liquid crystal display comprising a cellulose acylate film as described in any one of items (1) to (20) or a polarizing plate as described in any one of items (21) to (27).

(29) A liquid crystal display comprising: a liquid crystal cell of OCB or VA mode; and a polarizing plate as described in any one of items (21) to (27), wherein the liquid crystal cell having the polarizing plate above and below the liquid crystal cell.

(30) A liquid crystal display comprising: a liquid crystal cell of VA mode; a polarizing plate as described in any one of items (21) to (27); and a backlight, wherein the polarizing plate is between the liquid crystal cell and the backlight.

Advantage of the Invention

Using the cellulose acylate film according to the invention, it is possible to provide an optical film which exhibits favorable retardation values both in a film plane of the cellulose acylate film (or in plane) and in a direction perpendicular to the film plane (or along the film thickness direction), and shows from little change in retardation values depending on environmental factors such as humidity.

The polarizing plate according to the invention makes it possible to give a liquid crystal display which shows little changes in viewing angle characteristics even upon environmental (humidity) changes. The liquid crystal display according to the invention shows little changes in viewing angle characteristics even upon environmental (humidity) changes.

DETAILED DESCRIPTION OF THE INVENTION

Figure 1:
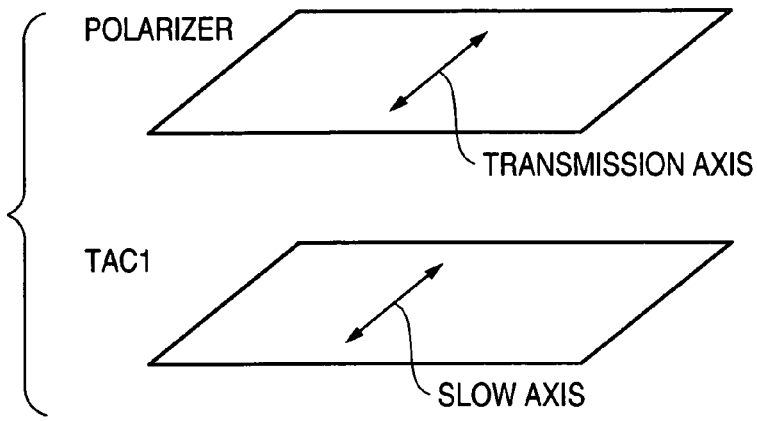
FIG. 1 is a schematic diagram showing how to stick a cellulose acylate film on a polarizer in constructing the polarizing plate according to the invention.

Next, the invention will be illustrated in greater detail.

<Cellulose Acylate Film>

First, a cellulose acylate film according to the invention will be illustrated.

A cellulose acylate film according to the invention is formed by using specific cellulose acylate as the starting material.

{Cellulose Acylate}

First, the specific cellulose acylate to be used in the invention will be illustrated in greater detail. In the invention, it is also possible to use a mixture of two or more cellulose acylates.

The specific cellulose acylate as described above is a mixed fatty acid ester of a cellulose obtained by substituting a hydroxyl group of the cellulose by an acetyl group and substituting another hydroxyl group of the cellulose by a acyl group having 3 or more carbon atoms, wherein degrees of substitution of hydroxyl group in cellulose fulfill the following formulae (I) and (II):

$$2.0 \leq A+B \leq 3.0 \quad (I)$$

$$0.9 \leq B. \quad (II)$$

In these formulae, A is the degree of substitution by the acetyl group, while B is the degree of substitution by the acyl group having 3 or more carbon atoms.

Glucose units constituting a cellulose, which are bonded to each other via β-1,4 bonds, have free hydroxyl groups at the 2-, 3- and 6-positions. A cellulose acylate is a polymer in which these hydroxyl groups have been partly or entirely esterified by acyl group. The degree of substitution by the acyl group means the ratio of the esterification of the cellulose at each of the 2-, 3- and 6-positions (the degree of substitution of 1 standing for the 100% esterification).

In the invention, the sum of the degrees of substitution (A+B) of the hydroxyl group is from 2.0 to 3.0 as shown by the formula (I), preferably from 2.2 to 2.9 and particularly preferably from 2.40 to 2.85. As the formula (II) shows, the degree of substitution B is 0.9 or more, particularly preferably 1.3 or more.

In the case where A+B is less than 2.0, the cellulose acylate becomes too hydrophilic and, as a result, is highly affected by environmental humidity.

In the case where B is less than 0.9, the cellulose acylate becomes closely similar to a cellulose acetate in properties and is highly affected by environmental humidity.

It is further preferable that substitution of the hydroxyl group at the 6-position amounts to 28% or more of the degree of substitution B, still preferably 30% or more, still preferably 31% or more and particularly preferably 32% or more.

It is further preferable that the total degree of substitution of the hydroxyl group at the 6-position of the cellulose is 0.75 or more, still preferably 0.80 or more and particularly preferably 0.85 or more. By using such a cellulose acylate film, a film-forming solution having preferable solubility and filtration properties can be prepared and a favorable solution can be prepared even by using a nonchlorinated organic solvent. Moreover, it is possible to prepare a solution having a low viscosity and favorable filtration properties.

The acyl group (B) having 3 or more carbon atoms may be either an aliphatic group or an aromatic hydrocarbon group without particular restriction. Use may be made of, for example, alkylcarbonyl esters, alkenylcarbonyl esters, aromatic carbonyl esters and aromatic alkylcarbonyl esters of cellulose each optionally having additional substituents. Preferable examples of the acyl group include propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Among them, prpionyl, butanoyl, dodecanoyl, octadecanoyl, t-butanoyl, oleoyl, benzoyl, naphthylcarbonyl and cinnamoyl groups are still preferable, propionyl and butanoyl groups are particularly preferable, and butanoyl groups are most preferable. In the case of the propionyl group, the degree of substitution B is preferably 1.3 or more, more preferably 1.4 or more, still more preferably 1.5 or more.

Specific examples of the cellulose acylate include a cellulose acetate, a cellulose acetate propionate and a cellulose acetate butyrate.

{Method of Synthesizing Cellulose Acylate}

The fundamental principle for the synthesis of a cellulose acylate is described by Migita et al., *MOKUZAI KAGAKU*, p. 180-190 (Kyoritsu Shuppan, 1968). A typical synthesis method is the liquid phase acetylation method with the use of carboxylic anhydride-acetic acid-sulfuric acid catalyst.

More specifically speaking, the cellulose acylate is obtained by pretreating a cellulose material such as cotton linter or wood pulp with an appropriate amount of acetic acid, and then pouring into a pre-cooled liquid mixture for carboxylation followed by esterification to thereby synthesize a perfectly acylated cellulose (the sum of the degrees of substitution by the acyl group at the 2-, 3- and 6-position amounting to almost 3.00). The liquid mixture for carboxylation usually contains an acetic acid employed as a solvent, a carboxylic anhydride employed as an esterifier and a sulfuric acid employed as a catalyst. It is a common practice to use the carboxylic anhydride in stoichiometrically excess for the total amount of water contained in the cellulose to be reacted therewith and the reaction system. After the completion of the esterification, an aqueous solution of a neutralizing agent (for example, calcium, magnesium, iron, aluminum or zinc carbonate, acetate or oxide) is added to hydrolyze the excessive carboxylic anhydride remaining in the reaction system and partly neutralize the esterification catalyst. Next, the obtained perfect cellulose acylate is saponified and aged by maintaining at 50 to 90° C. in the presence of a small amount of an acetylation catalyst (in general, the remaining sulfuric acid) to thereby convert it into a cellulose acylate having a desired degree of acyl substitution and a desired degree of polymerization. When the desired cellulose acylate is obtained, the catalyst remaining in the reaction system is completely neutralized by using such a neutralizing agent as described above. Alternatively, the cellulose acylate solution as such (i.e., not neutralized) is poured into water or a dilute sulfuric acid (or water or a dilute sulfuric acid is poured into the cellulose acylate solution). Then the cellulose acylate is separated, washed and stabilized. Thus, the specific cellulose acylate as described above can be obtained.

It is preferred that, in the cellulose acylate film as described above, the polymer components constituting the film substantially comprise the specific cellulose acylate. The term "substantially" as used herein means that the cellulose acylate amounts to 55% by weight or more (preferably 70% by weight or more and still preferably 80% by weight or more) of the polymer components.

It is preferable to use the cellulose acylate as particles. It is preferable that 90% by weight or more of the particles to be used have a particle size of 0.5 to 5 mm. It is also preferable that 50% by weight or more of the particles to be used have a particle size of 1 to 4 mm. It is preferable that the cellulose acylate particles have a shape as spherical as possible.

The degree of polymerization of the cellulose acylate preferably employed in the invention ranges preferably from 200 to 700, still preferably from 250 to 550, still preferably from 250 to 400 and particularly preferably from 250 to 350 in terms of viscosity-average degree of polymerization. An average degree of polymerization can be measured by the limiting viscosity method (Kazuo Uda & Hideo Saito, *SEN-I GAKKAISHI*, Vol. 18, No. 1, p. 105-120, 1962). This method is reported in greater detail in JP-A-9-95538.

When low-molecular weight components are removed, the average molecular weight (degree of polymerization) is elevated but the viscosity becomes lower than common cellulose acylates. It is therefore preferable to use, as the cellulose acylate as described above, a cellulose acylate from which low-molecular weight components have been removed. Such cellulose acylate containing less low-molecular weight components can be obtained by removing the low-molecular weight components from a cellulose acylate synthesized by a conventional method. The low-molecular weight components can be removed by washing a cellulose acylate with an appropriate organic solvent. In the case of producing the cellulose acylate containing less low-molecular weight components, it is preferable to control the amount of the sulfuric acid catalyst in the acetylation to 0.5 to 25 parts by weight per 100 parts by weight of the cellulose acylate. By controlling the amount of the sulfuric acid catalyst within the range as described above, it is possible to synthesize the cellulose acylate favorable from the viewpoint of molecular weight distribution (i.e., having a uniform of molecular weight distribution). In using the production of the cellulose acylate, the moisture content is preferably 2% by weight or less, still preferably 1% by weight or less and particularly preferably 0.7% by weight or less. In general, the cellulose acylate contains water and it is known that the moisture content thereof ranges from 2.5 to 5% by weight. To regulate to a moisture content, it is required in the invention to dry the cellulose acylate. The drying method is not particularly restricted, so long as the desired moisture content can be established thereby.

As the starting cotton material and the synthesis method to be used for obtaining the cellulose acylate, use can be made of the starting cotton material and the synthesis method described in detail in Japan Institute of Invention and Innovation Journal of Technical Disclosure No. 2001-1745 (2001 Mar. 15, Japan Institute of Invention and Innovation), p. 7 to 12.

The cellulose acylate film according to the invention can be obtained by forming a film with the use of a solution prepared by dissolving the specific cellulose acylate as described above, together with additive(s) if necessary, in an organic solvent.

{Additives}

As additives usable in the cellulose acylate solution in the invention, citation may be made of, for example, plasticizers, ultraviolet absorbing agents, antidegradants, retardation (optical anisotropy) increasing agents, fine particles, peeling accelerators and infrared absorbing agents. In the invention, it is preferable to use a retardation increasing agent. It is also preferable to use at least one of plasticizers, ultraviolet absorbing agents and peeling accelerators.

These additives may be either solid substances or oily substances. Namely, they are not particularly restricted in melting point or boiling point. For example, it is possible to use a mixture of an ultraviolet absorbing agent having a melting point of 20° C. or lower with another ultraviolet absorbing agent having a melting point of 20° C. or higher. Similarly, use can be made of a mixture of plasticizers as reported by, for example, JP-A-2001-151901.

As the ultraviolet absorbing agents, arbitrary types may be selected depending on the purpose. Use may be made of, for example, salisylic acid ester type compounds, benzophenone type compounds, benzotriazole type compounds, benzoate type compounds, cyanoacrylate type compounds and nickel complex salt type compounds. It is preferable to use benzophenone type compounds, benzotriazole type compounds or salisylic acid ester type compounds. Examples of the benzophenone type ultraviolet absorbing agents include 2,4-dihydroxybenzophenone, 2-hydroxy-4-acetoxybenzophenone, 2-hydroxy-4-methoxybenzophenone, 2,2'-di-hydroxy-4-methoxybenzophenone, 2,2'-di-hydroxy-4,4'-methoxybenzophenone, 2-hydroxy-4-n-octoxybenzophenone, 2-hydroxy-4-dodecyloxybenzophenone and 2-hydroxy-4-(2-hydroxy-3-methacryloxy)propoxybenzophenone. Examples of the benzotriazole type ultraviolet absorbing agents include 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-aminophenyl)benzotriazole, 2(2'-hydroxy-3',5'-di-tert-butylphenyl)-5-chlorobenzotriazole and 2(2'-hydroxy-5'-tert-octylphenyl)benzotriazole. Examples of the salicylic acid ester type ultraviolet absorbing agents include phenyl salicylate, p-octylphenyl salicylate and p-tert-butylphenyl salicylate. Among these ultraviolet absorbing agents cited above, 2-hydroxy-4-methoxybenzophenone, 2,2'-di-hydroxy-4,4'-methoxybenzophenone, 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-aminophenyl)benzotriazole and 2(2'-hydroxy-3',5'-di-tert-butylphenyl)-5-chlorobenzotriazole are particularly preferable.

It is preferable to use a combination of plural ultraviolet absorbing agents differing in absorption wave length, since shielding effect over a wide wavelength range can be established thereby. From the viewpoint of preventing liquid crystals from degradation, it is preferable that an ultraviolet well absorbing agent for liquid crystals absorbs ultraviolet rays having less than 370 nm wavelength, and, from the viewpoint of liquid crystal display performance, hardly absorbs visible rays having more than 400 nm wavelength. Particularly preferable examples of the ultraviolet absorbing agents are the benzotriazole type compounds, the benzophenone type compounds and the salicylic acid ester compounds as cited above. Among all, the benzotriazole type compounds are favorable because of scarcely causing undesirable coloration in cellulose esters.

As the ultraviolet absorbing agent, use can be also made of compounds described in JP-A-60-235852, JP-A-3-199202, JP-A-5-197073, JP-A-5-194789, JP-A-5-271471, JP-A-6-107854, JP-A-6-118233, JP-A-6-148430, JP-A-7-11055, JP-A-7-11056, JP-A-8-29619, JP-A-8-239509 and JP-A-2000-204173.

The addition level of the ultraviolet absorbing agent ranges preferably from 0.001 to 5% by weight, still preferably from 0.01 to 1% by weight, based on the cellulose acylate. So long as the amount thereof is 0.001% by weight or more, the effects of the addition can be fully exerted. Also, it is favorable that the amount thereof does not exceed 5% by weight, since the ultraviolet absorber would not bleed out on the film surface in this case.

The ultraviolet absorbing agent may be simultaneously added in the step of dissolving the cellulose acylate. Alternatively, it may be added to the dope after the dissolution. It is particularly preferable to add a solution of the ultraviolet absorbing agent immediately before casting with the use of, for example, a static mixer, since the spectroscopic absorption characteristics can be easily controlled thereby.

The antidegradants as described above make it possible to prevent cellulose acylate from degradation and decomposition. Examples of the antidegradants include butylamine, hindered amine compounds (JP-A-8-325537), guanidine compounds (JP-A-5-271471), benzotriazole ultraviolet absorbing agents (JP-A-6-235819) and benzophenone type ultraviolet absorbing agents (JP-A-6-118233).

As the plasticizers, phosphoric acid esters and carboxylic acid esters are preferred. It is still preferable to use, as the plasticizer, a compound selected from among triphenyl phosphate (TPP), tricrezyl phosphate (TCP), cresyldiphenyl phosphate, octyldiphenyl phosphate, diphenylbiphenyl phosphate, trioctyl phosphate, tributyl phosphate, dimethyl phthalate (DMP), diethyl phthalate (DEP), dibutyl phthalate (DBP), diocytl phthalate (DOP), diphenyl phthalate (DPP), diethylhexyl phthalate (DEHP), triethyl o-acetylcitrate (OACTE), tributyl o-acetylcitrate, acetyl triethyl citrate, acetyl tributyl citrate, butyl oleate, methyl acetyl ricinolate, dibutyl sebacate, tributine, butyl phthalylbutyl glycolate, ethyl phthalylethyl glycolate, methyl phthalylethyl glycolate and butyl phthalylbutyl glycolate. It is still preferable to use, as the plasticizer, a compound selected from (di)pentaerythritol esters, glycerol esters and diglycerol esters.

Examples of the peeling accelerators include ethyl esters of citric acid. Examples of the infrared absorbing agents are described in, for example, JP-A-2001-194522.

Although these additives may be added at any stage during the dope preparation, a preparation step of adding the additives may be further employed as the final step of the dope preparation process. The addition level of each material is not particularly restricted, so long as the desired effect thereof can be achieved. In the case of a multilayered cellulose film, moreover, individual layers may contain different types of additives in various amounts. These techniques have been conventionally known, as reported by, for example, JP-A-2001-151902. It is preferred to appropriately select the types and the addition levels of these additives so as to control the glass transition temperature Tg of the cellulose acylate film measured with a dynamic viscoelasticity meter (VIBRON: DVA-225 manufactured by IT KEISOKUSEIGYO K.K.) to 70 to 150° C. and the elastic modulus measured with a tensile test machine (STROGRAPHY R2 manufactured by TOYO SEIKI KOGYO Co.) to 1500 to 4000 MPa. It is still preferable that the glass transition temperature Tg is from 80 to 135° C. while the elastic modulus is from 1500 to 3000 MPa. That is to say, it is preferable to control the glass transition temperature Tg and the elastic modulus respectively of the cellulose acylate film according to the invention within the scopes as defined above from the viewpoint of handling suitability in processing it into a polarizing plate and setting up a liquid crystal display.

Concerning additives, moreover, use can be optionally made of the substances described in detail in Japan Institute of Invention and Innovation Journal of Technical Disclosure No. 2001-1745 (2001 Mar. 15, Japan Institute of Invention and Innovation), from p. 16.

{Retardation Increasing Agent}

To exhibit favorable retardation values, it is preferable in the invention to use a retardation increasing agent.

As retardation increasing agents usable in the invention, rod-like and discotic compounds may be cited.

As the rod-like and discotic compounds as cited above, use can be made of compounds having at least two aromatic rings.

A retardation increasing agent comprising a rod-like compound is added preferably in an amount of from 0.1 to 30 parts by weight, still preferably from 0.5 to 20 parts by weight, per 100 parts by weight of the polymer components including the cellulose acylate.

A retardation increasing agent comprising a discotic compound is added preferably in an amount of from 0.05 to 20 parts by weight, still preferably from 0.1 to 10 parts by weight, still preferably from 0.2 to 5 parts by weight and most desirably from 0.5 to 2 parts by weight, per 100 parts by weight of the polymer components including the cellulose acylate.

Since a discotic compound is superior in the ability to exhibit Rth retardation to a rod-like compound, it is preferred to use a discotic compound in the case with a need of a particularly large Rth retardation.

Use may be made of a combination of two or more retardation increasing agents.

It is preferable that such a retardation increasing agent comprising a rod-like or discotic compound has an absorption peak in a wavelength region of 250 to 400 nm. It is preferable that the retardation increasing agent substantially has no absorption in the visible ray region.

Next, discotic compounds will be illustrated. As a discotic compound, compounds having at least two aromatic rings can be used.

The term "aromatic ring" as used herein involves aromatic hydrocarbon rings as well as aromatic heterocycles.

As the aromatic hydrocarbon ring, a 6-membered ring (i.e., benzene ring) is particularly preferred.

An aromatic heterocycle is generally an unsaturated heterocycle. As the aromatic heterocycle, a 5-membered ring, a 6-membered ring or a 7-membered ring is preferable and a 5-membered ring or a 6-membered ring is still preferable. In general, an aromatic heterocycle has double bonds in the largest number. As a hetero atom, nitrogen, oxygen and sulfur atoms are preferable and a nitrogen atom is particularly preferable. Examples of the aromatic heterocycles include furan ring, thiophene ring, pyrrole ring, oxazole ring, isoxazole ring, thiazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring.

As the aromatic ring, benzene ring, furan ring, thiophene ring, pyrrole ring, oxazole ring, thiazole ring, imidazole ring, triazole ring, pyridine ring, pyrimidine ring, pyrazine ring and 1,3,5-triazine ring are preferable and 1,3,5-triazine ring is particularly preferably employed. More specifically speaking, compounds disclosed in, for example, JP-A-2001-166144 are preferably employed as the discotic compound.

It is preferable that the discotic compound has from 2 to 20 aromatic rings, still preferably from 2 to 12, still preferably form 2 to 8 and most desirably form 2 to 6.

The binding manner of two aromatic rings may be classified as follows: (a) together forming a fused ring; (b) being bonded directly to each other via a single bond; (c) being bonded via a linking group (no spiro bond can be formed because of being aromatic rings). Any of the binding manners (a) to (c) is available.

Examples of the fused ring (a)(i.e., a fused ring consisting of two or more aromatic rings) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzoxazole ring, benzothiazole ring, benzoimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxathine ring, phenoxazine ring and thianthrene ring. Among them, naphthalene ring, azulene ring, indole ring, benzoxazole ring, benzothiazole ring, benzoimidazole ring, benzotriazole ring and quinoline ring are preferred.

The single bond (b) is preferably a bond between carbon atoms of two aromatic rings. It is also possible that two aromatic rings are formed by two or more single bonds and an aliphatic ring or a nonaromatic ring is formed between these two aromatic rings.

It is also preferred that the linking group (c) is bonded to carbon atoms of two aromatic rings. Preferable examples of the linking group include alkylene bonds, alkenylene bonds, alkynylene bonds, —CO—, —O—, —NH—, —S— and combinations thereof. Examples of the liking groups made up of such combinations are as follows. These linking groups may be inverted in the left-to-right relation.

c1: —CO—O—
c2: —CO—NH—
c3: -alkylene-O—
C4: —NH—CO—NH—
c5: —NH—CO—O—
C6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have a substituent.

Examples of the substituents include halogen atoms (F, Cl, Br and I), hydroxyl group, carboxyl group, cyano group, amino group, nitro group, sulfo group, carbamoyl group, sulfamoyl group, ureido group, alkyl groups, alkenyl groups, alkynyl groups, aliphatic acyl groups, aliphatic acyloxy groups, alkoxy groups, alkoxycarbonyl groups, alkoxycarbonylamino groups, alkylthio groups, alkylsulfonyl groups, aliphatic amido groups, aliphatic sulfonamido groups, aliphatic substituted amino groups, aliphatic substituted carbamoyl groups, aliphatic substituted sulfamoyl groups, aliphatic substituted ureido groups and nonaromatic heterocyclic groups.

It is preferable that the alkyl group has from 1 to 8 carbon atoms. A chain type alkyl group is preferable to a cyclic alkyl group and a linear chain type alkyl group is particularly preferred. The alkyl group may further have a substituent (for example, hydroxy, carboxy, alkoxy and alkyllated amino groups). Examples of the alkyl group (including the substituted alkyl group) include methyl group, ethyl group, n-butyl group, n-hexyl group, 2-hydroxyethyl group, 4-carboxybutyl group, 2-methoxyethyl group and 2-diethylaminoethyl group.

It is preferable that the alkenyl group has from 2 to 8 carbon atoms. A chain type alkenyl group is preferable to a cyclic alkenyl group and a linear chain type alkenyl group is particularly preferred. The alkenyl group may further have a substituent. Examples of the alkenyl group include vinyl group, allyl group and 1-hexenyl group.

It is preferable that the alkynyl group has from 2 to 8 carbon atoms. A chain type alkynyl group is preferable to a cyclic alkynyl group and a linear chain type alkyl group is particularly preferred. The alkynyl group may further have a substituent. Examples of the alkynyl group include ethynyl group, 1-butynyl group and 1-hexynyl group.

It is preferable that the aliphatic acyl group has from 1 to 10 carbon atoms. Examples of the aliphatic acyl group include acetyl group, propanoyl group and butanoyl group.

It is preferable that the aliphatic acyloxy group has from 1 to 10 carbon atoms. Examples of the aliphatic acyloxy group include acetoxy group.

It is preferable that the alkoxy group has from 1 to 8 carbon atoms. The alkoxy group may further have a substituent. Examples of the alkoxy group (including the substituted alkoxy group) include methoxy group, ethoxy group, butoxy group and methoxyethoxy group.

It is preferable that the alkoxycarbonyl group has from 2 to 10 carbon atoms. Examples of the alkoxycarbonyl group include methoxycarbonyl group and ethoxycarbonyl group.

It is preferable that the alkoxycarbonylamino group has from 2 to 10 carbon atoms. Examples of the alkoxycarbonylamino group include methoxycarbonylamino group and ethoxycarbonylamino group.

It is preferable that the alkylthio group has from 1 to 12 carbon atoms. Examples of the alkylthio group include methyltion group, ethylthio group and octylthio group.

It is preferable that the alkylsulfonyl group has from 1 to 8 carbon atoms. Examples of the alkylsulfonyl group include methanesulfonyl group and ethanesulfonyl group.

It is preferable that the aliphatic amido group has from 1 to 10 carbon atoms. Examples of the aliphatic amido group include acetamido group.

It is preferable that the aliphatic sulfonamido group has from 1 to 8 carbon atoms. Examples of the aliphatic sulfonamido group include methanesulfonamido group, butanesulfonamido group and n-octanesulfonamido group.

It is preferable that the substituted aliphatic amino group has from 1 to 10 carbon atoms. Examples of the substituted aliphatic amino group include dimethylamino group, diethylamino group and 2-carboxyethylamino group.

It is preferable that the substituted aliphatic carbamoyl group has from 2 to 10 carbon atoms. Examples of the substituted aliphatic carbamoyl group include methylcarbamoyl group and diethylcarbamoyl group.

It is preferable that the substituted aliphatic sulfamoyl group has from 1 to 8 carbon atoms. Examples of the substituted aliphatic sulfamoyl group include methylsulfamoyl group and diethylsulfamoyl group.

It is preferable that the substituted aliphatic ureido group has from 2 to 10 carbon atoms. Examples of the substituted aliphatic ureido group include methylureido group.

Examples of the nonaromatic heterocyclic group include piperidino group and morpholino group.

It is preferable that the retardation increasing agent comprising a discotic compound has a molecular weight of from 300 to 800.

In addition to the discotic compound as described above, it is also preferable in the invention to use a rod-like compound having a linear molecular structure. The term "a linear molecular structure" means that the molecular structure of a rod-like compound is linear in the most thermodynamically stable state. The most thermodynamically stable state can be determined by analyzing crystalline structure or calculating molecular orbital. That is, the molecular structure giving the smallest formation heat can be determined by calculating the molecular orbital with the use of a molecular orbital calculation software (for example, Win MOPAC 2000 manufactured by FUJITSU Ltd.). Having a linear molecular structure means that the main chain of the molecular structure forms an angle of 140° or above in the most thermodynamically stable state as determined above.

It is preferable that the rod-like compound has at least two aromatic rings. As the rod-like compound having at least two aromatic rings, compounds represented by the following formula (1) are preferred.

  Formula (1)

In the above formula (1), $Ar^1$ and $Ar^2$ independently represent each an aromatic group. The term "aromatic group" as used herein includes aryl groups (aromatic hydrocarbon groups), substituted aryl groups, aromatic heterocyclic groups and substituted aromatic heterocyclic groups.

An aryl group and a substituted aryl group are preferred to an aromatic heterocyclic group and a substituted aromatic heterocyclic group. An aromatic heterocyclic group generally has an unsaturated heterocycle. It is preferable that the aromatic heterocycle is 5-, 6- or 7-membered ring and a 5- or 6-membered ring is still preferable. In general, an aromatic heterocycle has double bonds in the largest number. As a hetero atom, nitrogen, oxygen and sulfur atoms are preferable and a nitrogen atom is particularly preferable.

Examples of the aromatic heterocycle include benzene ring, furan ring, thiophene ring, pyrrole ring, oxazole ring, thiazole ring, imidazole ring, triazole ring, pyridine ring, pyrimidine ring and pyrazine ring are preferable and benzene ring is particularly preferable.

Examples of the substituents in the substituted aryl group and the substituted aromatic heterocyclic group include halogen atoms (F, Cl, Br and I), hydroxyl group, carboxyl group, cyano group, amino group, alkylamino groups (for example, methylamino, ethylamino, butylamino and dimethylamino groups), nitro group, sulfo group, carbamoyl group, alkylcarbamoyl groups (for example, N-methylcarbamoyl, N-ethylcarbamoyl and N,N-dimethylcarbamoyl groups), sulfamoyl group, alkyl sulfamoyl groups (for example, N-methylsulfamoyl, N-ethylsulfamoyl and N,N-dimethylsulfamoyl groups), ureido group, alkylureido groups (for example, N-methylureido, N,N-dimethylureido and N,N,N'-trimethylureido groups), alkyl groups (for example, methyl, ethyl, propyl, butyl, pentyl, heptyl, octyl, isopropyl, s-butyl, t-amyl, cyclohexyl and cyclopentyl groups), alkenyl groups (for example, vinyl, allyl and hexenyl groups), alkynyl groups (for example, ethynyl and butynyl groups), acyl groups (for example, formyl, acetyl, butyryl, hexanoyl and lauryl groups), acyloxy groups (for example, acetoxy, butyryloxy, hexanoyloxy and lauryloxy groups), alkoxy groups (for example, methoxy, ethoxy, propoxy, butoxy, pentyloxy, heptyloxy and octyloxy groups), aryloxy groups (for example, phenoxy group), alkoxycarbonyl groups (for example, methoxycarbonyl, ethoxycarbonyl, propoxycarbonyl, butoxycarbonyl, pentyloxycarbonyl and heptyloxycarbonyl groups), aryloxycarbonyl groups (for example, phenoxycarbonyl group), alkoxycarbonylamino groups (for example, butoxycarbonylamino and hexyloxycarbonylamino groups), alkylthio groups (for example, methylthio, ethylthio, propylthio, butylthio, pentylthio, heptylthio and octylthio groups), arylthio groups (for example, phenylthio group), alkylsulfonyl groups (for example, methylsulfonyl, ethylsulfonyl, propylsulfonyl, butylsulfonyl, pentylsulfonyl, heptylsulfonyl and octylsulfonyl groups), amido groups (for example, acetamido, butylamido, hexylamido and laurylamido groups) and nonaromatic heterocyclic groups (for example, morpholyl and pyradinyl groups).

Preferable examples of the substituents in the substituted aryl group and the substituted aromatic heterocyclic group include halogen atoms, cyano group, carboxyl group, hydroxyl group, amino group, alkylated amino groups, acyl groups, acyloxy groups, amido groups, alkoxycarbonyl groups, alkoxy groups, alkylthio groups and alkyl groups.

In the alkylamino groups, the alkoxycarbonyl groups and the alkylthio groups, each alkyl moiety and alkyl group may further have a substituent. Examples of the substituents of the alkyl moiety and the alkyl group include halogen atoms, hydroxyl, carboxyl, cyano, amino, alkylamino groups, nitro, sulfo, carbamoyl, alkylcarbamoyl groups, sulfamoyl, alkylsulfamoyl groups, ureido, alkylureido groups, alkenyl groups, alkynyl groups, acyl groups, acyloxy groups, acylamino groups, alkoxy groups, aryloxy groups, alkoxycarbonyl groups, aryloxycarbonyl groups, alkoxycarbonylamino groups, alkylthio groups, arylthio groups, alkylsulfonyl groups, amido groups and nonaromatic heterocyclic groups. Preferable examples of the substituents in the alkyl moiety and alkyl group include halogen atoms, hydroxyl, amino, alkylamino groups, acyl groups, acyloxy groups, acylamino groups, alkoxycarbonyl groups and alkoxy groups.

In formula (1), $L^1$ represents a divalent linking group selected form among alkylene groups, alkenylene groups, alkynylene groups, —O—, —CO— and combinations thereof. An alkylene group may have a cyclic structure. As a cyclic alkylene group, cyclohexylene is preferable and 1,4-cyclohexylene is particularly preferable. As a chain type alkylene group, a linear alkylene group is preferred to a branched alkylene group.

The alkylene group preferably has from 1 to 20, still preferably from 1 to 15, still preferably from 1 to 10, still preferably from 1 to 8 and most desirably from 1 to 6, carbon atoms.

An alkenylene group and an alkynylene group having a cyclic structure are preferred than cyclic ones.

The alkenylene group and the alkynylene preferably have from 2 to 10, still preferably from 2 to 8, still preferably from 2 to 6, still preferably from 2 to 4 and most desirably from 2 (vinylene or ethynylene), carbon atoms.

An arylene group preferably has from 6 to 20, still preferably from 6 to 16 and still preferably from 6 to 12, carbon atoms.

In the molecular structure represented by formula (1), it is preferable that the angle formed by $Ar^1$ and $Ar^2$, having $L^1$ between them, is 140° or above.

As the rod-like compound, compounds represented by the following formula (2) are still preferable.

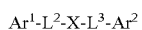 Formula (2)

In the above formula (2), $Ar^1$ and $Ar^2$ independently represent each an aromatic group. The definition of the aromatic group is the same as $Ar^1$ and $Ar^2$ in the above formula (1).

In formula (2), $L^2$ and $L^3$ independently represent each a divalent linking group selected form among alkylene groups, —O—, —CO— and combinations thereof.

An alkylene group having a chain type structure is preferred to a cyclic one. A linear alkylene group is further preferred to a branched one.

The alkylene preferably has from 1 to 10, still preferably from 1 to 8, still preferably from 1 to 6, still preferably from 1 to 4 and most desirably from 1 or 2 (methylene or ethylene), carbon atoms.

It is particularly preferable that $L^2$ and $L^3$ are —O—CO— or —CO—O—.

In formula (2), X represents 1,4-cyclohexylene, vinylene or ethynylene.

Specific examples of the compounds represented by formulae (1) and (2) are as follows.

(1)
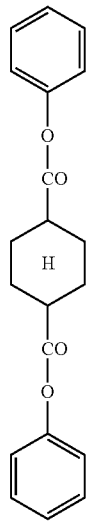
(2)
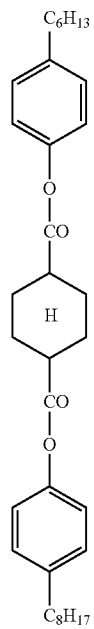
-continued
(3)
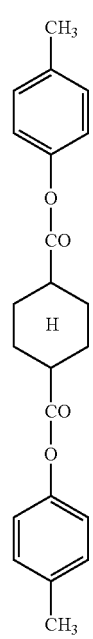
(4)
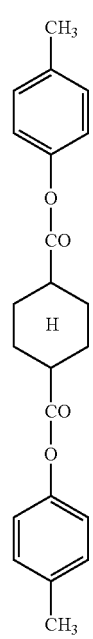

(5)
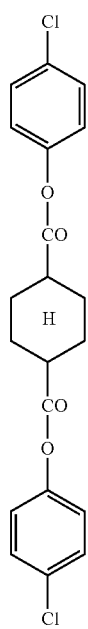
(7)
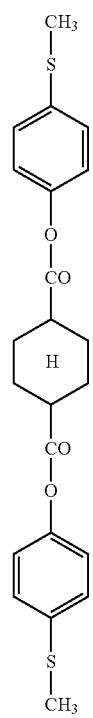
(6)
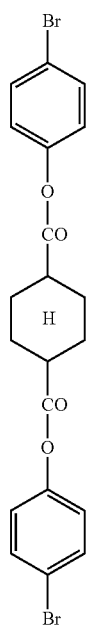
(8)
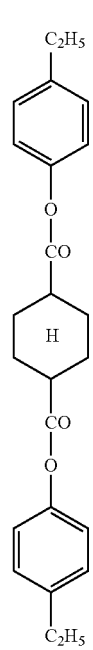

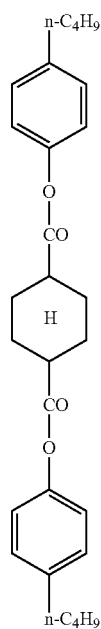 (9)
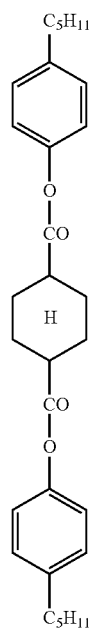 (10)
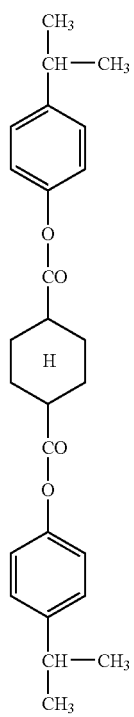 (11)
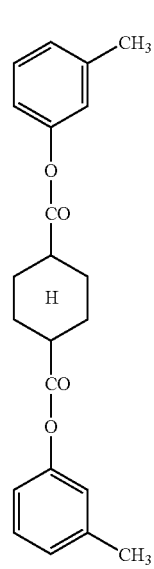 (12)

-continued
(13)
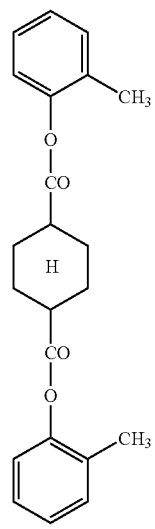
(14)
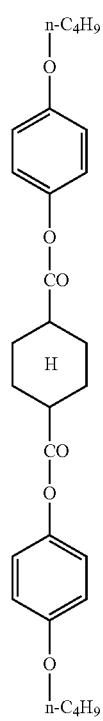
(15)
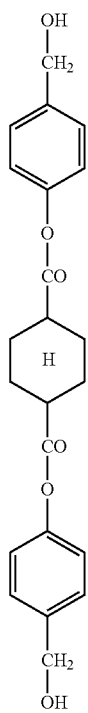
(16)
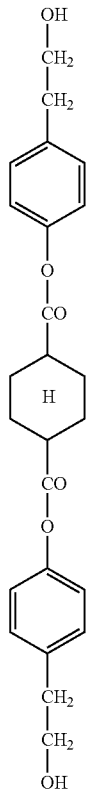

(17)
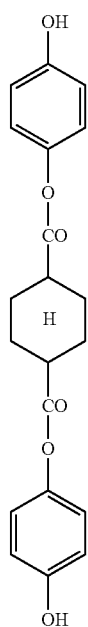
(18)
(19)
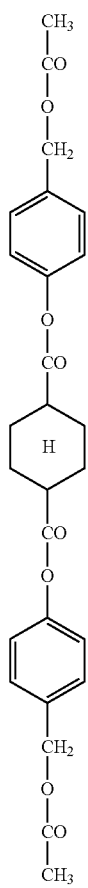

-continued
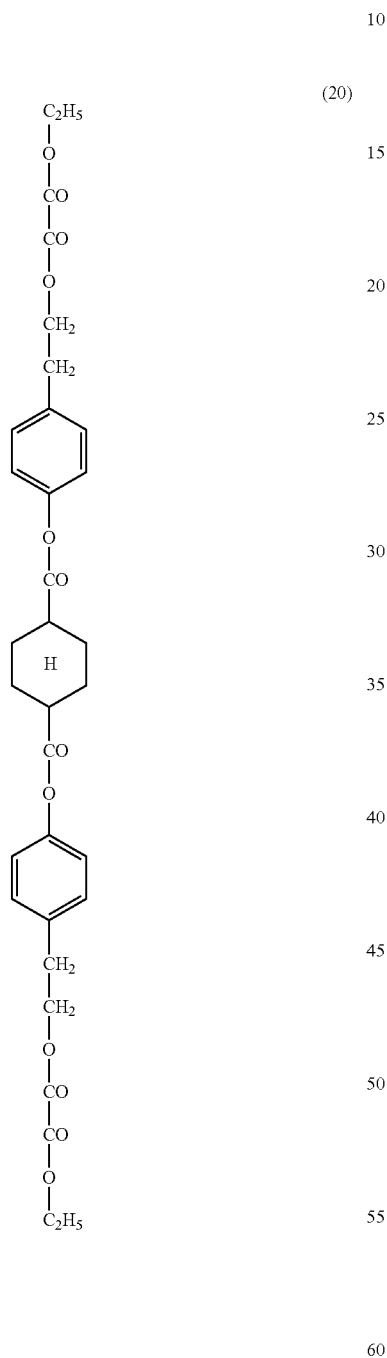
(20)
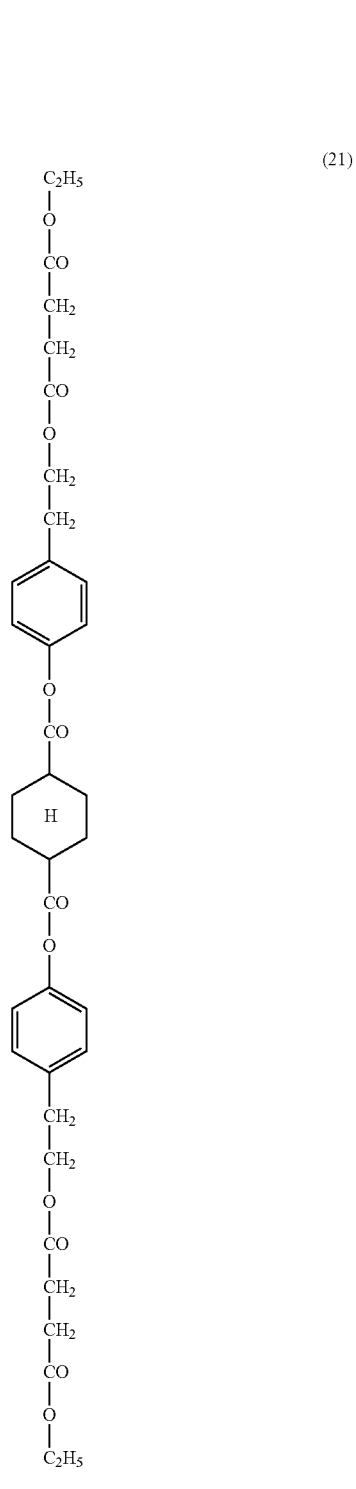
(21)

-continued
(22)
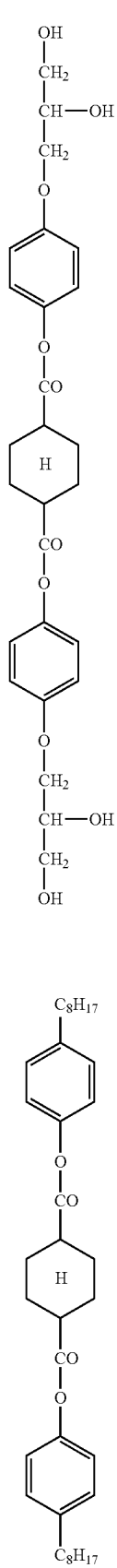
(23)
(24)
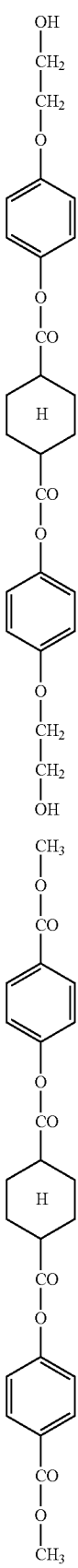
(25)

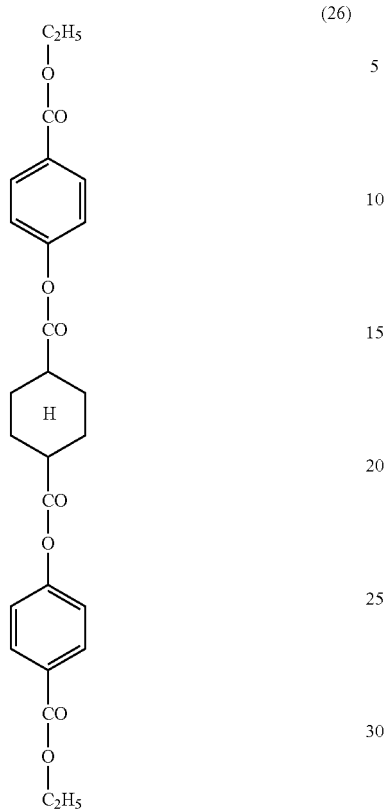
(26)
(27)
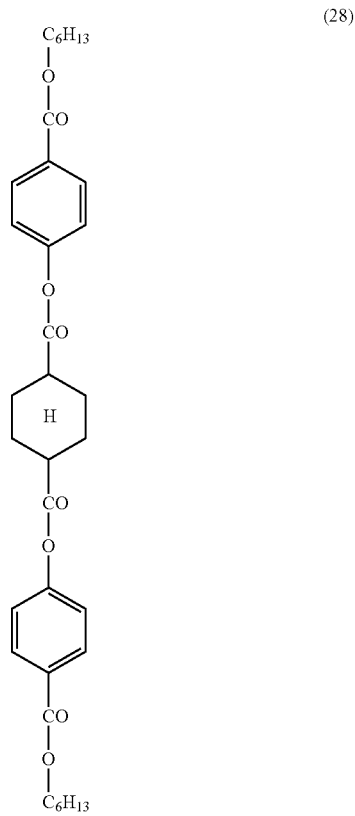
(28)
(29)

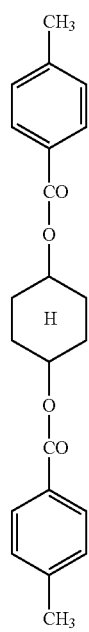
(30)
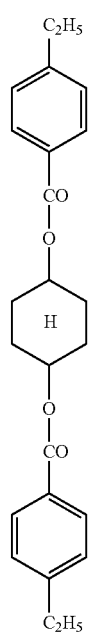
(31)
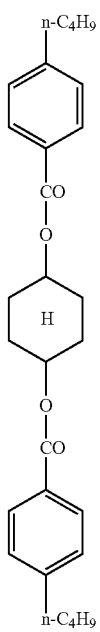
(32)
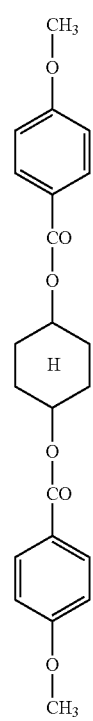
(33)

-continued
(34)
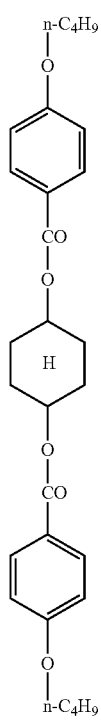
(35)
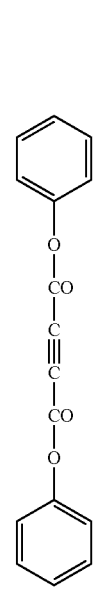
(36)
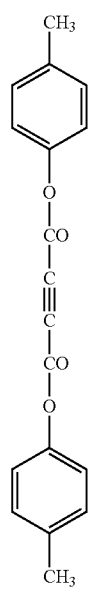
(37)
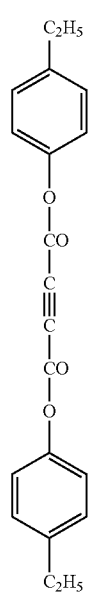

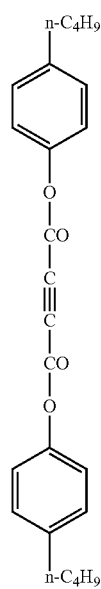
(38)
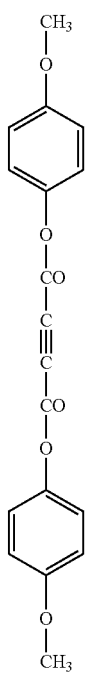
(39)
(40)
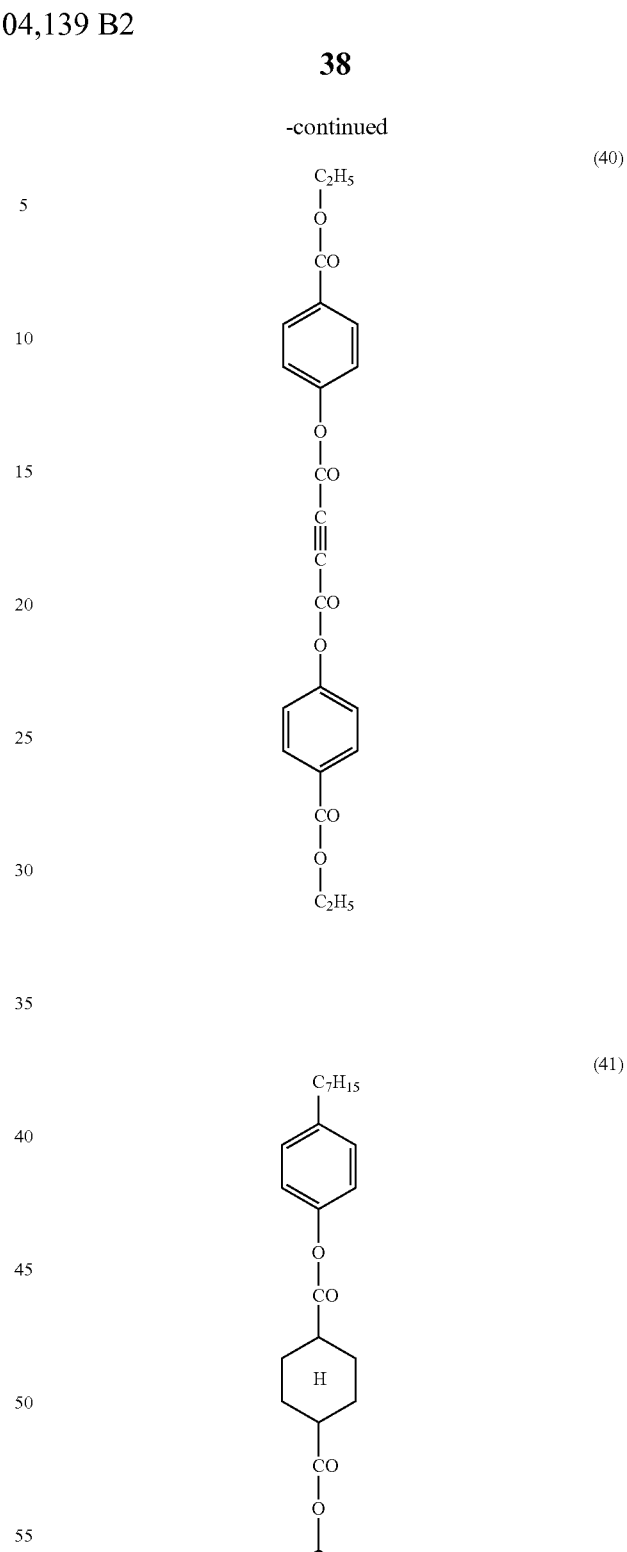
(41)

-continued

(42)
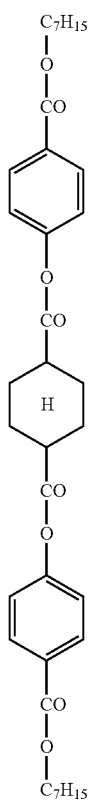

(43)
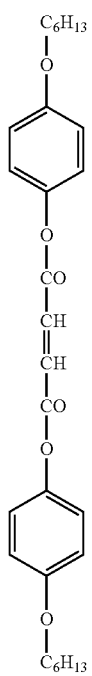

(44)
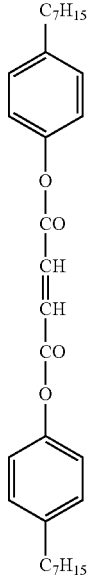

(45)

Although the compounds of examples (1) to (34), (41) and (42) have each two asymmetric carbon atoms at the 1- and 4-positions of cyclohexane ring, the compounds examples (1) to (34), (41) and (42) occur each exclusively as geometric isomers (trans- and cis-isomers) without having any optical isomers (optically active compounds) because of having a symmetric meso-molecular structure. Specific examples of trans- and cis-isomers of the compound of example (1) (1-trans and 1-cis) are as follows.

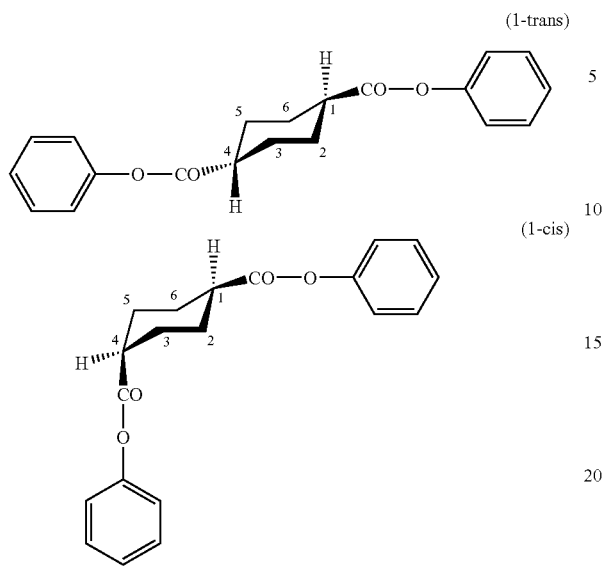

As discussed above, it is preferable that the rod-like compound has a linear molecular structure and, therefore, a trans-compound is preferred to a cis-compound.

The compounds of examples (2) and (3) have optical isomers in addition to geometric isomers (i.e., each having four isomers in total). In geometric isomers, a trans-compound is also preferred to a cis-compound. On the other hand, optical isomers are nearly equal to each other. Namely, either a D- or L-compound or a racemic mixture may be employed.

The compounds of examples (43) to (45) occur as trans- and cis-compounds concerning the vinylene bond at the center. For the same reason as described above, a trans-compound is preferred to a cis-compound.

As the rod-like compound, compounds represented by the following formula (3) are also favorable.

Formula (3):

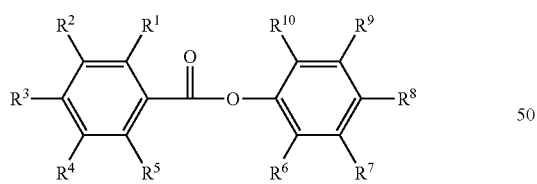

In the above formula, $R^1$, $R^2$, $R^3$, $R^4$, $R^5$, $R^6$, $R^7$, $R^9$ and $R^{10}$ independently represent each a hydrogen atom or a substituent and at least one of $R^1$, $R^2$, $R^3$, $R^4$ and $R^5$ represents an electron-donating group. $R^8$ represents a hydrogen atom, an alkyl group having from 1 to 4 carbon atoms, an alkenyl group having from 2 to 6 carbon atoms, an alkynyl group having from 2 to 6 carbon atoms, an aryl group 6 to 12 carbon atoms, an alkoxy group having form 1 to 12 carbon atoms, an aryloxy group having from 6 to 12 carbon atoms, an alkoxycarbonyl group having from 2 to 12 carbon atoms, an acylamino group having from 2 to 12 carbon atoms, a cyano group or a halogen atom.

Specific examples of the compounds represented by formula (3) are as follows.

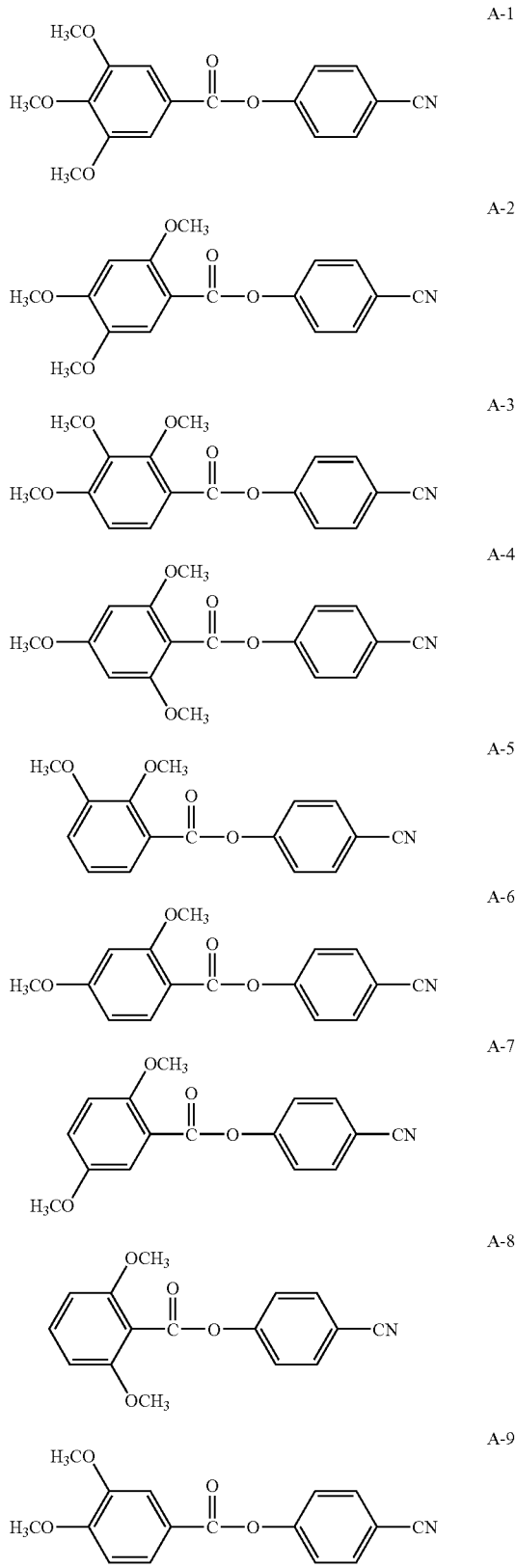

-continued
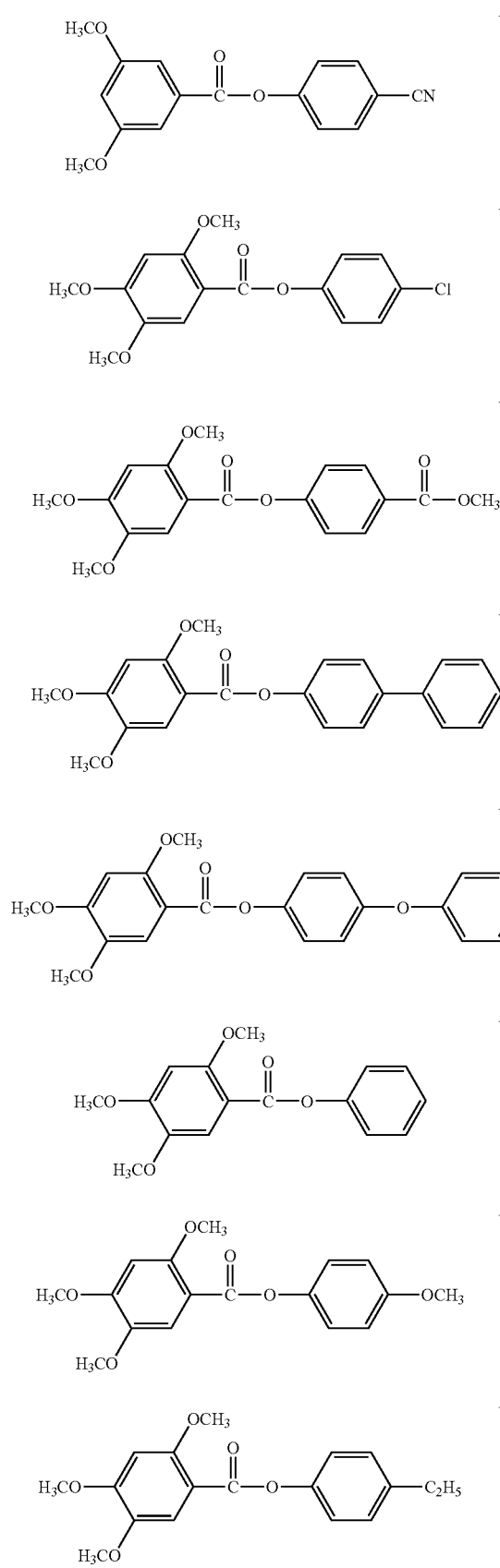
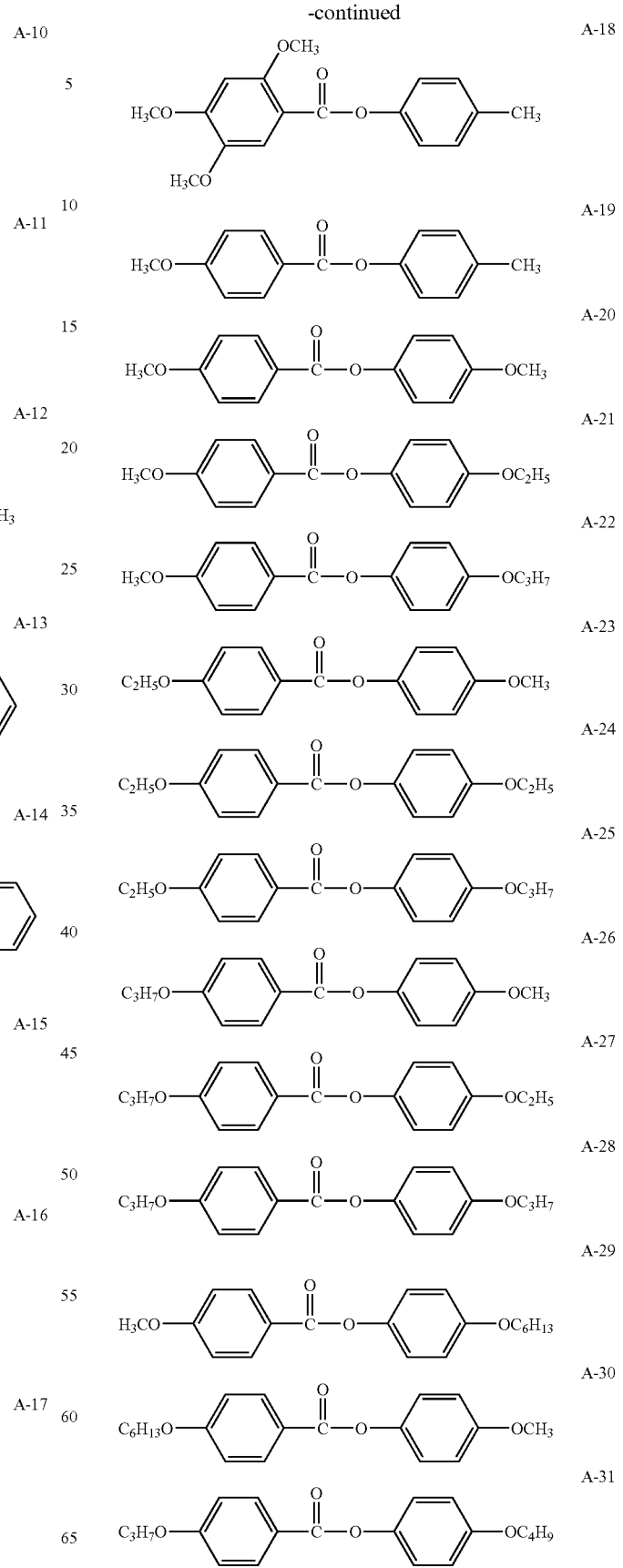

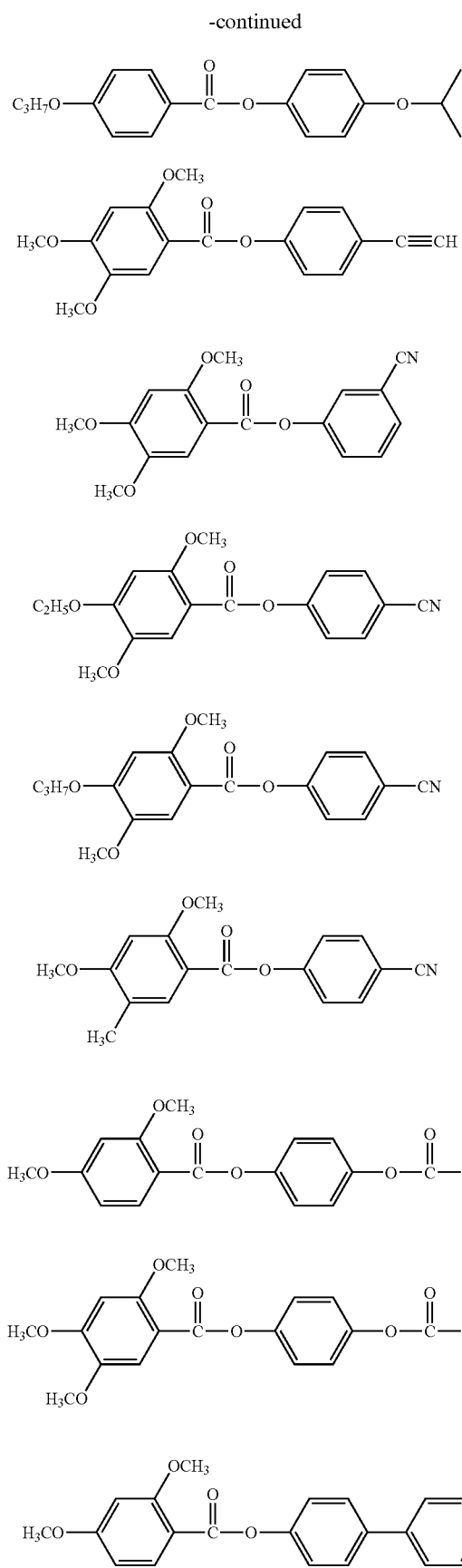
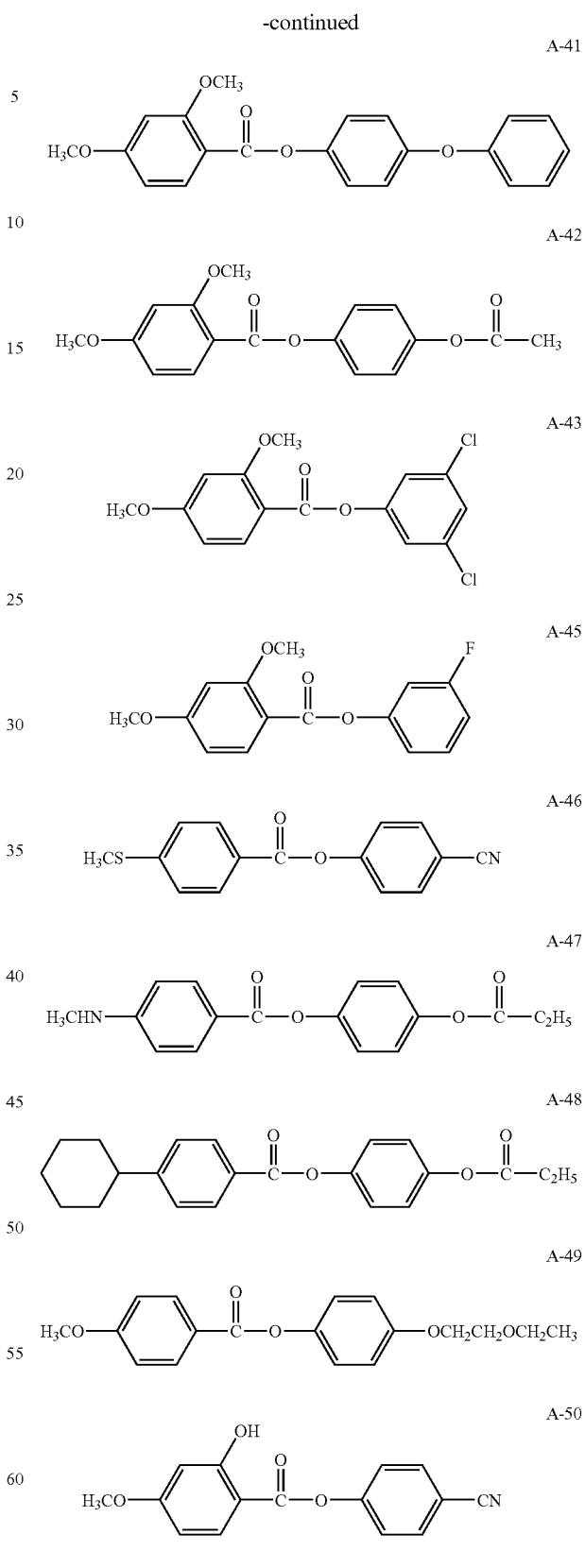
As specific examples of the compounds represented by formulae (1) to (3), the following compounds can be also cited.

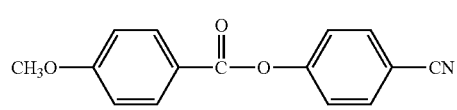  (46)
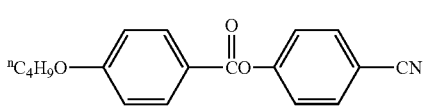  (47)
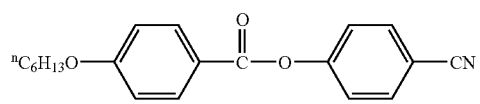  (48)
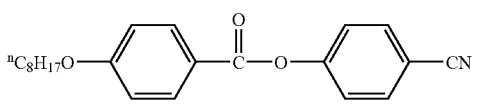  (49)
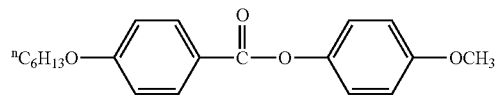  (50)
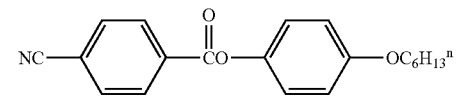  (51)
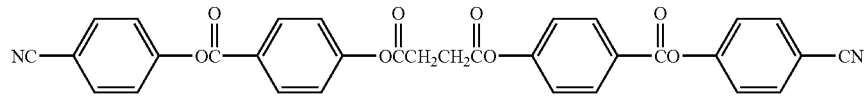  (52)
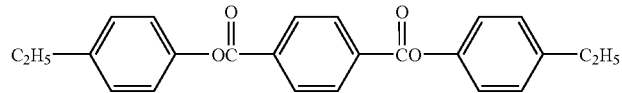  (53)
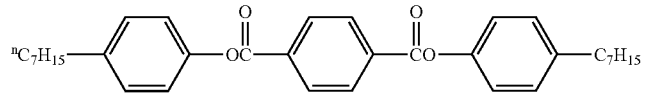  (54)
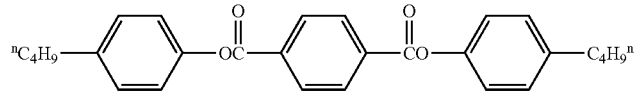  (55)
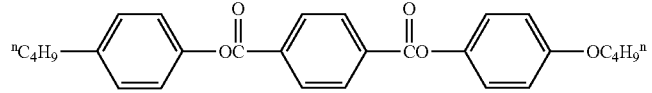  (56)
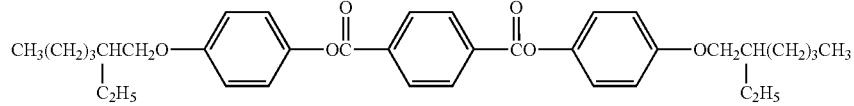  (57)
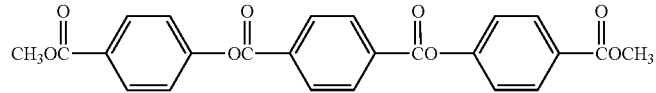  (58)
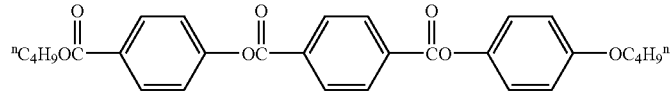  (59)
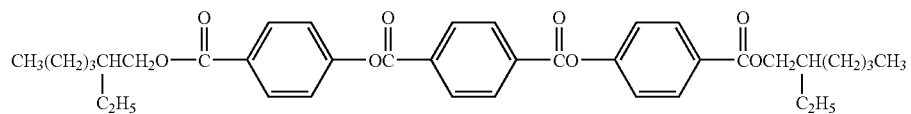  (60)
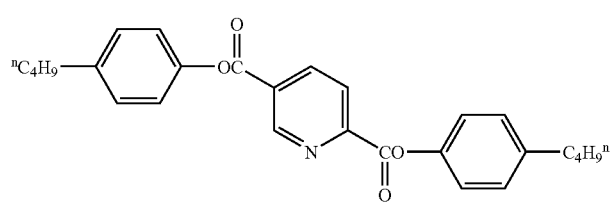  (61)

-continued

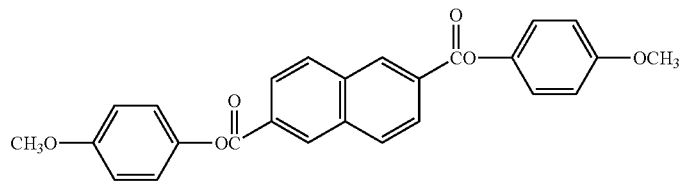

(62)

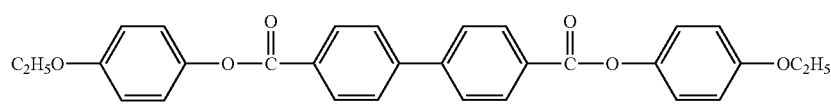

(63)

Also, use may be made of two or more types of rod-like compounds the ultraviolet absorption spectra of which show the maximum absorption wavelength (λmax) shorter than 250 nm.

The rod-like compound can be synthesized by methods reported in documents. Examples of the documents include Mol. Cryst. Liq. Cryst., vol. 53, p. 229 (1979), ibid., vol. 89, p. 93 (1982), ibid., vol. 145, p. 111 (1987), ibid., vol. 170, p. 43 (1989), J. Am. Chem. Soc., vol. 113, p. 1349 (1991), ibid., vol. 118, p. 5346 (1996), ibid., vol. 92, p. 1582 (1970), J. Org. Chem., vol. 40, p. 420 (1975) and Tetrahedron, vol. 48 16, p. 3437 (1992).

{Fine Particles of Matting Agent}

It is preferable that the cellulose acylate film according to the invention contains fine particles as a matting agent. Examples of the fine particles usable in the invention include silicon dioxide, titanium dioxide, aluminum oxide, zirconium oxide, calcium carbonate, talc, clay, baked kaolin, baked calcium silicate, hydrated calcium silicate, aluminum silicate, magnesium silicate and calcium phosphate. Fine particles containing silicon are preferred because of having a low cloudiness. In particular, silicon dioxide is preferred. It is preferable that fine particles of silicone dioxide have an average primary particle size of 20 nm or less and an apparent specific gravity of 70 g/l or more. Fine particles having a small average primary particle size of 5 to 16 nm are still preferable, since the haze of the resultant film can be lowered thereby. The apparent specific gravity is preferably form 90 to 200 g/l or more and still preferably from 100 to 200 g/l or more. A higher apparent specific gravity makes it possible to prepare a dispersion having the higher concentration, thereby improving haze and aggregates.

The amount of the fine particles of silicon dioxide, if used, preferably ranges form 0.01 to 0.3 parts by weight per 100 parts by weight of the polymer components including the cellulose acylate.

These fine particles form aggregates having an average secondary particle size of from 0.1 to 3.0 μm. In a film, these fine particles occur as aggregates of the primary particles and provides irregularities of 0.1 to 3.0 μm in height on the film surface. It is preferred that the average secondary particle size is from 0.2 μm to 1.5 μm, still preferably from 0.4 μm to 1.2 μm and most desirably from 0.6 μm to 1.1 μm. When the average secondary particle size exceeds 1.5 μm, haze is elevated. when it is less than 0.2 μm, on the other hand, creak inhibitory effect is worsened.

The primary or secondary particle size is determined by observing a particle in the film under a scanning electron microscope and referring the diameter of its circumcircle as the particle size. 200 particles are observed at various sites and the mean is referred to as the average particle size.

As the fine particles of silicon dioxide, use can be made of marketed products such as AEROSIL R972, R972V, R974, R812, 200, 200V, 300, R202, OX50 and TT600 (each manufactured by NIPPON AEROSIL). As the fine particles of zirconium oxide, use can be made of products marketed under the trade name of, for example, AEROSIL R976 and R811 (each manufactured by NIPPON AEROSIL).

Among these products, AEROSIL 200V and AEROSIL R972 are particularly preferable, since they are fine particles of silicon dioxide having an average primary particle size of 20 nm or less and an apparent specific gravity of 70 g/l or more and exert an effect of largely lowering the coefficient of friction while maintaining the cloudiness of the optical film at a low level.

To obtain a cellulose acylate film having particles with a small average secondary particle size, some techniques may be proposed in the step of preparing a dispersion of the fine particles in the invention. For example, the fine particles are mixed with a solvent under stirring to preliminarily give a fine particle dispersion. Then this fine particle dispersion is added to a small amount of a cellulose acylate solution having been prepared separately and dissolved therein under stirring. Then it is further mixed with a main cellulose acylate dope solution. This is a preferable preparation method from the viewpoints of achieving a high dispensability of the fine particles of silicon dioxide while causing little re-aggregation of the fine particles of silicon dioxide. An alternative method comprises adding a small amount of a cellulose ester to a solvent, dissolving it under stirring, then adding fine particles thereto, dispersing the fine particles in a dispersing machine to give a solution of the fine particle additive, and then sufficiently mixing the solution of the fine particle additive with a dope solution in an in-line mixer. Although the invention is not restricted to these methods, it is preferable in the step of mixing and dispersing the fine particles of silicon dioxide in, for example, a solvent that the silicon oxide concentration ranges from 5 to 30% by weight, preferably from 10 to 25% by weight and most desirably from 15 to 20% by weight. A higher dispersion concentration is preferred, since the solution cloudiness is lowered and haze and aggregation are improved thereby. The final content of the cellulose acylate in the dope solution preferably ranges from 0.01 to 1.0 g/m², still preferably from 0.03 to 0.3 g/m² and most desirably from 0.08 to 0.16 g/m².

Preferable examples of lower alcohols usable as the solvent include methyl alcohol, ethyl alcohol, propyl alcohol, isopropyl alcohol and butyl alcohol. Solvents other than lower alcohols are not particularly restricted, though it is favorable to use solvents which have been employed in forming cellulose ester films.

{Organic Solvent}

Next, the above-described organic solvent in which the cellulose acylate according to the invention is to be dissolved will be illustrated.

As the organic solvent to be used in the invention, use can be made of either a chlorinated solvent comprising a chlorinated organic solvent or a nonchlorinated solvent free from chlorinated organic solvents.

(Chlorinated Solvent)

To prepare the cellulose acylate solution according to the invention, it is preferable to use a chlorinated organic solvent as the main solvent. In the invention, the type of the chlorinated organic solvent is not particularly restricted, so long as the object of the utilization thereof can be established in dissolution, casting and film-forming of the cellulose acylate. As the chlorinated organic solvent, dichloromethane and chloroform are preferable and dichloromethane is particularly preferable. Moreover, there arises no problem by mixing an organic solvent other than chlorinated organic solvents. In this case, the content of dichloromethane should amount at least to 50% by weight in the total amount of the organic solvents. Now, other organic solvents to be used together with the chlorinated organic solvent in the invention will be described. As preferable examples of other organic solvents, use may be preferably made of solvents selected from among esters, ketones, ethers, alcohols and hydrocarbons having from 3 to 12 carbon atoms. These esters, ketones, ethers and alcohols may have cyclic structure. It is also possible to use compounds having two or more functional groups (i.e., —O—, —CO— and —COO—) of esters, ketones and ethers and these compounds may have another functional group such as alcoholic hydroxyl group at the same time. In the case of a solvent having two or more types of functional groups, the carbon atom number falling within the range as specified above concerning a compound having either functional group is acceptable. Examples of esters having from 3 to 12 carbon atoms include ethyl formate, propyl formate, and pentyl formate, methyl acetate, ethyl acetate and pentyl acetate. Examples of ketones having from 3 to 12 carbon atoms include acetone, methyl ethyl ketone, diethyl ketone, diisobutyl ketone, cyclopentanone, cyclohexanone and methyl cyclohexanone. Examples of ethers having from 3 to 12 carbon atoms include diisopropyl ether, dimethoxymethane, dimethoxyethane, 1,4-dioxane, 1,3-dioxolane, tetrahydrofuran, anisole and phenetol. Examples of the organic solvents having two or more types of functional groups include 2-ethoxyethyl acetate, 2-methoxyethanol and 2-butoxyethanol.

The alcohol to be used together with the chlorinated organic solvent may be a linear, branched or cyclic alcohol. Among all, a saturated aliphatic hydrocarbon is preferred. The hydroxyl group of the alcohol may be any of primary to tertiary hydroxyl groups. Examples of the alcohol include methanol, ethanol, 1-propanol, 2-propanol, 1-butanol, 2-butanol, t-butanol, 1-pentanol, 2-methyl-2-butanol and cyclohexanol. As the alcohol, use can be also made of a fluorinated alcohol. Examples thereof include 2-fluoroethanol, 2,2,2-trifluoroethanol and 2,2,3,3-tetrafluoro-1-propanol. The hydrocarbon may be either linear, branched or cyclic. Either an aromatic hydrocarbon or an aliphatic hydrocarbon may be used. The aliphatic hydrocarbon may be either saturated or unsaturated. Examples of the hydrocarbon include cyclohexane, hexane, benzene, toluene and xylene.

Examples of the combination of a chlorinated organic solvent with another organic solvent are as follows, though the invention is not restricted thereto.

Dichloromethane/methanol/ethanol/butanol (80/10/5/5, parts by weight),
Dichloromethane/acetone/methanol/propanol (80/10/5/5, parts by weight),
Dichloromethane/methanol/butanol/cyclohexane (80/10/5/5, parts by weight),
Dichloromethane/methyl ethyl ketone/methanol/butanol (80/10/5/5, parts by weight),
Dichloromethane/acetone/methyl ethyl ketone/ethanol/isopropanol (75/8/5/5/7, parts by weight),
Dichloromethane/cyclopentanone/methanol/isopropanol (80/7/5/8, parts by weight),
Dichloromethane/methyl acetate/butanol (80/10/10, parts by weight),
Dichloromethane/cyclohexanone/methanol/hexane (70/20/5/5, parts by weight),
Dichloromethane/methyl ethyl ketone/acetone/methanol/ethanol (50/20/20/5/5, parts by weight),
Dichloromethane/1,3-dioxolane/methanol/ethanol (70/20/5/5, parts by weight),
Dichloromethane/dioxane/acetone/methanol/ethanol (60/20/5/5, parts by weight),
Dichloromethane/acetone/cyclopentanone/ethanol/isobutanol/cyclohexane (65/10/10/5/5/5, parts by weight),
Dichloromethane/methyl ethyl ketone/acetone/methanol/ethanol (70/10/10/5/5, parts by weight),
Dichloromethane/acetone/ethyl acetate/ethanol/butanol/hexane (65/10/10/5/5/5, parts by weight),
Dichloromethane/methyl acetoacetate/methanol/ethanol (65/20/10/5, parts by weight),
Dichloromethane/cyclopentanone/ethanol/butanol (65/20/10/5, parts by weight).

(Nonchlorinated Solvent)

Next, a nonchlorinated organic solvent preferably employed in preparing the cellulose acylate solution in the invention will be illustrated. In the invention, the type of the nonchlorinated organic solvent is not particularly restricted, so long as the object of the utilization thereof can be established in dissolution, casting and film-forming of the cellulose acylate. As the nonchlorinated organic solvent, use may be preferably made of solvents selected from among esters, ketones and ethers having from 3 to 12 carbon atoms. These esters, ketones and ethers may have cyclic structure. It is also possible to use, as the main solvent, compounds having two or more functional groups (i.e., —O—, —CO— and —COO—) of esters, ketones and ethers and these compounds may have another functional group such as alcoholic hydroxyl group at the same time. In the case of a solvent having two or more types of functional groups, the carbon atom number falling within the range as specified above concerning a compound having either functional group is acceptable. Examples of esters having from 3 to 12 carbon atoms include ethyl formate, propyl formate, pentyl formate, methyl acetate, ethyl acetate and pentyl acetate. Examples of ketones having from 3 to 12 carbon atoms include acetone, methyl ethyl ketone, diethyl ketone, diisobutyl ketone, cyclopentanone, cyclohexanone and methyl cyclohexanone. Examples of ethers having from 3 to 12 carbon atoms include diisopropyl ether, dimethoxymethane, dimethoxyethane, 1,4-dioxane, 1,3-dioxolane, tetrahydrofuran, anisole and phenetol. Examples of the organic solvents having two or more types of functional groups include 2-ethoxyethyl acetate, 2-methoxyethanol and 2-butoxyethanol.

Although the nonchlorinated organic solvent to be used in the cellulose acylate is selected from various viewpoints as discussed above, it is favorable to take the following points into consideration. Namely, a solvent mixture comprising the above-described nonchlorinated organic solvent as the main solvent is preferred as a nonchlorinated solvent. The solvent mixture is preferably a mixture of three or more types of solvents differing from each other in which the first solvent is at least one member selected from among methyl acetate, ethyl acetate, methyl formate, ethyl formate, acetone, dioxolane, dioxane and mixtures thereof, the second solvent is selected from among ketones and acetoacetic acid esters having from 4 to 7 carbon atoms, and the third solvent is selected from among alcohols and hydrocarbons having from 1 to 10 carbon atoms, still preferably alcohols having from 1 to 8 carbon atoms. In the case where the first solvent is a mixture of two or more types of solvents, it is possible to employ no second solvent. It is still preferable that the first solvent is methyl acetate, acetone, methyl formate, ethyl formate or a mixture thereof. It is preferable that the second solvent is methyl ethyl ketone, cyclopentanone, cyclohexanone, methyl acetylacetate or a mixture thereof.

The alcohol to be used as the third solvent may be either linear, branched or cyclic. Among all, a saturated aliphatic hydrocarbon is preferable. The alcoholic group in the alcohol may be any of primary to tertiary hydroxyl groups. Examples of the alcohol include methanol, ethanol, 1-propanol, 2-propanol, 1-butanol, 2-butanol, t-butanol, 1-pentanol, 2-methyl-2-butanol and cyclohexanol. As the alcohol, use can be also made of a fluorinated alcohol. Examples thereof include 2-fluoroethanol, 2,2,2-trifluoroethanol and 2,2,3,3-tetrafluoro-1-propanol. The hydrocarbon may be either linear, branched or cyclic. Either an aromatic hydrocarbon or an aliphatic hydrocarbon may be used. The aliphatic hydrocarbon may be either saturated or unsaturated. Examples of the hydrocarbon include cyclohexane, hexane, benzene, toluene and xylene. These alcohols and hydrocarbons to be used as the third solvent may be employed either alone or as a mixture of two or more thereof. Specific examples of compounds preferable as the third solvent include alcohols such as methanol, ethanol, 1-propanol, 2-propanol, 1-butanol, 2-butanol and cyclohexanol, cyclohexane and hexane. Among all, methanol, ethanol, 1-propanol, 2-propanol and 1-butanol are particularly preferred.

Concerning the mixing ratio of the three solvents in the solvent mixture as discussed above, it is preferable that the content of the first solvent amounts to 20 to 95% by weight, the content of the second solvent amounts to 2 to 60% by weight and the content of the third solvent amounts to 2 to 30% by weight. It is still preferable that the content of the first solvent amounts to 30 to 90% by weight, the content of the second solvent amounts to 3 to 50% by weight and the content of the third alcohol amounts to 3 to 25% by weight. It is particularly preferable that the content of the first solvent amounts to 30 to 90% by weight, the content of the second solvent amounts to 3 to 30% by weight and the content of an alcohol employed as the first solvent amounts to 3 to 15% by weight. The nonchlorinated organic solvents to be used in the invention are described in greater detail in Japan Institute of Invention and Innovation Journal of Technical Disclosure No. 2001-1745 (2001 Mar. 15, Japan Institute of Invention and Innovation), p. 12 to 16. Preferable examples of the combination of nonchlorinated organic solvents to be used in the invention are as follows, though the invention is not restricted thereto.

Methyl acetate/acetone/methanol/ethanol/butanol (75/10/5/5/5 parts by weight),
Methyl acetate/acetone/methanol/ethanol/propanol (75/10/5/5/5 parts by weight),
Methyl acetate/acetone/methanol/ethanol/cyclohexane (75/10/5/5/5 parts by weight),
Methyl acetate/acetone/ethanol/butanol (81/8/7/4 parts by weight),
Methyl acetate/acetone/ethanol/butanol (82/10/4/4 parts by weight),
Methyl acetate/acetone/ethanol/butanol (80/10/4/6 parts by weight),
Methyl acetate/methyl ethyl ketone/methanol/butanol (80/10/5/5 parts by weight),
Methyl acetate/acetone/methyl ethyl ketone/ethanol/isopropanol (75/8/5/5/7 parts by weight),
Methyl acetate/cyclopentanone/methanol/isopropanol (80/70/5/8 parts by weight),
Methyl acetate/acetone/butanol (85/10/5 parts by weight),
Methyl acetate/cyclopentanone/acetone/methanol/butanol (60/15/14/5/6 parts by weight),
Methyl acetate/cyclohexanone/methanol/hexane (70/20/5/5 parts by weight),
Methyl acetate/methyl ethyl ketone/acetone/methanol/ethanol (50/20/20/5/5 parts by weight),
Methyl acetate/1,3-dioxolane/methanol/ethanol (70/20/5/5 parts by weight),
Methyl acetate/dioxane/acetone/methanol/ethanol (60/20/10/5/5 parts by weight),
Methyl acetate/acetone/cyclopentanone/ethanol/isobutanol/cyclohexane (65/10/10/5/5/5 parts by weight),
Methyl formate/methyl ethyl ketone/acetone/methanol/ethanol (50/20/20/5/5 parts by weight),
Methyl formate/acetone/ethyl acetate/ethanol/butanol/hexane (65/10/10/5/5/5 parts by weight),
Acetone/methyl acetoacetate/methanol/ethanol (65/20/10/5 parts by weight),
Acetone/cyclopentanone/ethanol/butanol (65/20/10/5 parts by weight),
Acetone/1,3-dioxolane/ethanol/butanol (65/20/10/5 parts by weight),
1,3-dioxolane/cyclohexanone/methyl ethyl ketone/methanol/butanol (55/20/10/5/5/5 parts by weight).

It is also possible to use a cellulose acylate solution prepared by the following method.

A method which comprises preparing a cellulose acylate solution using methyl acetate/acetone/ethanol/butanol (81/8/7/4 parts by weight), filtering, concentrating and then adding 2 parts by weight of butanol thereto.

A method which comprises preparing a cellulose acylate solution using methyl acetate/acetone/ethanol/butanol (84/10/4/2 parts by weight), filtering, concentrating and then adding 4 parts by weight of butanol thereto.

A method which comprises preparing a cellulose acylate solution using methyl acetate/acetone/ethanol (84/10/6 parts by weight), filtering, concentrating and then adding 5 parts by weight of butanol thereto.

In addition to the nonchlorinated organic solvent as described above, the dope to be used in the invention may further contain dichloromethane in an amount of not exceeding 10% by weight based on the total amount of organic solvent contents.

{Characteristics of Cellulose Acylate Solution}

From the viewpoint of suitability for film-forming and casting, it is preferable that the cellulose acylate solution is a solution in which cellulose acylate is dissolved in the above-described organic solvent at a concentration of from 10 to 30% by weight, still preferably from 13 to 27% by weight and particularly preferably from 15 to 25% by weight. The cellulose acylate concentration may be controlled to such a level by controlling the concentration at the dissolution step. Alternatively, it is also possible that a solution of a low concentration (for example, from 9 to 14% by weight) is preliminarily prepared and then the concentration is controlled to a definite high level in the subsequent concentration step as will be described hereinafter. It is also possible that a cellulose acylate solution of a high concentration is preliminarily prepared and then various additives are added to give a cellulose acylate solution of a lowered concentration as defined above. Any method may be used without any problem so long as the cellulose acylate solution of a definite concentration according to the invention can be obtained thereby.

It is preferable in the invention that a diluted cellulose acylate solution, that is obtained by diluting the cellulose acylate solution with the organic solvent of the same composition to give a concentration of from 0.1 to 5% by weight, has a cellulose acylate aggregate molecular weight of from 150,000 to 15,000,000, still preferably from 180,000 to 9,000,000. This aggregate molecular weight can be determined by the static light scattering method. It is preferable to make the dissolution to give an inertia square radius, which id determined at the same time, of from 10 to 200 nm, still preferably from 20 to 200 nm. It is also preferable to make the dissolution to give a second virial coefficient of from $-2\times10^{-4}$ to $+4\times10^{-4}$, still preferably from $-2\times10^{-4}$ to $+2\times10^{-4}$.

Now, the definitions of the aggregate molecular weight, the inertia square radium and the second virial coefficient will be illustrated. These items are measured by using the static light scattering method in accordance with the following procedures. Although the measurement is carried out in a dilute region as a matter of convenience, these data reflect behaviors of the dope in the high concentration region according to the invention.

First, cellulose acylate is dissolved in a solvent to be used in the dope to give solutions having concentrations of 0.1% by weight, 0.2% by weight, 0.3% by weight and 0.4% by weight. To prevent water absorption, cellulose acylate having been dried at 120° C. for 2 hours is employed and weighed at 25° C. under 10% RH. Dissolution is carried out in accordance with the method employed in dissolving the dope (room-temperature dissolution, cold dissolution, hot dissolution). Next, these solutions and solvents are filtered through a 0.2 μm Teflon filter. Then static light scattering of each solution thus filtered is measured at 25° C. at from 30° to 140° at the intervals of 10° by using a light scattering meter (Model DLS-700 manufactured by OTUKA ELECTRONICS CO., LTD.). The obtained data are then analyzed by the BERRY plot method. As the refractive index required in the analysis, the value of the solvent determined by using an ABBE refraction system. The concentration gradient (dn/dc) of the refractive index is measured with a differential refractometer (Model DRM-1021 manufactured by OTUKA ELECTRONICS CO., LTD.) by using the solvents and solutions employed in measuring light scattering.

{Preparation of Dope}

Next, the preparation of a cellulose acylate solution (dope) will be illustrated. The cellulose acylate is dissolved by an arbitrary method without restriction, i.e., by room-temperature dissolution, cold dissolution, hot dissolution or a combination thereof. Methods of preparing cellulose acylate solutions are described in, for example, JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017 and JP-A-11-302388. These techniques of dissolving cellulose acylate in organic solvents as described above are appropriately applicable in the present invention within the scope of the invention. These techniques can be carried out in accordance with the method described in detail in Japan Institute of Invention and Innovation Journal of Technical Disclosure No. 2001-1745 (2001 Mar. 15, Japan Institute of Invention and Innovation), p. 22 to 25. Moreover, the cellulose acylate dope solution according to the invention is usually concentrated and filtered as described in detail in Japan Institute of Invention and Innovation Journal of Technical Disclosure No. 2001-1745 (2001 Mar. 15, Japan Institute of Invention and Innovation), p. 25. In hot dissolution, a temperature not lower than the boiling point of the organic solvent employed is used in most cases and the dissolution is performed under elevated pressure.

From the viewpoint of easiness in casting, it is preferable that the cellulose acylate solution has a viscosity and a dynamic storage elastic modulus respectively falling within the ranges as will be specified below. 1 mL of a sample solution is measured with a rheometer (CLS 500) by using a steel cone of 4 cm/2° in diameter (both manufactured by TA Instruments). The measurement is made by changing the temperature within a range of 40° C. to −10° C. at a rate of 2° C./min with the use of Oscillation Step/Temperature Ramp and the static non-Newtonian viscosity n* (Pa·S) at 40° C. and the storage elastic modulus G' (Pa) at −5° C. are measured. Before starting the measurement, the sample solution is maintained at the starting temperature until the solution temperature remains constant. In the invention, it is preferable that the viscosity at 40° C. is from 1 to 400 Pa·S and the dynamic storage elastic modulus at 15° C. is 500 Pa or above. It is still preferable that the viscosity at 40° C. is from 10 to 200 Pa·S and the dynamic storage elastic modulus at 15° C. is 100 to 1,000,000 Pa. Moreover, a higher dynamic storage elastic modulus is preferred at a low temperature. In the case where the metallic support in the casting section is −5° C., for example, the dynamic storage elastic modulus at −5° C. preferably ranges from 10,000 to 1,000,000 Pa·S. In the case where the metallic support in the casting section is −50° C., the dynamic storage elastic modulus at −50° C. preferably ranges from 10,000 to 5,000,000 Pa·s.

The characteristic of the present invention resides in that the specific cellulose acylate as defined above is used and thus a dope having a high concentration can be obtained. Thus, a cellulose acylate solution having a high concentration and an excellent stability can be obtained without resort to concentration. To further facilitate the dissolution, the cellulose acylate may be dissolved at a low concentration and then concentrated using a concentration means. The concentration method is not specifically restricted. For example, use may be made of a method which comprises supplying a solution with a low concentration between a cylinder and an outer rotational periphery of rotational blades rotating therein in the peripheral direction and varying the temperature in the solution so as to evaporate a solvent, thereby giving a solution having a high concentration (see, for example, JP-A-4-25911), and a method which comprises jetting a heated solution with a low concentration from a nozzle into a container, flash-evaporating a solvent until the solution hits against the inner wall of the container, withdrawing the solvent vapor from the container and then drawing a solution having a high concentration from the bottom of the container (see, for example, U.S. Pat. No. 2,541,012, U.S. Pat. No. 2,858,229, U.S. Pat. No. 4,414,341 and U.S. Pat. No. 4,505,355).

Before the casting, it is preferable to filter the solution with the use of an appropriate filter material made of, for example, a metallic wire or flannel to thereby eliminate undissolved materials and foreign matters such as dirt and impurities. To filter the cellulose acylate solution, it is preferable to use a filter having an absolute filtration precision of from 0.1 to 100 µm, still preferably to use a filter having an absolute filtration precision of from 0.5 to 25 µm. The thickness of the filter is preferably from 0.1 to 10 µm, still preferably from 0.2 to 2 µm. In this case, it is preferable to perform the filtration under a filtration pressure of 1.6 MPa or lower, still preferably 1.2 MPa or lower, still preferably 1.0 MP or lower and particularly preferably 0.2 MPa or lower. As the filter material, it is preferable to use publicly known materials such as glass fiber, cellulose fiber, filter paper or a fluororesin such as ethylene tetrafluoride resin. Among all, ceramics and metals are preferably used therefor. The viscosity of the cellulose acylate solution immediately before the film-forming may fall within a range allowing casting in the film-forming. In usual, it is preferable to control the viscosity to 10 Pa·S to 2000 Pa·S, still preferably 40 Pa·S to 500 Pa·S and still preferably 40 Pa·S to 500 Pa·s. Although the temperature in this step is not particularly restricted so long as being the casting temperature, it preferably ranges from −5 to +70° C. and still preferably from −5 to +55° C.

{Film-forming}

The cellulose acylate film according to the invention can be obtained by film-forming with the use of the cellulose acylate solution as described above. Concerning a film-forming method and apparatus, use can be made of the solvent cast film-forming method and a solvent cast film-forming apparatus conventionally employed in forming cellulose acylate films. A dope (a cellulose acylate solution) prepared in a dissolution machine (pot) is once stored in a storage pot and, after defoaming, the dope is subjected to the final preparation. Then the dope is discharged from a dope exhaust and fed into a pressure die via, for example, a pressure constant-rate pump whereby the dope can be fed at a constant rate at a high accuracy depending on the rotational speed. From the pipe sleeve (slit) of the pressure die, the dope is uniformly cast onto a metallic support continuously running in the casting section. At the peeling point where the metallic support has almost rounded, the half-dried dope film (also called a web) is peeled from the metallic support. The obtained web is clipped at both ends and dried by carrying with a tenter while maintaining the width at a constant level. Subsequently, it is carried with rolls in a dryer to terminate the drying and then wound with a winder in a definite length. Combination of the tenter and the rolls in the dryer may vary depending on the purpose. In the solvent cast film-forming method to produce a functional protective film for electronic display, a coater is frequently employed, in addition to the solvent cast film-forming apparatus, so as to process the film surface by providing, for example, an undercoating layer, an antistatic layer, an anti-halation layer or a protective layer. Next, each of the production steps will be briefly illustrated, though the invention is not restricted thereto.

In forming a cellulose acylate film by the solvent cast method, the cellulose acylate solution (dope) thus prepared is first cast on a drum or a band and the solvent is evaporated to give a film. Before the casting, it is preferable to control the concentration of the dope to give a solid content of form 5 to 40% by weight. It is preferable that the drum or band surface has been planished. It is preferable that the dope is cast on a drum or a band having a surface temperature of 30° C. or lower and a metallic support temperature of from −10 to 20° C. is particularly preferred. In the invention, it is also possible to employ the methods described in JP-A-2000-301555, JP-A-2000-301558, JP-A-07-032391, JP-A-03-193316, JP-A-05-086212, JP-A-62-037113, JP-A-02-276607, JP-A-55-014201, JP-A-02-111511 and JP-A-02-208650.

{Layered Casting}

A cellulose acylate solution may be cast as a single layer solution on a smooth band or a drum employed as a metallic support. Alternatively, plural cellulose acylate solutions may be cast in two or more layers. In the case of casting plural cellulose acylate solutions, individual solutions may be cast from plural casting ports provided on the metallic support along the flow direction at certain intervals and laminated to give a film. For example, use can be made therefor of the methods described in JP-A-61-158414, JP-A-1-122419 and JP-A-11-198285. Alternatively, cellulose acylate solutions may be cast from two casting ports to form a film. For example, use can be made therefor of the methods described in JP-B-60-27562, JP-A-61-94724, JP-A-61-947245, JP-A-61-104813, JP-A-61-158413 and JP-A-6-134933. It is also possible to adopt the cellulose acylate film casting method reported in JP-A-56-162617 which comprises wrapping a high-viscosity cellulose acylate solution flow in a low-viscosity cellulose acylate solution and extruding both of these high-viscosity and low-viscosity cellulose acylate solutions at the same time. Moreover, it is also a preferred embodiment to employ the methods of JP-A-61-94724 and JP-A-61-94725 in which an outer solution contains an alcoholic solvent, i.e., a poor solvent in a larger amount than the inner solution. It is also possible to employ the method of, for example, JP-B-44-20235 which comprises using two casting ports, peeling a film formed on a metallic support from the first casting port and then effecting the second casting in the side being in contact with the metallic support face to construct a film. The cellulose acylate solutions to be cast may be either the same or different without particular restriction. To impart functions to plural cellulose acylate layers, cellulose acylate solutions appropriate for respective functions may be extruded from the corresponding ports. It is also possible to cast the cellulose acylate solution simultaneously with other functional layers (for example, an adhesive layer, a dye layer, an antistatic layer, an anti-halation layer, an ultraviolet absorbing layer and a polarizing layer).

To achieve a desired film thickness by using a conventional single layer solution, it is necessary to extrude a cellulose acylate solution having a high concentration and a high viscosity. In this case, the poor stability of the cellulose acylate solution frequently causes problems such as machine troubles due to the formation of solid matters and surface irregularities. These problems can be overcome by casting plural cellulose acylate solutions from casting ports. Thus, highly viscous solutions can be simultaneously extruded on the metallic support and thus an excellent film having improved surface smoothness can be obtained. In addition, use of thick cellulose acylate solutions contributes to the reduction in the drying load and, in its turn, the film can be produced at an elevated speed. In the case of the simultaneous casting, the inner thickness and the outer thickness are not particularly restricted. It is preferable that the outer thickness amounts to 1 to 50%, still preferably 2 to 30%, of the total thickness. In the case of simultaneous casting of three or more layers, the total film thickness of the layer being in contact with the metallic support and the layer being in contact with the atmosphere is defined as the outer thickness. In the simultaneous casting, it is also possible to simultaneously cast cellulose acylate solutions differing from each other in the concentrations of additives such as a plasticizer, an ultraviolet absorbing agent and a matting agent as described above to form a cellulose acylate film of a laminated structure. For example, a cellulose acylate film composed of a skin layer/a core layer/a skin layer can be formed thereby. For example, a matting agent can be added in a larger amount to the skin layers or exclusively to the skin layers. A plasticizer and an ultraviolet absorbing agent may be added in larger amounts to the core layer than to the skin layer or exclusively to the core layer. It is also possible to use different types of plasticizers or ultraviolet absorbing agents to the core layer and the skin layers. For example, a less volatile plasticizer and/or ultraviolet absorbing agent are added to the skin layers, while a plasticizer having an excellent plasticizing effect or an ultraviolet absorbing agent showing favorable ultraviolet absorption properties may be added to the core layer. It is also a preferred embodiment to add a peeling accelerator exclusively to the skin layer in the metallic support side. Since the solution is gelled by cooling the metallic support by the cooling drum method, it is also preferred to add an alcohol, i.e., a poor solvent in a larger amount to the skin layers. The skin layers and the core layer may have different Tgs. It is preferable that the Tg of the core layer is lower than the Tg of the skin layer. Also, the skin layers and the core layer may show different viscosities of the cellulose acylate solutions in the casting step. It is preferable that the viscosity of the skin layers is lower than the viscosity of the core layer, though the viscosity of the core layer may be lower than the viscosity of the skin layers.

{Casting}

Examples of the method of casting a solution include a method wherein a prepared dope is uniformly extruded from a pressure die to a metallic support, a method with the use of a doctor blade wherein a dope once cast on a metallic support is treated with a blade to control the film thickness, and a method with the use of a reverse roll coater wherein the film is controlled with a coater rotating in the reverse direction. The pressure die method is favorable. There have been known pressure dies of coat hunger type and T-die type and each of them can be preferably employed. In addition to the methods cited above, use can be made of various methods for forming films by casting cellulose acylate solutions which have been conventionally known. By setting conditions while considering the differences in boiling point among solvents employed, effects similar to reported in the documents can be established. As the continuously ruing metallic support to be used in forming the cellulose acylate film according to the invention, use may be made of a drum having chromplated and planished surface or a stainless belt (also called a band) having polished and planished surface. To produce the cellulose acylate film according to the invention, one or more pressure dies may be provided above the metallic support. It is preferred to employ one or two pressure dies. In the case of providing two or more pressure dies, the dope to be cast may be divided into portions in various amounts appropriate for individual dies. It is also possible to fed the dope in various amounts into the dies by using plural precise constant-rate pumps. The temperature of the cellulose acylate solution to be cast preferably ranges from −10 to 55° C., still preferably from 25 to 50° C. The temperature may be maintained at the same level throughout the process or vary from step to step. In the case of varying, the temperature should attain the desired level immediately before the casting.

{Drying}

On the metallic support relating to the production of the cellulose acylate film, the dope is dried generally by the method of blowing a hot air stream from the front face side of the metallic support (a drum or a belt), i.e., the web surface on the metallic support, the method of blowing a hot air stream form the back face of the drum or the belt, or the liquid heat transfer method comprising bringing a temperature-controlled liquid into contact with the belt or the drum from the back face (i.e., the opposite face of the dope casting face), thus heating the drum or the belt by heat-transfer and controlling the surface temperature. The back face liquid heat transfer method is favorable. Before the casting, the surface temperature of the metallic support may be at an arbitrary level so long as it is not higher than the boiling points of the solvents employed in the dope. To facilitate the drying or reduce the fluidity on the metallic support, it is preferable to set the surface temperature to a level lower by 1 to 10° C. than the boiling point of a solvent having the lowest boiling point among the solvents employed, which would not apply to the case where the dope having been cast is stripped without cooling and drying.

{Stretching}

The retardation of the cellulose acylate film according to the invention can be controlled by stretching. More aggressively, it is also pointed out to stretch in the lateral direction by, for example, JP-A-62-115035, JP-A-4-152125, JP-A-4-284211, JP-A-4-298310 and JP-A-11-48271. In these methods, an obtained film is stretched in order to elevate the retardation value in the cellulose acylate film plane.

The film is stretched at room temperature or under heating. It is preferable that the heating temperature is the glass transition temperature of the film ±20° C., still preferably ±17° C. and still preferably ±15° C. The film may be stretched either uniaxially (in the longitudinal or lateral direction) or biaxially. The stretching ratio is from 1 to 200%, preferably from 1 to 100% and particularly preferably from 1 to 50%. Concerning the double refraction of the optical film, it is preferable that the refractive index in the lateral direction exceeds the refractive index in the longitudinal direction. Namely, it is preferable to stretch the film at a higher ratio in the lateral direction. The stretching may be carried out in the course of the film-forming. Alternatively, a raw film may be stretched after film-forming and winding. In the former case, the film containing the solvent remaining therein may be stretched. The stretching can be favorably performed at a residual solvent content of from 2 to 30%.

The film thickness of the cellulose acylate film according to the invention obtained after drying varies depending on the purpose of use. It preferably ranges from 5 to 500 μm, still preferably from 20 to 300 μm, still preferably from 30 to 180 μm, particularly preferably from 40 to 180 μm and still particularly preferably from 40 to 150 μm. To use in a VA liquid crystal display, it is preferable that the film thickness is from 40 to 100 μm.

On the other hand, it is also preferable to adjust the film thickness to 110 to 180 μm. When the film thickness falls within this range, the film scarcely allows the transmission of water vapor, which is advantageous and favorable in, for example, a polarizing plate durability test performed at 60° C. and 95% RH for 500 hours. The optical characteristics are improved in proportion to the film thickness while the water vapor permeability is in reverse proportion to the film thickness. It is therefore anticipated that the water vapor permeability lowered with an increase in the film thickness.

The film thickness may be regulated by controlling the concentration of solid matters contained in the dope, the slit gap at the die sleeve, the extrusion pressure form the die and the speed of the metallic support. The width of the cellulose acylate film thus obtained is preferably from 0.5 to 3 m, still preferably from 0.6 to 2.5 and still preferably from 0.8 to 2.2 m. It is preferable to wind the film in a length of from 100 to 10000 m per roll, still preferably from 500 to 7000 m and still preferably from 1000 to 6000 m. In the winding step, it is preferable to provide a knurling at least at one end and the width thereof preferably ranges from 3 mm to 50 mm and still preferably from 5 mm to 30 mm, while the height thereof preferably ranges from 0.5 to 500 μm and still preferably from 1 to 200 μm. Knurling may be made either at one end or both ends.

It is preferable that the fluctuation in the total width $Re_{(633)}$ is ±5 nm, still preferably ±3 nm. The fluctuation in $Rth_{(633)}$ is preferably ±10 nm and still preferably ±5 nm. It is also preferable that fluctuations in the Re value and the Rth value in the longitudinal direction also fall within the same scopes as in the lateral direction.

{Optical Characteristics of Cellulose Acylate Film}

To enlarge a viewing angle in a liquid crystal display, in particular, a liquid crystal display of VA mode, it is preferable that the Re retardation value and the Rth retardation value, which are represented by the following formulae (III) and (IV), fulfill the following formulae (V) and (VI):

$$Re(\lambda)=(nx-ny)\times d \quad (III)$$

$$Rth(\lambda)=\{(nx+ny)/2-nz\}\times d \quad (IV)$$

$$30 \text{ nm} \leq Re_{(633)} \leq 200 \text{ nm} \quad (V)$$

$$70 \text{ nm} \leq Rth_{(633)} \leq 400 \text{ nm}. \quad (VI)$$

In these formulae, $Re(\lambda)$ is a retardation value in a film plane of the cellulose acylate film at a wavelength of λ nm, and the retardation value is expressed in nm; $Rth(\lambda)$ is a retardation value in a direction perpendicular to the film plane at the wavelength of λ nm, and the retardation value is expressed in nm; nx is a refractive index along a slow axis in the film plane; ny is a refractive index along a fast axis in the film plane; nz is a refractive index along the direction perpendicular to the film plane; and "d" is a film thickness of the cellulose acylate film.

$Re(\lambda)$ is measured by the incidence of a light having a wavelength λ nm in a normal direction normal of the film with the use of KOBRA 21 ADH (manufactured by OJI KEISOKU KIKI). $Rth(\lambda)$ is determined by using a presumptive average refractive index 1.48 and the film thickness based on retardation values measured in three directions, i.e., $Re(\lambda)$ as described above, a retardation value measured by the incidence of the light having the wavelength of λ nm in a direction inclining at an angle of +40° to the normal direction of the film using the slow axis in the plane as the incline angle, and a retardation value measured by the incidence of the light having the wavelength of λ nm in a direction inclining at an angle of −40° to the normal direction of the film using the slow axis in the plane as the incline angle.

It is still preferable that the Re retardation value fulfills 30 nm $\leq Re_{(633)} \leq$ 100 nm.

It is also preferable that the cellulose acylate film according to the invention fulfills the following formula (VII), since a viewing angle in a liquid crystal display of VA mode can be further enlarged thereby.

$$230 \text{ nm} \leq Rth_{(633)} \leq 300 \text{ nm}. \quad (VII)$$

From the viewpoint of lessening color change of a liquid crystal display with the passage of time, it is preferable in the cellulose acylate film according to the invention that the difference between the Re value at 25° C. and 10% RH and the Re value at 25° C. and 80% RH, i.e., ΔRe (=Re10% RH−Re80% RH) is from 0 to 10 nm and the difference between the Rth value at 25° C. and 10% RH and the Rth value at 25° C. and 80% RH, i.e., ΔRth (=Rth10% RH−Rth80% RH) is from 0 to 30 nm.

Moreover, it is preferable in the cellulose acylate film according to the invention that the $Re_{(633)}$ and $Rth_{(633)}$ values at 25° C. and 60% RH fulfill the following formulae (A) to (C):

$$46 \leq Re_{(633)} \leq 150 \quad (A)$$

$$Rth_{(633)}=a-5.9Re_{(633)} \quad (B)$$

$$580 \leq a \leq 670. \quad (C)$$

In the above formulae, $Re_{(633)}$ is a retardation value in a film plane of the cellulose acylate film at a wavelength of 633 nm, and the retardation value is expressed in nm; $Rth_{(633)}$ is a retardation value by nm in a direction perpendicular to the film plane at the wavelength of 633 nm, and the retardation value is expressed in nm; and "a" is an adjustable parameter of optical characteristics, and the adjustable parameter is expressed in nm.

"a" is an adjustable parameter of Re and Rth, and $590 \leq a \leq 660$ is preferable and $600 \leq a \leq 650$ is still preferable. It is preferable that a falls within the above range, since the viewing characteristics of vertical alignment liquid crystal display can be thus enlarged.

From the viewpoint of lessening color change of a liquid crystal display with the passage of time, it is also preferable in the cellulose acylate film according to the invention the equilibrium moisture content at 25° C. and 80% RH is preferably 3.2% or less, more preferably 3.1% or less, and still more preferably 3.0% or more.

The moisture content is measured by the Karl Fischer method with the use of a sample (7 mm×35 mm) of the cellulose acylate according to the invention, a moisture content meter and a sample dryer (CA-03, VA-05 both manufactured by MITSUBISHI CHEMICAL CO.). The water content (g) is divided by the sample weight (g).

From the viewpoint of lessening color change of a liquid crystal display with the passage of time, it is also preferable in the cellulose acylate film according to the invention that the water vapor permeability (in terms of 80 μm in film thickness) is preferably from 400 g/m²·24 hr to 1800 g/m²·24 hr, more preferably from 400 g/m²·24 hr to 1750 g/m²·24 hr, and still more preferably from 400 g/m²·24 hr to 1700 g/m²·24 hr in the case of allowed to stand at 60° C. and 95% RH for 24 hours.

The water vapor permeability is lowered with an increase in the film thickness of a cellulose acylate film and elevated with a decrease in the film thickness. It is therefore necessary to convert the water vapor permeability of any sample by setting a standard film thickness of 80 μm. The film thickness is calculated as follows: (water vapor permeability converted as film thickness of 80 μm=measured water vapor permeability×measured film thickness (μm)/80 μm).

Water vapor permeability can be measured in accordance with the method described in *Kobunshi no Bussei II (Kobunshi Jikken Koza* 4, *Kyoritsu Shuppan)*, p. 285-294: *Joki Toka Ryo no Sokutei (Shituryo Ho, Ondokei Ho, Jokiatsu Ho, Kyuchaku Ho)*.

Glass transition temperature is measured as follows. A sample (5 mm×30 mm) of the cellulose acylate film according to the invention in an unstretched state is conditioned at 25° C. 60% RH for 2 hours or longer and then the glass transition temperature is measured with a dynamic viscoelasticity meter (VIBRON: DVA-225 manufactured by IT KEISOKUSEI-GYO K.K.) at a sample length between grips of 20 mm, at a heating rate of 2° C./min, over a measurement temperature range of from 30° C. to 200° C. and at a frequency of 1 Hz. In a graph having storage elastic modulus as the logarithmic ordinate and temperature (° C.) as the linear abscissa, a line 1 (solid region) and a line 2 (glass transition region) showing a rapid decrease in storage elastic modulus observed at the conversion from the solid region to the glass transition region are drawn. Thus, the intersection of the lines 1 and 2 indicates the temperature from which the storage elastic modulus is rapidly lowered and softening of the film starts. Since the conversion into the glass transition region starts at this point, the temperature is referred to as the glass transition temperature Tg (dynamic viscoelasticity). The grass transition temperature of the cellulose acylate film according to the invention is preferably from 70 to 400° C., more preferably from 70 to 200° C., and still more preferably from 70 to 150° C.

Elastic modulus is measured as follows. A sample (10 mm×150 mm) of the cellulose acylate film according to the invention is conditioned at 25° C. and 60% RH for 2 hours or longer and then the elastic modulus is measured with a tensile test machine (STROGRAPHY R2 manufactured by TOYO SEIKI KOGYO Co.) at a distance between chucks of 100 mm, at a temperature of 25° C. and at a stretching speed of 10 mm/min. The elastic modulus of the cellulose acylate film according to the invention is preferably from 1500 to 4000 MPa, more preferably from 1500 to 3500 MPa, and still more preferably from 1500 to 3000 MPa.

It is also preferable that the cellulose acylate according to the invention has a haze of preferably 0.01 to 2%, more preferably 0.01 to 1.9%, and still more preferably 0.01 to 1.5%. Haze is measured as follows.

Namely, haze is measured by using a sample (40 mm×80 mm) of the cellulose acylate film according to the invention in accordance with the method defined in JIS K-6714 at 25° C. and 60% RH with the use of a haze meter (HGM-2DP manufactured by SUGA SHIKENKI).

It is also preferable that the cellulose acylate film according to the invention shows a weight change of preferably 0 to 5%, more preferably 0 to 4.5, and still more preferably 0 to 4% in the case of allowed to stand at 80° C. and 90% RH for 48 hours.

It is also preferable that the cellulose acylate film according to the invention shows a dimensional change of preferably 0 to 5%, more preferably 0 to 4%, and still more preferably 0 to 3% in each of the cases of allowed to stand at 60° C. and 95% RH for 24 hours and allowed to stand at 90° C. and 50% RH for 24 hours.

From the viewpoint of lessening color change of a liquid crystal display with the passage of time, it is also preferable that the cellulose acylate film according to the invention has a photoelastic coefficient of preferably $50×10^{-3}$ cm$^2$/dyne or less, more preferably $40×10^{-3}$ cm$^2$/dyne or less, and still more preferably $30×10^{-3}$ cm$^2$/dyne or less.

Photoelastic coefficient is measured by applying a tensile stress in the longitudinal direction to a sample (10 mm×100 mm) of the cellulose acylate film according to the invention and measuring the retardation with an ellipsometer (M150 manufactured by JASCO ENGINEERING). Then the photoelastic coefficient is calculated based on the change in retardation due to the stress.

<Polarizing Plate>

Next, the polarizing plate according to the invention will be illustrated.

In the polarizing plate according to the invention, at least one cellulose acylate film according to the invention as described above is employed as a protective film for a polarizer.

In usual, a polarizing plate comprises a polarizer and a protective film provided on both side of the polarizer. In the present invention, the cellulose acylate film according to the invention is used as at least one of protective films. As the other protective film, use may be made of either the cellulose acylate film according to the invention or a commonly employed cellulose acylate film. Examples of the polarizer include an iodine polarizer, a dye polarizer using a dichromatic dye and a polyene polarizer. The iodine polarizer and the dye polarizer are generally prepared from polyvinyl alcohol films. In the case of using the cellulose acylate film according to the invention as a protective film for a polarizing plate, the polarizing plate may be constructed by a commonly employed method without restriction. For example, use can be made of a method comprising treating the obtained cellulose acylate film with an alkali and stuck (or bonded) to both faces of a polarizer, which has been formed by immersing a polyvinyl alcohol film in an iodine solution and stretching, with the use of an aqueous solution of completely saponified polyvinyl alcohol. As a substitute for the alkali treatment, it is also possible to employ an easy adhesion processing as described in JP-A-6-94915 and JP-A-6-118232. As an adhesive to be used in bonding the treated face of the protective film to the polarizer, use may be made of, for example, polyvinyl alcohol-based adhesives such as polyvinyl alcohol and polybutyral and vinyl-based latexes such as butyl acrylate. The polarizing plate is composed of the polarizer and the protective film protecting both faces thereof. It may further have a separate film on the opposite face. The protect film and the separate film are employed in order to protect the polarizing plate during shipment, product inspection and other steps. In this case, the protective film, which aims at protecting the surface of the polarizing plate, is bonded to the face opposite to the face to be bonded to a liquid crystal plate. On the other hand, the separate film, which aims at covering the adhesive layer to be boned to the liquid crystal plate, is bonded to the face of the polarizing plate to be bonded to the liquid crystal face.

As FIG. 1 shows, it is preferable that the cellulose acylate film according to the invention is bonded to a polarizer so that the transmission axis of the polarizer agrees with the slow axis of the cellulose acylate film according to the invention (TAC1 in FIG. 1).

In the case where the orthogonal accuracy of the slow axis of the cellulose acylate film according to the invention to the absorption axis (being orthogonal to the transmission axis) of the polarizer exceeds 1°, a polarizing plate constructed under cross Nicols suffers from lowering in polarization degree performance and, in its turn, light leaks. By combining such a polarizing plate with a liquid crystal cell, it is impossible to attain a sufficient black level or contrast. It is therefore favorable that the deviation in angle between the direction of the main refractive index nx of the cellulose acylate film according to the invention and the direction of the transmission axis of the polarizing plate is not more than 1°, still preferably not more than 0.5°.

It is preferable that the polarizing plate according to the invention fulfills at least one of the following formulae (a) to (d):

$$40.0 \leq TT \leq 45.0 \tag{a}$$

$$30.0 \leq PT \leq 40.0 \tag{b}$$

$$CT \leq 2.0 \tag{c}$$

$$95.0 \leq P \tag{d}$$

wherein TT represents a single plate transmittance at 25° C. and 60% RH; PT represents a parallel transmittance at 25° C. and 60% RH; CT represents a cross transmittance at 25° C. and 60% RH; and P represents a polarization degree at 25° C. and 60% RH.

It is still preferable that single plate transmittance TT, the parallel transmittance PT, the cross transmittance CT respectively fulfill the following relationships: $40.5 \leq TT \leq 45$, $32 \leq PT \leq 39$ and $CT \leq 1.5$, still preferably $41.0 \leq TT \leq 44.5$, $34 \leq PT \leq 39.0$ and $CT \leq 1.3$, respectively. The degree of polarization is preferably 95.0% or more, still protective film 96.0% or more and still preferably 97.0% or more.

It is preferable that the polarizing plate according to the invention fulfills at least one of the following formulae (e) to (g):

$$T(380) \leq 2.0 \tag{e}$$

$$T(410) \leq 1.0 \tag{f}$$

$$T(700) \leq 0.5 \tag{g}$$

wherein $T(\lambda)$ represents a cross transmittance at a wavelength of $\lambda$ nm.

It is still preferable that the polarizing plate according to the invention fulfills at least one of $T(380) \leq 1.95$, $T(410) \leq 0.9$ and $T(700) \leq 0.49$, and more still preferable that the polarizing plate according to the invention fulfills at least one of $T(380) \leq 1.90$, $T(410) \leq 0.8$ and $T(700) \leq 0.48$.

It is preferable that the polarizing plate of the present invention fulfills at least one of the following formulae (j) and (k):

$$-6.0 \leq \Delta CT \leq 6.0 \tag{j}$$

$$-10.0 \leq \Delta P \leq 0.0 \tag{k}$$

wherein $\Delta CT$ and $\Delta P$ represents a change in cross transmittance and polarization degree, respectively, in a test that the polarizing plate is allowed to stand at 60° C. and 95% RH for 500 hours; and the change means a value calculated by subtracting a measurement value before the test from a measurement value after the test.

$-5.8 \leq \Delta CT \leq 5.8$ and $-9.5 \leq \Delta P \leq 0.0$ are still preferable, and $-5.6 \leq \Delta CT \leq 5.6$ and $-9.0 \leq \Delta P \leq 0.0$ are still preferable.

It is preferable that the polarizing plate of the present invention fulfills at least one of formulae (h) and (i):

$$-6.0 \leq \Delta CT \leq 6.0 \tag{h}$$

$$-10.0 \leq \Delta P \leq 0.0 \tag{i}$$

wherein $\Delta CT$ and $\Delta P$ represents a change in cross transmittance and polarization degree, respectively, in a test that the polarizing plate is allowed to stand at 60° C. and 90% RH for 500 hours.

(It is preferable that the polarizing plate of the present invention fulfills at least one of formulae (l) and (m):

$$-6.0 \leq \Delta CT \leq 6.0 \tag{l}$$

$$-10.0 \leq \Delta P \leq 0.0 \tag{m}$$

+wherein $\Delta CT$ and $\Delta P$ represents a change in cross transmittance and polarization degree, respectively, in a test that the polarizing plate is allowed to stand at 80° C. for 500 hours.

The single plate transmittance TT, the parallel transmittance PT and the cross transmittance CT of the polarizing plate are measured by using UV3100PC (manufactured by SHIMZDZU CORPORATION) within a range of 380 nm to 780 nm. In each of TT, PT and CT, the mean of values measured 10 times (mean within a range of 400 nm to 700 nm) is adopted. The polarizing plate durability test is carried out in two modes including (1) the polarizing plate alone and (2) the polarizing plate bonded to a glass plate via a pressure-sensitive adhesive. To measure the polarizing plate alone, two samples each having the cellulose acylate film according to the invention inserted between two polarizers are prepared and located orthogonally. In the mode of bonding the polarizing plate to a glass plate, two samples (about 5 cm×5 cm) each having the polarizing plate bonded to the glass plate in such a manner that the cellulose acylate film according to the invention is in the glass plate side are prepared. The single plate transmittance is measured by setting the film side of the samples toward a light source. Two samples are measured respectively and the mean is referred to as the transmittance of single plate.

{Surface Treatment}

If necessary, the cellulose acylate film according to the invention may be surface-treated to thereby improve the adhesion thereof to various functional layers (for example, an undercoating layer and a back layer). As the surface treatment, use can be made of glow discharge treatment, ultraviolet irradiation treatment, corona discharge treatment, flame treatment and acid- or alkali-treatment. The glow discharge treatment as used herein may be either low-temperature plasma treatment under a low gas pressure of $10^{-3}$ to 20 Torr or plasma treatment under atmospheric pressure. Examples of a plasma excitation gas, which is a gas plasma excited under the above conditions, include argon, helium, neon, krypton, xenon, nitrogen, carbon dioxide, chlorofluorocarbons such as tetrafluoromethane and mixtures thereof. These gases are described in detail in Japan Institute of Invention and Innovation Journal of Technical Disclosure No. 2001-1745 (2001 Mar. 15, Japan Institute of Invention and Innovation), p. 30 to 32. In the plasma treatment under atmospheric pressure attracting public attention in recent years, use is made of irradiation energy of, for example, from 20 to 500 Kgy under 10 to 1000 KeV, still preferably from 20 to 300 Kgy under 30 to 500 Kev. Among these treatments, alkali saponification is particularly favorable because of being highly effective as a surface treatment of a cellulose acylate film.

The alkali saponification treatment is preferably carried out by directly dipping the cellulose acylate film in a tank containing a saponification solution or coating the cellulose acylate film with a saponification solution. Examples of the coating method include dip coating, curtain coating, extrusion coating, bar coating and extrusion slide coating. As the solvent of the alkali saponification coating solution for coating the cellulose acylate film with the saponification solution, it is preferable to select a solvent which has an excellent wettability and is capable of maintaining the film face in a favorable state without causing any irregularity on the cellulose acylate film surface. More specifically speaking, an alcoholic solvent is preferred and isopropyl alcohol is still preferred. It is also possible to employ an aqueous solution of a surfactant as the solvent. As the alkali in the alkali saponification coating solution, an alkali soluble in the above solvent is preferable and KOH or NaOH is still preferable. The saponification coating solution preferably has a pH value of 10 or higher, still preferably 12 or higher. The alkali saponification reaction is carried out preferably for 1 second to 5 minutes, still preferably for 5 seconds to 5 minutes and particularly preferably for 20 seconds to 3 minutes. After the alkali saponification reaction, it is preferable to wash the face coated with the saponification solution with water or an acid followed by washing with water.

Figure 2:
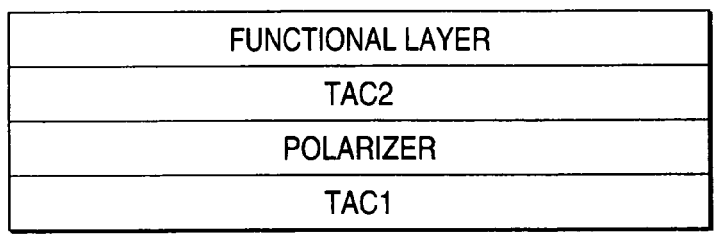
FIG. 2 is a sectional view schematically showing a sectional structure of the polarizing plate according to the invention.

It is preferable that the polarizing plate according to the invention has at least one of a hard coat layer, an antiglare layer and an antireflective layer provided on the surface of a protective film on the other side of the polarizing plate. As FIG. 2 shows, namely, it is preferable that a protective film (TAC2) provided in the opposite side of the polarizing plate to a liquid crystal cell when employed in a liquid crystal display has a functional layer such as an antireflective layer. It is preferable to provide at least one of a hard coat layer, an antiglare layer and an antireflective as such a functional layer. It is unnecessary to form individual layers separately. For example, it is possible to impart the function as the antiglare layer to the antireflective layer or the hard coat layer so as to make the antireflective layer to serve both as the antireflective layer and the antiglare layer.

<Antireflective Layer>

It is appropriate in the invention to employ an antireflective layer having a light scattering layer and a lower refractive index layer superposed in this order on a protective film, or an antireflective layer having a medium refractive index layer, a higher refractive index layer and a lower refractive index layer superposed in this order on a protective film. Next, preferable examples thereof will be illustrated.

{Antireflective Layer Having Light Scattering Layer and Lower Refractive Index Layer on Protective Film}

Now, a preferable example of an antireflective layer having light scattering layer and lower refractive index layer on protective film will be described.

It is preferable that the light scattering layer contains matting particles. It is preferable that the refractive index of the part of the light scattering layer other than the matting particles ranges from 1.50 to 2.00. It is also preferable that the refractive index of the lower refractive index layer ranges from 1.20 to 1.49. In the invention, the light scattering layer also has antiglare and hard coat properties. It may be composed of either a single layer or plural layers such as 2 to 4 layers.

To achieve a sufficient antiglare performance and a uniform matting appearance observed with the naked eye, it is preferable that the antireflective layer has such surface irregularity as expressed in an average central roughness Ra of from 0.08 to 0.40 µm, an average 10 score roughness not more than 10 times as much as Ra, an average valley distance Sm of from 1 to 100 µm, an standard deviation of the peak height measured from the deepest point of 0.5 µm or less, a standard deviation of the average peak-valley distance Sm based on the center line of 20 µm or less and the ratio of face with an incline angle of from 0 to 5° of 10% or more. Under a C light source, it is also preferable that reflective light shows tint values a* of from −2 to 2 and b* of from −3 to 3 and a ratio of the minimum refractive index to the maximum refractive index of from 0.5 to 0.99 within a range of from 380 nm to 780 nm. This is because a neutral tint of the reflective light can be thus obtained. It is also preferable that the b* value of transmitted light is from 0 to 3, since yellowness in white indication can be reduced thereby in the case of employing in an display. Furthermore, it is preferable that, in the case of inserting a lattice (120 µm×40 µm) between a face light source and the antireflective film according to the invention and brightness distribution is determined on the film, the standard deviation of the brightness distribution is 20 or less. This is because the glareness can be reduced thereby, when the film according to the invention is employed in an ultrafine panel.

Concerning optical characteristics, it is preferable that the antireflective layer usable in the invention has a specular reflectance of 2.5% or less, a transmittance of 90% or more and a 60° glossiness of 70% or less to thereby regulate reflection of external light and improve visibility. It is still preferable that the specular reflectance is 1% or less, most desirably 0.5% or less. To prevent glareness on an ultrafine LCD panel and reduce unsharpness in characters, it is preferable to achieve a haze of from 20% to 50%, an inner haze/total haze ratio of from 0.3 to 1, a difference (decrease) between the haze till the light scattering layer and the haze after the formation of the lower refractive index layer of not more than 15%, a transmission image clearness at a frame width of 0.5 mm of from 20% to 50% and a transmission ratio of perpendicular transmission light/the direction inclining by 2° to the perpendicular direction of from 1.5 to 5.0.

(Lower Refractive Index Layer)

The refractive index of the lower refractive index layer usable in the invention preferably ranges from 1.20 to 1.49, still preferably from 1.30 to 1.44. To achieve a lower refractive index, it is still preferred that the lower refractive index layer fulfills the following numerical formula (VIII):

$$(m\lambda 4) \times 0.7 < n1 d1 < (m\lambda 4) \times 1.3$$

In the above formula, m represents a positive odd number, n is the refractive index of the lower refractive index layer, and d1 is the film thickness (nm) of the lower refractive index layer. λ is a wavelength within a range of 500 to 550 nm.

Next, a material for forming the lower refractive index layer will be illustrated.

It is preferable that the lower refractive index layer contains a fluorinated polymer as a low refractive index binder. As the fluorinated polymer, it is preferable to employ a fluorine-containing polymer which has a coefficient of dynamic friction of from 0.03 to 0.20, a contact angle to water of form 90 to 120° and a sliding angle of pure water of 70° or less and which is crosslinked by heating or ionizing radiation. In the case of loading the polarizing plate according to the invention on an image display, a lower peeling force from a marketed adhesive tape is preferred, since a scratch pad or a seal bonded thereto can be easily stripped off. Namely, a peeling force measured with a tensile test machine of 500 gf or less is preferable, 300 gf or less is still preferable and 100 gf or less is most desirable. A higher surface hardness measured with a microhardness meter is preferred because of indicating the better scuff proofness. Namely, a surface hardness of 0.3 GPa or more is preferable and 0.5 GPa or more is still preferable.

Examples of the fluorinated polymer usable in the lower refractive index layer include products obtained by hydrolyzing or dehydration-condensing silane compounds having perfluoroalkyl group (for example, (heptadecafluoro-1,1,2,2-tetrahydrodecyl)triethoxysilane) and fluorinated copolymers having a fluorinated monomer unit and another constitutional unit for imparting crosslinking reactivity.

Examples of the fluorinated monomer include fluoroolefins (for example, fluoroethylene, vinylidene fluoride, tetrafluoroethylene, perfluorooctylethylene, hexafluoropropylene, perfluoro-2,2-dimethyl-1,3-dioxole), partly or completely fluorinated alkyl ester derivatives of (meth) acrylic acid (for example, BISCOAT 6FM manufactured by OSAKA ORGANIC CHEMICAL INDUSTRIES and M-2020 manufactured by DAIKIN) and completely or partly fluorinated vinyl ethers. Among all, perfluoroolefins are preferable and hexafluoropropylene is particularly preferred from the viewpoints of refractive index, solubility, transparency and availability.

Examples of the constitutional unit for imparting crosslinking reactivity include constitutional units obtained by polymerizing monomers having self-crosslinkable functional group in molecule such as glycidyl (meth)acrylate and glycidyl vinyl ether, constitutional units obtained by polymerizing monomers having carboxyl, hydroxy, amino and sulfo groups (for example, (meth)acrylic acid, methylol (meth)acrylate, hydroxyalkyl (meth)acrylates, acryl acrylate, hydroxyethyl vinyl ether, hydroxybutyl vinyl ether, maleic acid and crotonic acid), and constitutional units obtained by introducing crosslinkable groups such as (meth)acryloyl group to these constitutional units by a polymer reaction (the introduction can be made by, for example, treating hydroxy group with acrylic acid chloride).

In addition to the fluorinated monomer unit and the constitutional unit for imparting crosslinking reactivity, it is possible to optionally copolymerize a fluorine-free monomer form the viewpoint of, for example, transparency of the film. The monomer unit usable together is not particularly restricted and use can be made of, for example, olefins (for example, ethylene, propylene, isoprene, vinyl chloride and vinylidene chloride), acrylic acid esters (for example, methyl acrylate, ethyl acrylate and 2-ethylhexyl acrylate), methacrylic acid esters (for example, methyl methacrylate, ethyl methacrylate, butyl methacrylate and ethylene glycol dimethacrylate), styrene derivatives (for example, styrene, divinylbenzene, vinyltoluene and α-methylstyrene), vinyl ethers (for example, methyl vinyl ether, ethyl vinyl ether and cyclohexyl vinyl ether), vinyl esters (for example, vinyl acetate, vinyl propionate and vinyl cinnamate), acrylamides (for example, N-tert-butylacrylamide and N-cyclohexylacrylamide), methacrylamides and acrylonitrile derivatives.

The above-described polymers may be used together with appropriate hardening agents as described in JP-A-10-25388 and JP-A-10-147739.

(Light Scattering Layer)

The light scattering layer is formed in order to impart hard coat properties to the film to thereby improve the light diffusion properties due to surface scattering and/or inner scattering and scuff proofness of the film. Accordingly, the hard coat layer contains a binder for imparting the hard coat properties and matting particles for imparting the light diffusion properties, optionally together with an inorganic filler for elevating the refractive index, preventing shrinkage due to crosslinkage and improving the strength. Moreover, the light scattering layer thus formed also serves as an antiglare layer and, therefore, the polarizing plate is also provided with the antiglare layer.

To impart the hard coat properties, the film thickness of the light scattering layer preferably ranges from 1 to 10 μm, still preferably from 1.2 to 6 μm. In the case where the film is too thin, only insufficient hard coat properties can be obtained. In the case where the film is too thick, curling and fragility are worsened and the processing suitability becomes insufficient.

As the binder of the light scattering layer, it is preferable to use a polymer having a saturated hydrocarbon chain or a polyether chain as the main chain and a polymer having a saturated hydrocarbon chain is still preferable. It is also preferable that the binder polymer has a crosslinked structure. As the binder polymer having a saturated hydrocarbon chain, a polymer of an ethylenically unsaturated monomer is preferred. As the binder polymer having a saturated hydrocarbon chain and a crosslinked structure, a (co)polymer of monomer(s) having two or more ethylenically unsaturated bonds is preferable. To achieve a high refractive index of the binder polymer, it is possible to select a monomer having an aromatic ring or at least one atom selected from among halogen atoms other than fluorine, sulfur atom, phosphorus atom and nitrogen atom in its structure.

Examples of the monomer having two or more ethylenically unsaturated bonds include esters of polyhydric alcohol with (meth)acrylic acid (for example, ethylene glycol di(meth)acrylate, butanediol di(meth)acrylate, hexanediol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, dipentaerythritol hexa (meth)acrylate, pentaerythritol hexa(meth)acrylate, 1,2,3-cyclohexane tetramethacrylate, polyurethane polyacrylate and polyester polyacrylate), ethylene oxide-denatured derivatives thereof, vinyl benzene and its derivatives (for example, 1,4-divinyl benzene, 4-vinylbenzoic acid-2-acryloylethyl ester and 1,4-divinyl cyclohexanone), vinyl sulfones (for example, divinyl sulfone), acrylamides (for example, methylenebisacrylamide) and methacrylamides. Two or more of these monomers may be used together.

Specific examples of the monomer having high refractive index include bis(4-methacryloylthiophenyl) sulfide, vinyl naphthalene, vinyl phenyl sulfide and 4-methacryloyloxyphenyl-4'-methoxyphenyl thioether. It is also possible to use two or more of these monomers together.

Such a monomer having ethylenically unsaturated bonds can be polymerized by ionizing radiation or heating in the presence of a photo radical initiator or a heat radical initiator.

That is to say, a coating solution containing the monomer having ethylenically unsaturated bonds, a photo radical initiator or a heat radical initiator, matting particles and an inorganic filler is prepared. Then the coating solution is applied to a protective film and hardened by polymerization under ionizing radiation or heating. Thus, the light scattering layer can be formed. As the photo radical initiator, use can be made of publicly known ones.

As the polymer having polyether as the main chain, it is preferable to employ a ring-opening polymer of a polyfunctional epoxy compound. The ring-opening polymerization of the polyfunctional epoxy compound can be carried out by ionizing radiation or heating in the presence of a photo acid generator or a heat acid generator. That is to say, a coating solution containing the polyfunctional epoxy compound, a photo acid generator or a heat acid generator, matting particles and an inorganic filler is prepared. Then the coating solution is applied to a protective film and hardened by polymerization under ionizing radiation or heating. Thus, the light scattering layer can be formed.

It is also possible to use a monomer having a crosslinking functional group, as a substitute for the monomer having two or more ethylenically unsaturated bonds or in addition thereto, to thereby introduce the crosslinking functional group into the polymer. Thus, a crosslinked structure can be introduced into the binder polymer owing to the reaction of this crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. As a monomer for introducing a crosslinked structure, use can be also made of vinylsulfonic acid, acid anhydrides, cyanoacrylate derivatives, melamine, etherified methylol, esters and urethane and metal alkoxides such as tetramethoxysilane. It is also possible to use a functional group which shows crosslinking ability as the result of a decomposition reaction, for example, a blocked isocyanate group. Namely, the crosslinking functional group to be used in the invention may be either one showing an immediate reactivity or one showing a reactivity after decomposition.

The binder polymer containing such a crosslinking functional group can form a crosslinked structure by heating after the application.

To impart antiglare properties, the light scattering layer contains matting particles which are larger than the filler particles and have an average particle size of from 1 to 10 µm, preferably from 1.5 to 7.0 µm, such as particles of an inorganic compound or resin particles.

Specific examples of the matting particles include particles of inorganic compounds such as silica particles and $TiO_2$ particles; and resin particles such as acryl particles, crosslinked acryl particles, polystyrene particles, crosslinked styrene particles, melamine resin particles and benzoguanamine resin particles. Among all, crosslinked styrene particles, crosslinked acryl particles, crosslinked acryl styrene particles and silica particles are preferred. The matting particles may be either in a spherical or irregular shape.

Also, use can be made of two or more types of matting particles having different particle sizes. Thus, the matting particles having a larger particle size can impart antiglare properties, while the matting particles having a smaller particle size can impart other optical characteristics.

Concerning the particle size distribution of the matting particles as described above, monodistribution is most desirable. That is to say, it is preferred that the sizes of individual particles are as close as possible. In the case where particles having particle size larger by 20% or more than the average particle size are specified as coarse particles, for example, it is preferable that the content of these coarse particles is 1% or less of all particles, still preferably 0.1% or less and still preferably 0.01% or less. Matting particles having such a particle size distribution can be obtained by classifying particles after the completion of a usual synthesis reaction. Matting particles having a still preferable distribution can be obtained by performing the classification in an increased number or at an elevated level.

The matting particles are added to the light scattering layer so as to give a matting particle content in the light scattering layer of preferably from 10 to 1000 mg/m$^2$, still preferably form 100 to 700 mg/m$^2$.

The particle size distribution of the matting particles is measured by the Coulter counter method and the distribution thus measured is converted into the particle number distribution.

To elevate the refractive index of the layer, the light scattering layer preferably contains, in addition to the matting particles as described above, an inorganic filler which comprises oxide of at least one metal selected from among titanium, zirconium, aluminum, indium, zinc, tin and antimony and has an average particle size of 0.2 µm or less, preferably 0.1 µm or less and still preferably 0.06 µm or less.

To enlarge the difference in refractive index from the matting particles, on the contrary, it is also possible in a light scattering layer with the use of matting particles having a high refractive index to employ silicon oxide to thereby maintain the refractive index of the layer at a low level. The preferable particle size thereof is the same as the inorganic filler as described above.

Specific examples of the inorganic filler employed in the light scattering layer include $TiO_2$, $ZrO_2$, $Al_2O_3$, $In_2O_3$, $ZnO$, $SnO_2$, $Sb_2O_3$, ITO and $SiO_2$. $TiO_2$ and $ZrO_2$ are preferred from the viewpoint of elevating refractive index. It is also preferable that the inorganic filler is surface-treated by silane coupling or titanium coupling, and use is preferably made of a surface-treating agent having a functional group capable of reacting with the binder on the filler surface.

The content of such an inorganic filler is preferably from 10 to 90% based on the total weight of the light scattering layer, still preferably from 20 to 80% and particularly preferably from 30 to 75%.

Because of having a particle size sufficiently smaller than the light wavelength, the filler causes no scattering. Therefore, a dispersion having the filler dispersed throughout the binder polymer behaves as an optically homogeneous substance.

The bulk refractive index of the mixture of the binder with the inorganic filler in the light scattering layer is preferably from 1.50 to 2.00, still preferably from 1.51 to 1.80. The refractive index can be controlled within the range as specified above by appropriately selecting the types and contents of the binder and the inorganic filler. It can be easily understood through experiments how to select these materials.

To ensure an excellent plane uniformity free from, for example, coating irregularity, drying irregularity or defect spots, the light scattering layer contains a fluorinated surfactant, a silicone-based surfactant or both of them in the coating solution for forming light scattering layer. It is particularly preferable to employ a silicone-based surfactant, since it can exert effects of improving plane failures such as coating irregularity, drying irregularity or defect spots of the antireflective film according to the invention even in a smaller amount. Such surfactants are added in order to improve the plane uniformity while imparting suitability for high-speed coating to thereby elevate the productivity.

{Antireflective Layer Having Medium Refractive Index Layer, Higher Refractive Index Layer and Lower Refractive Index Layer on Protective Film}

Next, an antireflective layer having a medium refractive index layer, a higher refractive index layer and a lower refractive index layer laminated on a protective film in this order will be illustrated.

An antireflective layer at least having a medium refractive index layer, a higher refractive index layer and a lower refractive index layer (the outermost layer) laminated on a protective film in this order is designed so as to give a refractive index fulfilling the following relationship.

> refractive index of higher refractive index layer>refractive index of medium refractive index layer>refractive index of protective film>refractive index of lower refractive index layer Further, a hard coat layer may be provided between the protective film and the medium refractive index layer. It is also possible to employ the constitution of medium refractive index layer/hard coat layer/higher refractive index layer/lower refractive index layer.

Use may be made of antireflective layers described in, for example, JP-A-8-122504, JP-A-8-110401, JP-A-10-300902, JP-A-2002-243906 and JP-A-2000-111706.

Each layer may further have additional function(s). Examples thereof include a stainproof lower refractive index layer and an antistatic higher refractive index layer (see, for example, JP-A-10-206603 and JP-A-2002-243906).

The haze of the antireflective layer is preferably 5% or less, still preferably 3% or less. The strength of the film is preferably H or above, still preferably 2H or above and most desirably 3H or above, when determined by the pencil hardness test in accordance with JIS K5400.

(Higher Refractive Index Layer and Medium Refractive Index Layer)

In the antireflective layer, the layer having a high refractive index is made of a hardening film containing at least fine particles of an inorganic compound with a high refractive index having an average particle size of 100 nm or less and a matrix binder.

As the fine particles of an inorganic compound with a high refractive index, use can be preferably made of an inorganic compound having a refractive index of 1.65 or above, still preferably 1.9 or above. Examples thereof include oxides of Ti, Zn, Sb, Sn, Zr, Ce, Ta, La and In and complex oxides containing these metal atoms.

These fine particles can be obtained by, for example, treating the particle surface with a surfactant (for example, a silane coupling agent: JP-A-11-295503, JP-A-11-153703 and JP-A-2000-9908, an anionic compound or an organic metal coupling agent: JP-A-2001-310432), employing a core-shell structure with the use of high refractive index particles as the core (JP-A-2001-166104), or using together a specific dispersant (for example, JP-A-11-153703, U.S. Pat. No. 6,210,858 B1, JP-A-2002-2776069).

As examples of the material forming the matrix, publicly known thermoplastic resins and hardening resin films may be cited.

It is also preferable to employ at least one composition selected from among a composition containing a polyfunctional compound having at least two radical polymerizable and/or cationic polymerizable groups and a composition comprising an organic metal compound having a hydrolysable group and a partly condensation product thereof. Examples thereof include compounds reported in JP-A-2000-47004, JP-A-2001-315242, JP-A-2001-31871 and JP-A-2001-296401.

Also, use may be preferably made of a hardening film obtained from a composition comprising a colloidal metal oxide obtained from a hydrolysis condensation product of a metal oxide and a metal alkoxide. Such a film is described in, for example, JP-A-2001-293818.

The refractive index of the higher refractive index layer preferably ranges from 1.70 to 2.20. The thickness of the higher refractive index layer preferably ranges from 5 nm to 10 µm, still preferably from 10 nm to 1 µm.

The refractive index of the medium refractive index layer is controlled to an intermediate level between the refractive index of the lower refractive index layer and the refractive index of the higher refractive index layer. The refractive index of the medium refractive index layer preferably ranges from 1.50 to 1.70. The thickness thereof preferably ranges from 5 nm to 10 µm, still preferably from 10 nm to 1 µm.

(Lower Refractive Index Layer)

The lower refractive index layer is successively laminated on the higher refractive index layer. The refractive index of the lower refractive index layer preferably ranges from 1.20 to 1.55, still preferably from 1.30 to 1.50.

It is preferable to form the lower refractive index layer as the outermost layer having scuff proofness and stain proofness. As means of largely improving the scuff proofness, it is effective to impart slipperiness to the surface, which can be established by applying a publicly known thin film layer technique such as introduction of silicone or fluorine.

As a fluorine-containing compound, a crosslinkable or polymerizable compound containing from 35 to 80% by weight of fluorine atom is preferred.

Examples thereof include compounds cited in paragraphs (0018) to (0026) in JP-A-9-222503, paragraphs (0019) to (0030) in JP-A-11-38202, paragraphs (0027) to (0028) in JP-A-2001-40284 and JP-A-2000-284102.

The refractive index of the fluorine-containing compound preferably ranges from 1.35 to 1.50, still preferably from 1.36 to 1.47.

A silicone compound is a compound having a polysiloxane structure and a compound having a hardening functional group or a polymerizable functional group in its polymer chain and gives a crosslinked structure in the film is preferable. Examples thereof include a reactive silicone (for example, SILAPLANE manufactured by CHISSO CORPORATION), polysiloxane having silanol groups at both ends (for example, JP-A-11-258403).

To perform the crosslinking or polymerization reaction of the fluorine and/or siloxane polymer having a crosslinking or polymerizable group, it is preferable to heat or irradiate a coating composition for forming the outermost layer, which contains a polymerization initiator or a sensitizer, simultaneously with the application or after the application, thereby forming the lower refractive index layer.

It is also preferable to employ a sol gel hardening film which hardens via a condensation reaction between an organic metal compound such as a silane coupling agent and a silane coupling agent having a specific fluorinated hydrocarbon group in the coexistence of a catalyst.

Examples thereof include polyfluoroalkyl group-containing silane compounds or partly hydrolyzed condensation products thereof (compounds described in, for example, JP-A-58-142958, JP-A-58-147483, JP-A-58-147484, JP-A-9-157582 and JP-A-11-106704), silyl compounds having "perfluoroalkyl ether" group (i.e., a fluorine-containing long chain) (compounds described in, for example, JP-A-2000-117902, JP-A-2001-48590 and JP-A-2002-53804).

In addition to the components as described above, the lower refractive index layer may contain additives such as a filler (for example, particles of inorganic compounds having a low refractive index and an average primary particle size of from 1 to 150 nm such as silicon dioxide (silica) and fluorine-containing particles (magnesium fluoride, calcium fluoride and barium fluoride) and fine organic particles described in paragraphs (0020) to (0038) in JP-A-11-3820)) a silane coupling agent, a slip agent and a surfactant.

In the case where the lower refractive index layer is provided below the outermost layer, the lower refractive index layer may be formed by a gas phase method (for example, the vacuum deposition method, the sputtering method, the ion plating method or the plasma CVD method). It is preferable to employ the coating method by which the lower refractive index layer can be formed at low cost.

The film thickness of the lower refractive index layer preferably ranges from 30 to 200 nm, still preferably from 50 to 150 nm and most desirably from 60 to 120 nm.

(Hard Coat Layer)

In order to elevate the physical strength of the protective film having the antireflective layer, it is preferable to form a hard coat layer on the surface of the protective film. It is particularly preferable to provide the hard coat layer between the protective film and the higher refractive index layer as described above. The hard coat layer is formed preferably by a crosslinking reaction of a photo and/or heat hardening compound or a polymerization reaction. As a hardening functional group in the hardening compound, a photo polymerizable functional group is preferred. It is also preferable to use an organic metal compound or an organic alkoxysilyl compound having a hydrolysable functional group.

Specific examples of these compounds include those cited above with respect to the higher refractive index layer. Specific examples of a composition constituting the hard coat layer include those described in JP-A-2002-144913, JP-A-2000-9908 and International Patent Publication 00/46617.

The hard coat layer may also serve as the higher refractive index layer. In this case, it is preferable to form the hard coat layer by finely dispersing fine particles by using a technique as described concerning the higher refractive index layer.

The hard coat layer may contain particles having an average particle size of form 0.2 to 10 μm and also serve as an antiglare layer having an antiglare function.

The film thickness of the hard coat layer can be appropriately designed depending on the purpose. The film thickness of the hard coat layer preferably ranges from 0.2 to 10 μm and still preferably from 0.5 to 7 μm.

The strength of the hard coat layer is preferably H or above, still preferably 2H or above and most desirably 3H or above, when determined by the pencil hardness test in accordance with JIS K5400. In the Taber abrasion test in accordance with JIS K5400, a less Taber volume loss in a test sample after the test, compared with the volume before the test, is the preferable.

(Other Layers in Antireflective Layer)

It is also possible to form, for example, a forward scattering layer, a primer layer, an antistatic layer, an undercoat layer and a protective layer.

(Antistatic Layer)

In the case of forming an antistatic layer, it is preferable to impart an electrical conductivity represented by a volume resistivity of $10^{-8}$ ($\Omega \cdot cm^{-3}$) or less. Although a volume resistivity of $10^{-8}$ ($\Omega \cdot cm^{-3}$) can be established by using, for example, a hygroscopic substance, a water-soluble inorganic salt, a certain surfactant, a cationic polymer, an anionic polymer or colloidal silica, the volume resistivity highly depends on temperature and humidity and, therefore, there arises a problem that a sufficient conductivity cannot be ensured under a low humidity. Therefore, it is preferable to employ a metal oxide as an antistatic layer material. Although some metal oxides are colored, it is undesirable to employ such a colored metal oxide as a material of the antistatic layer. This is because the whole film is colored in the case of using such a colored metal oxide. Examples of metals providing non-colored metal oxides include Zn, Ti, Al, In, Si, Mg, Ba, Bo, W and V. It is preferable to employ a metal oxide containing at least one of these metals as the main component. Specific examples of the metal oxide include $ZnO$, $TiO_2$, $SnO_2$, $Al_2O_3$, $In_2O_3$, $SiO_2$, $MgO$, $BaO$, $MoO_3$, $V_2O_6$ and complex oxides thereof. In particular, $ZnO$, $TiO_2$ and $SnO_2$ are preferred. The metal oxide may contain different atoms. That is to say, it is effective to add, for example, Al or In to ZnO, Sb, Nb or halogen atoms to $SnO_2$, or Nb or Ta to $TiO_2$. Moreover, use may be made of a material in which crystalline metal particles or fibers (for example, titanium oxide) are bonded to the metal oxide, as described in JP-B-59-6235. Although volume resistivity differs from surface resistivity and these two factors cannot be simply compared, a volume resistivity of $10^{-8}$ ($\Omega \cdot cm^{-3}$) or less can be ensured in the case where the antistatic layer has a surface resistivity of about $10^{-10}$ ($\Omega/\square$), preferably $10^{-8}$ ($\Omega/\square$). The surface resistivity of the antistatic layer should be measured as a value referring the antistatic layer as the outermost layer. Namely, it can be measured in the course of the formation of a laminated film.

<Liquid Crystal Display>

The liquid crystal display according to the invention involves a liquid crystal display using either cellulose acylate film according to the invention or the polarizing plate according to the invention as described above (first embodiment), a liquid crystal display of OCB or VA mode having two polarizing plates according to the invention as described above and a liquid crystal cell between the polarizing plates (second embodiment), and a liquid crystal display of VA mode having one polarizing plate according to the invention in the backlight side (third embodiment).

Namely, the cellulose acylate film according to the invention is advantageously usable as an optical compensation sheet. The polarizing plate with the use of the cellulose acylate film according to the invention is advantageously usable in liquid crystal displays. The cellulose acylate film of according to the invention is usable in liquid crystal cells of various display modes. There have been proposed various display modes such as TN (twisted nematic) mode, IPS (in-plane switching) mode, FLC (ferroelectric liquid crystal) mode, AFLC (anti-ferroelectric liquid crystal) mode, OCB (optically compensatory bend) mode, STN (super twisted nematic) mode, VA (vertically aligned) mode and HAN (hybrid aligned nematic) mode. The cellulose acylate film according to the invention is preferably usable in the VA mode or the OCB mode among them.

In a liquid crystal cell of the VA mode, rod-like liquid crystal molecules are essentially vertically aligned while voltage is not applied. Liquid crystal cells of the VA mode includes: (1) a liquid crystal cell of VA mode in a narrow sense, in which rod-like liquid crystal molecules are essentially vertically aligned while voltage is not applied, and the molecules are essentially horizontally aligned while voltage is applied; and the molecules are essentially horizontally aligned while voltage is applied (JP-A-2-176625); (2) a liquid crystal cell of MVA mode, in which the VA mode is modified to be multi-domain type so as to enlarge the viewing angle (described in SID97, Digest of tech. Papers, 28(1997), 845); (3) a liquid crystal cell of n-ASM mode, in which rod-like liquid crystal molecules are essentially vertically aligned while voltage is not applied, and the molecules are essentially oriented in twisted multi-domain alignment while voltage is applied (described in *Nippon Ekisho Toronkai* [Liquid crystal forum of Japan], Digest of tech. Papers (1998), 58-59); and (4) a liquid crystal cell of SURVAIVAL mode (published in LCD international 98).

Figure 3:
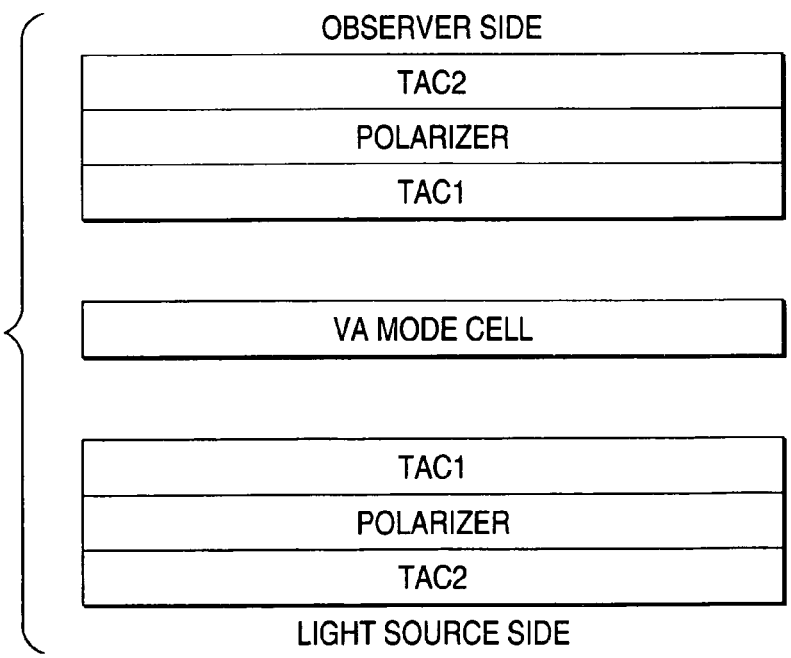
FIG. 3 is a sectional view schematically showing a sectional structure of the polarizing plate according to the invention.

As a liquid crystal display of the VA mode, one having a liquid crystal cell (VA mode cell) and two polarizing plates (i.e., a polarizing plate consisting of TAC1, a polarizer and TAC2), one plate being located in one side of the polarizer, the other plate being located in the other side of the polarizer, as shown in FIG. 3. The liquid crystal cell holds liquid crystal between two electrode substrates, though not shown in the figure.

In an embodiment of the liquid crystal display of transmission type according to the invention, the cellulose acylate film according to the invention is employed as an optical compensation sheet. Namely, one sheet of the cellulose acylate film is provided between the liquid crystal cell and one of the polarizing plates or one sheet thereof is provided each between the liquid crystal cell and the polarizing plate.

In another embodiment of the liquid crystal display of transmission type according to the invention, the cellulose acylate film according to the invention is provided between the liquid crystal cell and the polarizer as a protective film for the polarizing plate. The cellulose acylate film may be employed as a protective film provided between the liquid crystal cell and the polarizer in one of the polarizing plates. Alternatively, one sheet of the cellulose acylate film may be used as a protective film provided each between the liquid crystal cell and the polarizer in the both polarizing plates. To bond to the liquid crystal cell, it is preferable to locate the cellulose acylate film according to the invention (TAC1) in the VA cell side. In the case where the above-described cellulose acylate film is employed exclusively as the protective film located between the liquid crystal cell and the polarizer in one of the polarizing plates, it may be located either in the upper polarizing plate (the observer side) or in the lower polarizing plate (the light source side: i.e., the backlight side). No functional problem occurs in each case. When the cellulose acylate film is employed in the upper polarizing plate, however, it is needed to form a functional layer in the observe side (the upper side), which brings about a risk of lowering productivity. In a preferred embodiment, therefore, the cellulose acylate film is employed in the lower polarizing plate.

In a liquid crystal display of the second embodiment, the polarizing plates according to the invention are employed in both of the light source side and the observer side. In a liquid crystal display of the third embodiment, the polarizing plate according to the invention is employed exclusively in the light source side.

The protective film (TAC2) in FIG. 3 may be a cellulose acylate film commonly employed. It is preferable to use a film thinner than the cellulose acylate film according to the invention therefor. For example, the thickness of the film preferably ranges from 40 to 80 μm and examples thereof include marketed films KC4UX2M (manufactured by KONICA OPT Co., Ltd., 40 μm), KC5UX2M (manufactured by KONICA OPT Co., Ltd., 60 μm) and TD80 (manufactured by FUJI PHOTOFILM Co., Ltd., 80 μm), though the invention is not restricted thereto.

EXAMPLES

Now, the invention will be described in greater detail by reference to the following examples. However, it is to be understood that the invention is not construed as being restricted thereto.

Example 1

1. Formation of Cellulose Acylate Film (1) Cellulose Acylate

Cellulose acylates differing in acyl group type and the degree of substitution by an acyl group from each other as listed in Table 1 were prepared. After adding sulfuric acid (7.8 parts by weight per 100 parts by weight of cellulose) serving as a catalyst, each carboxylic acid providing the corresponding acyl substituent was added and the acylation was carried out at 40° C. Next, the total degree of substitution and the degree of substitution at the 6-position were regulated by controlling the amount of the sulfuric acid catalyst, the water content and the aging time. Aging was performed at 40° C. Subsequently, low-molecular weight components of cellulose acylate were washed off with acetone.

(2) Preparation of Dope (2)-1 Cellulose Acylate Solution

The following cellulose acylate composition was poured into a mixing tank and individual components were dissolved under stirring. After heating to 90° C. for about 10 minutes, the mixture was filtered through a paper filter having an average pore size of 34 μm and a baked metal filter having an average pore size of 10 μm to give a cellulose acylate solution.

| (Composition of cellulose acylate solution) | |
|---|---|
| cellulose acetate shown in Table 1 | 100.0 parts by weight |
| triphenyl phosphate | 7.8 parts by weight |
| biphenyl diphenyl phosphate | 3.9 parts by weight |
| methylene chloride | 403.0 parts by weight |
| methanol | 60.2 parts by weight |

(2)-2 Matting Agent Dispersion

The following composition of a matting agent dispersion containing the cellulose acylate solution prepared above was poured into a dispersing machine to prepare a matting agent dispersion.

| (Composition of matting agent dispersion) | |
|---|---|
| silica particles of 16 nm in average particle size (Aerosil R972: NIPPON AEROSIL Co., Ltd.) | 2.0 parts by weight |
| methylene chloride | 72.4 parts by weight |
| methanol | 10.8 parts by weight |
| cellulose acylate solution | 10.3 parts by weight |

(2)-3 Retardation Increasing Agent A Solution

The following composition of a retardation increasing agent A solution containing the cellulose acylate solution prepared above was poured into a mixing tank and stirred under heating to give a retardation increasing agent A solution.

| (Composition of retardation increasing agent A solution) | |
|---|---|
| retardation increasing agent A | 20.0 parts by weight |
| methylene chloride | 58.3 parts by weight |
| methanol | 8.7 parts by weight |
| cellulose acylate solution | 12.8 parts by weight |

Retardation Increasing Agent A

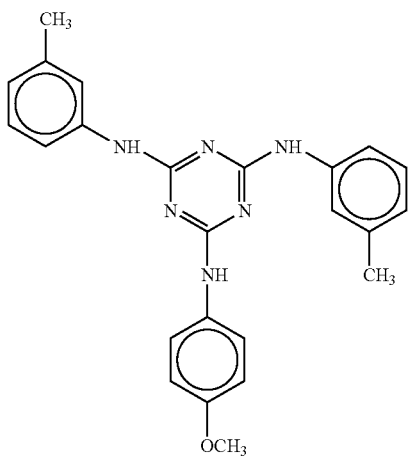

(2)-4 Retardation Increasing Agent B Solution

The following composition of a retardation increasing agent B solution containing the cellulose acylate solution prepared above was poured into a mixing tank and stirred under heating to give a retardation increasing agent B solution.

| (Composition of retardation increasing agent B solution) | |
|---|---|
| retardation increasing agent A | 8.0 parts by weight |
| retardation increasing agent B | 12.0 parts by weight |
| methylene chloride | 58.3 parts by weight |
| methanol | 8.7 parts by weight |
| cellulose acylate solution | 12.8 parts by weight |

Retardation Increasing Agent B

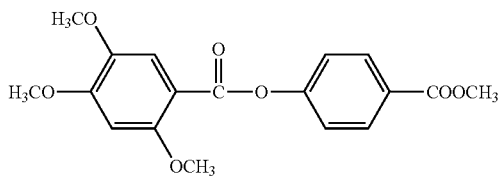

A film-forming dope was prepared by mixing 100 parts by weight of the cellulose acylate solution, 1.35 parts by weight of the matting agent dispersion, a plasticizer in each amount as specified in Tables 1 to 4, and the solution of the retardation increasing agent A or B in such an amount as giving each ratio as shown in Table 1, 2 or 4. Using the obtained dopes, film sample Nos. 1-1 to 1-41, 1-1c to 1-3c, 2-1 to 2-11, 3-1 to 3-9 and 4-1 to 4-8 were produced. In Tables 1, 2 and 4, numerical values given in the columns of retardation increasing agent represent each the amount (parts by weight) of a retardation increasing agent referring the amount of cellulose acylate as 100 parts by weight. The amount of the retardation increasing agent A or the retardation increasing agent B was controlled so as to give the amount of the retardation increasing agent A as shown in Table 1 or 2 or the total amount of the retardation increasing agents A and B as shown in Table 4 in each case.

In these Tables, CAB is an abbreviation for cellulose acetate butyrate (a cellulose ester derivative having acetate and butyryl groups as acyl groups); CAP is an abbreviation for cellulose acetate propionate (a cellulose ester derivative having acetate and propionyl groups as acyl groups); and CTA is an abbreviation for cellulose triacetate (a cellulose ester derivative having acetate group alone as acyl group).

In the sample Nos. 1-16 and 1-23, the total degrees of substitution by hydroxyl group at the 6-position were respectively 0.87 and 0.88.

(3) Casting Film Formation and Evaluation

{Sample Nos. 1-1 to 1-41 and 1-1c to 1-3c}

The above dope was cast by using a band casting machine. When the amount of the remaining solvent attained 25 to 35% by weight, the film was stripped off from the band and stretched in the lateral direction at a stretching temperature within a range of about −5 to +5° C. based on Tg in Table 1 with the use of a tenter at a stretching ratio of 0% to 30% to give a cellulose acylate film (thickness: 92 μm). The tenter stretching ratio was as specified in Table 1 wherein a stretching ratio of 0% means unstretched.

The retardation values of Re and Rth of the prepared cellulose acylate film (optical compensation sheet) were measured at 25° C. and 60% RH at a wavelength of 633 nm by using an ellipsometer (M-150, JASCO ENGINEERING). After conditioning at 25° C. and 10% RH and at 25° C. and 80% RH for 2 hours or longer, the film sample was inserted between two glass plate via silicone and then the Re and Rth were measured in a sealed state. The changes in the retardation values at the wavelength of 633 nm (Re(10% RH)−Re(80% RH), Rth(10%RH)−Rth(80% RH)) were referred to as ΔRe and ΔRth. Table 1 shows the results.

TABLE 1

| Sample no. | Cellulose type | Ac group Type | Ac group Degree of substitution A | Bu group/Pr group Type | Bu group/Pr group Degree of substitution B | Degree of substitution A + B | Plasticizer *1 TPP/BDP | Retardation increasing agent solution employed | Retardation increasing agent A | Note |
|---|---|---|---|---|---|---|---|---|---|---|
| 1-1 | CAB | Ac | 1.40 | Bu | 1.30 | 2.70 | 5.8 | — | — | Invention |
| 1-2 | CAB | Ac | 1.40 | Bu | 1.30 | 2.70 | 5.8 | A | 3 | Invention |
| 1-3 | CAB | Ac | 1.40 | Bu | 1.30 | 2.70 | 5.8 | A | 5 | Invention |
| 1-4 | CAB | Ac | 1.10 | Bu | 1.60 | 2.70 | 5.8 | — | — | Invention |
| 1-5 | CAB | Ac | 1.10 | Bu | 1.60 | 2.70 | 5.8 | A | 3 | Invention |
| 1-6 | CAB | Ac | 1.10 | Bu | 1.60 | 2.70 | 5.8 | A | 5 | Invention |
| 1-7 | CAB | Ac | 0.90 | Bu | 1.80 | 2.70 | 5.8 | — | — | Invention |
| 1-8 | CAB | Ac | 0.90 | Bu | 1.80 | 2.70 | 5.8 | A | 3 | Invention |
| 1-9 | CAB | Ac | 0.90 | Bu | 1.80 | 2.70 | 5.8 | A | 5 | Invention |
| 1-10 | CAB | Ac | 0.20 | Bu | 2.30 | 2.50 | 5.8 | — | — | Invention |

TABLE 1-continued

| | | | | | | | | | | |
|---|---|---|---|---|---|---|---|---|---|---|
| 1-11 | CAB | Ac | 0.20 | Bu | 2.30 | 2.50 | 5.8 | A | 3 | Invention |
| 1-12 | CAB | Ac | 0.20 | Bu | 2.30 | 2.50 | 5.8 | A | 5 | Invention |
| 1-13 | CAB | Ac | 0.30 | Bu | 2.50 | 2.80 | 5.8 | — | — | Invention |
| 1-14 | CAB | Ac | 0.30 | Bu | 2.50 | 2.80 | 5.8 | A | 3 | Invention |
| 1-15 | CAB | Ac | 0.30 | Bu | 2.50 | 2.80 | 5.8 | A | 5 | Invention |
| 1-16 | CAP | Ac | 0.18 | Pr | 2.47 | 2.65 | 0 | — | — | Invention |
| 1-17 | CAP | Ac | 0.18 | Pr | 2.47 | 2.65 | 11.7 | — | — | Invention |
| 1-18 | CAP | Ac | 0.18 | Pr | 2.47 | 2.65 | 11.7 | A | 3 | Invention |
| 1-19 | CAP | Ac | 0.18 | Pr | 2.47 | 2.65 | 11.7 | A | 3.5 | Invention |
| 1-20 | CAP | Ac | 0.18 | Pr | 2.47 | 2.65 | 5.8 | A | 6.5 | Invention |
| 1-21 | CAP | Ac | 0.18 | Pr | 2.47 | 2.65 | 5.8 | A | 5.5 | Invention |
| 1-22 | CAP | Ac | 0.18 | Pr | 2.47 | 2.65 | 3 | — | — | Invention |
| 1-1c | CAP | Ac | 1.90 | Pr | 0.80 | 2.70 | 11.7 | — | — | Comparative Ex. |
| 1-2c | CTA | Ac | 2.87 | — | 0.00 | 2.87 | 11.7 | — | — | Comparative Ex. |
| 1-3c | CTA | Ac | 2.87 | — | 0.00 | 2.87 | 11.7 | A | 5 | Comparative Ex. |
| 1-23 | CAB | Ac | 1.00 | Bu | 1.66 | 2.66 | 0 | — | — | Invention |
| 1-24 | CAB | Ac | 1.00 | Bu | 1.66 | 2.66 | 0 | — | — | Invention |
| 1-25 | CAB | Ac | 1.00 | Bu | 1.66 | 2.66 | 11.7 | — | — | Invention |
| 1-26 | CAB | Ac | 1.00 | Bu | 1.66 | 2.66 | 11.7 | — | — | Invention |
| 1-27 | CAB | Ac | 1.00 | Bu | 1.66 | 2.66 | 11.7 | — | — | Invention |
| 1-28 | CAB | Ac | 1.00 | Bu | 1.66 | 2.66 | 11.7 | — | — | Invention |
| 1-29 | CAB | Ac | 1.00 | Bu | 1.66 | 2.66 | 11.7 | A | 3 | Invention |
| 1-30 | CAB | Ac | 1.00 | Bu | 1.66 | 2.66 | 11.7 | A | 5 | Invention |
| 1-31 | CAB | Ac | 1.00 | Bu | 1.66 | 2.66 | 5.8 | — | — | Invention |
| 1-32 | CAB | Ac | 1.00 | Bu | 1.66 | 2.66 | 5.8 | A | 3 | Invention |
| 1-33 | CAB | Ac | 1.00 | Bu | 1.66 | 2.66 | 5.8 | A | 4 | Invention |
| 1-34 | CAB | Ac | 1.00 | Bu | 1.66 | 2.66 | 5.8 | A | 5 | Invention |
| 1-35 | CAB | Ac | 1.00 | Bu | 1.66 | 2.66 | 3 | — | — | Invention |
| 1-36 | CAB | Ac | 1.00 | Bu | 1.66 | 2.66 | 3 | A | 3 | Invention |
| 1-37 | CAB | Ac | 1.00 | Bu | 1.66 | 2.66 | 3 | A | 3 | Invention |
| 1-38 | CAB | Ac | 1.00 | Bu | 1.66 | 2.66 | 3 | A | 4 | Invention |
| 1-39 | CAB | Ac | 1.00 | Bu | 1.66 | 2.66 | 0 | A | 3 | Invention |
| 1-40 | CAB | Ac | 1.00 | Bu | 1.66 | 2.66 | 0 | A | 2 | Invention |
| 1-41 | CAB | Ac | 1.00 | Bu | 1.66 | 2.66 | 0 | A | 2 | Invention |

| Sample no. | Stretching ratio | Dried film thickness [μm] | Re [nm] | Rth [nm] | ΔRe [nm] | ΔRth [nm] | Tg glass transition temperature [° C.] | Moisture content | Water vapor permeability [g/m²/24 hr] | Note |
|---|---|---|---|---|---|---|---|---|---|---|
| 1-1 | 20% | 93 | 24 | 140 | 1 | 10 | 126 | 2.1 | 2200 | Invention |
| 1-2 | 20% | 92 | 50 | 230 | 3 | 9 | 120 | 1.9 | 1820 | Invention |
| 1-3 | 20% | 92 | 64 | 285 | 4 | 9 | 115 | 1.9 | 1640 | Invention |
| 1-4 | 20% | 93 | 33 | 145 | 1 | 7 | 126 | 2.1 | 2230 | Invention |
| 1-5 | 20% | 92 | 58 | 233 | 3 | 7 | 119 | 1.9 | 1810 | Invention |
| 1-6 | 20% | 92 | 70 | 289 | 4 | 7 | 116 | 1.9 | 1610 | Invention |
| 1-7 | 20% | 93 | 31 | 143 | 1 | 6 | 127 | 2.1 | 2220 | Invention |
| 1-8 | 20% | 92 | 60 | 236 | 3 | 6 | 120 | 1.9 | 1790 | Invention |
| 1-9 | 20% | 93 | 72 | 294 | 3 | 5 | 115 | 1.9 | 1580 | Invention |
| 1-10 | 20% | 93 | 41 | 152 | 1 | 9 | 126 | 2.1 | 2500 | Invention |
| 1-11 | 20% | 93 | 65 | 248 | 3 | 8 | 120 | 1.9 | 2100 | Invention |
| 1-12 | 20% | 92 | 84 | 308 | 3 | 7 | 115 | 1.9 | 1900 | Invention |
| 1-13 | 20% | 92 | 28 | 138 | 1 | 6 | 126 | 2.1 | 2210 | Invention |
| 1-14 | 20% | 93 | 56 | 229 | 3 | 5 | 120 | 1.9 | 1800 | Invention |
| 1-15 | 20% | 92 | 68 | 289 | 3 | 6 | 115 | 1.9 | 1620 | Invention |
| 1-16 | Unstretched | 92 | 2 | 30 | 1 | 15 | 143 | 4.2 | 2800 | Invention |
| 1-17 | 30% | 92 | 47 | 49 | 9 | 9 | 110 | 2.6 | 1780 | Invention |
| 1-18 | 15% | 93 | 39 | 138 | 8 | 8 | 109 | 2.4 | 1720 | Invention |
| 1-19 | 17% | 92 | 29 | 148 | 8 | 9 | 108 | 2.5 | 1690 | Invention |
| 1-20 | 30% | 93 | 73 | 288 | 9 | 8 | 108 | 1.8 | 1600 | Invention |
| 1-21 | 30% | 92 | 69 | 276 | 9 | 8 | 107 | 1.9 | 1500 | Invention |
| 1-22 | 30% | 91 | 61 | 263 | 11 | 10 | 108 | 1.9 | 1650 | Invention |
| 1-1c | Unstretched | 92 | 3 | 33 | 2 | 20 | 140 | 3.4 | 1950 | Comparative Ex. |
| 1-2c | Unstretched | 92 | 2 | 38 | 3 | 52 | 143 | 3.1 | 1510 | Comparative Ex. |
| 1-3c | 30% | 92 | 32 | 151 | 9 | 44 | 142 | 3.2 | 1140 | Comparative Ex. |
| 1-23 | Unstretched | 92 | 3 | 75 | 2 | 10 | 139 | 2.2 | 2400 | Invention |
| 1-24 | 20% | 93 | 32 | 203 | 7 | 13 | 140 | 2.2 | 2350 | Invention |
| 1-25 | Unstretched | 92 | 1 | 17 | 1 | 5 | 104 | 1.9 | 2050 | Invention |
| 1-26 | 10% | 92 | 19 | 68 | 4 | 6 | 104 | 1.8 | 2020 | Invention |
| 1-27 | 20% | 92 | 34 | 86 | 5 | 5 | 105 | 1.8 | 1980 | Invention |
| 1-28 | 30% | 92 | 55 | 104 | 6 | 5 | 106 | 1.8 | 1960 | Invention |
| 1-29 | 20% | 93 | 54 | 177 | 4 | 4 | 100 | 1.7 | 1500 | Invention |
| 1-30 | 20% | 92 | 69 | 240 | 3 | 3 | 94 | 1.6 | 1300 | Invention |
| 1-31 | 20% | 92 | 33 | 143 | 1 | 7 | 126 | 2.1 | 2200 | Invention |
| 1-32 | 20% | 93 | 57 | 235 | 3 | 6 | 120 | 1.9 | 1800 | Invention |
| 1-33 | 20% | 92 | 64 | 265 | 3 | 6 | 117 | 1.9 | 1750 | Invention |
| 1-34 | 20% | 92 | 72 | 294 | 3 | 6 | 115 | 1.9 | 1720 | Invention |
| 1-35 | 20% | 92 | 32 | 176 | 3 | 9 | 114 | 2 | 2300 | Invention |
| 1-36 | 20% | 91 | 56 | 270 | 4 | 7 | 109 | 1.9 | 2260 | Invention |

TABLE 1-continued

| | | | | | | | | | | |
|---|---|---|---|---|---|---|---|---|---|---|
| 1-37 | 30% | 93 | 69 | 277 | 5 | 7 | 110 | 1.9 | 2230 | Invention |
| 1-38 | 20% | 92 | 63 | 298 | 4 | 7 | 111 | 1.9 | 2170 | Invention |
| 1-39 | 20% | 92 | 51 | 296 | 4 | 9 | 132 | 2.2 | 2280 | Invention |
| 1-40 | 20% | 92 | 47 | 269 | 3 | 10 | 134 | 2.2 | 2320 | Invention |
| 1-41 | 5% | 92 | 41 | 228 | 3 | 2 | 134 | 2.2 | 2330 | Invention |

*1: A mixture of TPP (triphenyl phosphate) with BDP (biphenyl diphenyl phosphate) at a ratio 2/1 (parts by weight).

The results given in Table 1 indicate that, in the samples having a total degree of substitution (A+B) of 2.70 (1-1 to 1-9), the exhibition of higher optical characteristics (Re and Rth) was observed with an increase the degree of substitution by butanoyl (B) and an increase in the retardation increasing agent. At the same retardation increasing agent content, the invention sample (CAB) showed higher optical characteristics and less change depending on the environmental humidity than the comparative sample CTA (1-3c). It can be also understood that the invention samples (CAP) (1-16 to 1-22) showed the exhibition of higher optical characteristics and less changes in ΔRe and ΔRth than the comparative sample (CTA) (1-2c and 1-3c).

It can be also understood that use of the retardation increasing agent contributed to the further improvement in the optical characteristics. A comparison of samples having no retardation increasing agent indicates that the invention sample showed less humidity-dependency than the cellulose triacetate samples Comparative Examples 1-1c and 1-2c Concerning total degree of substitution, the humidity-dependency was lowered with an increase in the degree of substitution by propyl (butyryl).

The elastic moduli at 25° C. of the films obtained in this EXAMPLE ranged from 1500 MPa to 3000 MPa, the hazes thereof all fell within a range of form 0.1 to 0.9% and the average secondary particle sizes of the matting agent were 1.0 μm or less. When allowed to stand at 80° C. and 90% RH for 48 hours, the samples showed changes in weight of from 0 to 3%. When allowed to stand at 60° C. and 95% RH and at 90° C. and 5% RH for 24 hours, the samples showed dimensional changes from 0 to 4.5%. Each sample showed a coefficient of photoelasticity of $5 \times 10^{-3}$ cm$^2$/dyne or less.

{Sample Nos. 2-1 to 2-11}

Cellulose acylate films listed in Table 2 were prepared as in the sample Nos. 1-1 to 1-41 and 1-1c to 1-3c but changing the temperature pattern in the tenter stretching zone from 140° C. (tg+25° C.) to 150° C. Optical characteristics were evaluated in the same manner too. The sample Nos. 2 to 9 had Tg of 121° C. and the sample No. 2-11 had Tg of 122° C.

TABLE 2

| | | Ac group | | Bu group/Pr group | | | Retardation | | |
|---|---|---|---|---|---|---|---|---|---|
| Sample no. | Cellulose type | Type | Degree of substitution A | Type | Degree of substitution B | Degree of substitution A + B | Plasticizer *1 TPP/BDP | increasing agent solution employed | Retardation increasing agent A | Note |
| 2-1 | CAB | Ac | 1.40 | Bu | 1.30 | 2.70 | 5.8 | A | 5 | Invention |
| 2-2 | CAB | Ac | 1.10 | Bu | 1.60 | 2.70 | 5.8 | A | 3 | Invention |
| 2-3 | CAB | Ac | 1.10 | Bu | 1.60 | 2.70 | 5.8 | A | 5 | Invention |
| 2-4 | CAB | Ac | 0.90 | Bu | 1.80 | 2.70 | 5.8 | A | 3 | Invention |
| 2-5 | CAB | Ac | 0.90 | Bu | 1.80 | 2.70 | 5.8 | A | 5 | Invention |
| 2-6 | CAB | Ac | 0.20 | Bu | 2.30 | 2.50 | 5.8 | A | 3 | Invention |
| 2-7 | CAB | Ac | 0.20 | Bu | 2.30 | 2.50 | 5.8 | A | 5 | Invention |
| 2-8 | CAB | Ac | 0.20 | Bu | 2.30 | 2.50 | 5.8 | A | 5 | Invention |
| 2-9 | CAB | Ac | 1.00 | Bu | 1.66 | 2.66 | 5.8 | A | 2.3 | Invention |
| 2-10 | CAB | Ac | 1.00 | Bu | 1.66 | 2.66 | 5.8 | A | 2.1 | Invention |
| 2-11 | CAB | Ac | 1.00 | Bu | 1.66 | 2.66 | 5.8 | A | 1.9 | Invention |

| Sample no. | Stretching ratio | Dried film thickness [μm] | Re [nm] | Rth [nm] | ΔRe [nm] | ΔRth [nm] | Note |
|---|---|---|---|---|---|---|---|
| 2-1 | 20% | 92 | 64 | 225 | 4 | 9 | Invention |
| 2-2 | 25% | 92 | 65 | 230 | 3 | 7 | Invention |
| 2-3 | 20% | 92 | 70 | 220 | 4 | 7 | Invention |
| 2-4 | 22% | 92 | 65 | 230 | 3 | 6 | Invention |
| 2-5 | 20% | 93 | 70 | 222 | 3 | 5 | Invention |
| 2-6 | 20% | 93 | 65 | 195 | 3 | 8 | Invention |
| 2-7 | 15% | 93 | 70 | 225 | 3 | 7 | Invention |
| 2-8 | 20% | 92 | 80 | 210 | 3 | 7 | Invention |
| 2-9 | 28% | 85 | 70 | 220 | 3 | 6 | Invention |
| 2-10 | 32% | 75 | 75 | 200 | 3 | 6 | Invention |
| 2-11 | 34% | 60 | 80 | 180 | 3 | 6 | Invention |

*1: A mixture of TPP (triphenyl phosphate) with BDP (biphenyl diphenyl phosphate) at a ratio 2/1 (parts by weight).

The results given in Table 2 indicate that each sample showed a relatively high Re value and yet achieved a relatively low Rth. These samples were comparable in humidity-dependency to the samples in Table 1. The adjustable parameters of optical characteristics of the sample Nos. 2-1 to 2-5, 2-7 and 2-9 to 2-11 in Table 2 were from 603 to 652, while those of the sample Nos. 2-6 and 2-8 were respectively 579 and 682.

{Sample Nos. 3-1 to 3-9}

Cellulose acylate films listed in Table 3 were prepared as in the sample Nos. 1-1 to 1-41 and 1-1c to 1-3c but using no retardation increasing agent solution and controlling dried film thickness to 100 μm, 110 μm, 120 μm, 130 μm, 150 μm and 160 μm. Optical characteristics were evaluated in the same manner too.

The results given in Table 3 indicate that Re and Rth were elevated almost depending on film thickness and water vapor permeability was almost inversely proportional to film thickness. The humidity-dependencies (ΔRe and ΔRth) of Re and Rth, glass transition temperature and moisture content remained constant regardless of film thickness. The adjustable parameters of optical characteristics of the sample Nos. 3-5 to 3-9 were from 593 to 679, while those of the sample Nos. 3-1 to 3-4 were from 394 to 550.

{Sample Nos. 4-1 to 4-9}

Cellulose acylate films listed in Table 4 were prepared as in the sample Nos. 2-1 to 2-11 but substituting the retardation increasing agent A solution by the retardation increasing agent B solution. Optical characteristics were evaluated in the same manner too.

TABLE 3

| Sample no. | Cellulose type | Ac group Type | Degree of substitution A | Bu group/Pr group Type | Degree of substitution B | Degree of substitution A + B | Plasticizer *1 TPP/BDP | Retardation increasing agent solution employed | Note |
|---|---|---|---|---|---|---|---|---|---|
| 3-1 | CAB | Ac | 0.20 | Bu | 2.30 | 2.50 | 5.8 | None | Invention |
| 3-2 | CAB | Ac | 0.20 | Bu | 2.30 | 2.50 | 5.8 | None | Invention |
| 3-3 | CAB | Ac | 0.20 | Bu | 2.30 | 2.50 | 5.8 | None | Invention |
| 3-4 | CAB | Ac | 0.20 | Bu | 2.30 | 2.50 | 5.8 | None | Invention |
| 3-5 | CAB | Ac | 0.20 | Bu | 2.30 | 2.50 | 5.8 | None | Invention |
| 3-6 | CAB | Ac | 0.20 | Bu | 2.30 | 2.50 | 5.8 | None | Invention |
| 3-7 | CAB | Ac | 0.20 | Bu | 2.30 | 2.50 | 5.8 | None | Invention |
| 3-8 | CAB | Ac | 0.20 | Bu | 2.30 | 2.50 | 5.8 | None | Invention |
| 3-9 | CAB | Ac | 0.20 | Bu | 2.30 | 2.50 | 5.8 | None | Invention |

| Sample no. | Stretching ratio | Dried film thickness [μm] | Re [nm] | Rth [nm] | ΔRe [nm] | ΔRth [nm] | Note |
|---|---|---|---|---|---|---|---|
| 3-1 | 20% | 110 | 41 | 152 | 1 | 9 | Invention |
| 3-2 | 20% | 110 | 48 | 180 | 2 | 7 | Invention |
| 3-3 | 20% | 120 | 53 | 196 | 2 | 7 | Invention |
| 3-4 | 20% | 130 | 57 | 212 | 2 | 7 | Invention |
| 3-5 | 20% | 140 | 62 | 229 | 2 | 8 | Invention |
| 3-6 | 20% | 150 | 66 | 245 | 2 | 8 | Invention |
| 3-7 | 28% | 130 | 70 | 200 | 3 | 7 | Invention |
| 3-8 | 32% | 130 | 75 | 205 | 3 | 7 | Invention |
| 3-9 | 35% | 130 | 80 | 207 | 4 | 7 | Invention |

*1: A mixture of TPP (triphenyl phosphate) with BDP (biphenyl diphenyl phosphate) at a ratio 2/1 (parts by weight).

TABLE 4

| Sample no. | Cellulose type | Ac group Type | Degree of substitution A | Bu group/Pr group Type | Degree of substitution B | Degree of substitution A + B | Plasticizer *1 TPP/BDP | Retardation increasing agent solution employed | Retardation increasing agent A + B | Note |
|---|---|---|---|---|---|---|---|---|---|---|
| 4-1 | CAB | Ac | 1.40 | Bu | 1.30 | 2.70 | 5.8 | B | 5 | Invention |
| 4-2 | CAB | Ac | 1.10 | Bu | 1.60 | 2.70 | 5.8 | B | 3 | Invention |
| 4-3 | CAB | Ac | 1.10 | Bu | 1.60 | 2.70 | 5.8 | B | 5 | Invention |
| 4-4 | CAB | Ac | 0.90 | Bu | 1.80 | 2.70 | 5.8 | B | 3 | Invention |
| 4-5 | CAB | Ac | 0.90 | Bu | 1.80 | 2.70 | 5.8 | B | 5 | Invention |
| 4-6 | CAB | Ac | 0.20 | Bu | 2.30 | 2.50 | 5.8 | B | 3 | Invention |
| 4-7 | CAB | Ac | 0.20 | Bu | 2.30 | 2.50 | 5.8 | B | 5 | Invention |
| 4-8 | CAB | Ac | 0.20 | Bu | 2.30 | 2.50 | 5.8 | B | 5 | Invention |
| 4-9 | CAB | Ac | 1.00 | Bu | 1.66 | 2.66 | 5.8 | B | 2.3 | Invention |
| 4-10 | CAB | Ac | 1.00 | Bu | 1.66 | 2.66 | 5.8 | B | 2.1 | Invention |
| 4-11 | CAB | Ac | 1.00 | Bu | 1.66 | 2.66 | 5.8 | B | 1.9 | Invention |

TABLE 4-continued

| Sample no. | Stretching ratio | Dried film thickness [μm] | Re [nm] | Rth [nm] | ΔRe [nm] | ΔRth [nm] | Note |
|---|---|---|---|---|---|---|---|
| 4-1 | 21% | 91 | 66 | 220 | 4 | 9 | Invention |
| 4-2 | 25% | 92 | 63 | 223 | 3 | 7 | Invention |
| 4-3 | 23% | 91 | 73 | 214 | 4 | 6 | Invention |
| 4-4 | 23% | 91 | 67 | 225 | 2 | 6 | Invention |
| 4-5 | 21% | 93 | 70 | 220 | 3 | 7 | Invention |
| 4-6 | 20% | 91 | 67 | 193 | 3 | 9 | Invention |
| 4-7 | 15% | 93 | 70 | 217 | 3 | 8 | Invention |
| 4-8 | 21% | 91 | 78 | 205 | 3 | 6 | Invention |
| 4-9 | 29% | 85 | 70 | 210 | 3 | 5 | Invention |
| 4-10 | 32% | 75 | 73 | 197 | 3 | 6 | Invention |
| 4-11 | 34% | 60 | 78 | 175 | 4 | 7 | Invention |

*1: A mixture of TPP (triphenyl phosphate) with BDP (biphenyl diphenyl phosphate) at a ratio 2/1 (parts by weight).

The results given in Table 4 indicate that each sample showed high optical characteristics (Re and Rth) and little change depending on the environmental humidity.

Re values were almost comparable to the sample Nos. 2-1 to 2-11 listed in Table 2 while Rth values were somewhat lowered. The humidity-dependencies (ΔRe and ΔRth) of Re and Rth, glass transition temperature and moisture content remained almost constant. The adjustable parameters of optical characteristics of the sample Nos. 4-1 to 4-11 in Table 4 were 588 to 665.

Example 2

<2-1-1>

(Construction of Polarizing Plate 01)

Iodine was adsorbed by a stretched polyvinyl alcohol film to form a polarizer.

The cellulose acylate films prepared in EXAMPLE 1 (1-1 to 1-41 and 1-1c to 1-3c: corresponding to TAC1 in FIGS. 1 to 3) were each bonded to one side of the polarizer similar to TAC1 in FIG. 2 with the use of a polyvinyl alcohol-based adhesive. Saponification was carried out under the following conditions.

A 1.5 mol/L aqueous solution of sodium hydroxide was prepared and maintained at 55° C. A 0.005 mol/L dilute aqueous solution of sulfuric acid was prepared and maintained at 35° C. The cellulose acylate film thus prepared was dipped in the aqueous sodium hydroxide solution for 2 minutes and then dipped in water to thereby sufficiently wash away the sodium hydroxide solution. Subsequently, it was dipped in the above dilute aqueous sulfuric acid solution for 1 minute and then dipped in water to thereby sufficiently wash away the dilute aqueous sulfuric acid solution. Finally, the sample was sufficiently dried at 120° C.

A marketed cellulose triacetate film (FUJITAC TD80UF, manufactured by FUJI PHOTOFILM Co., Ltd.: corresponding to TAC2 in FIG. 2) was saponified and bonded to the opposite side of the polarizer with the use of a polyvinyl alcohol-based adhesive.

As FIG. 1 shows, the slow axis of the cellulose acylate film was in parallel to the polarizing axis of the polarizer (in the films 1-16 and 1-2c employed in the following EXAMPLE 3<3-0>, the slow axis of each film being perpendicular to the transmission axis of the polarizer). On the other hand, the slow axis of the marketed cellulose triacetate film was perpendicular to the transmission axis of the polarizer.

Thus, polarizing plates A1-1 to A1-41 and A1-1c to A1-3c were constructed (corresponding to the polarizing plate integrated with the optical compensation sheet having no functional layer in FIG. 2).

<2-2-1>

(Preparation of Coating Solution for Light Scattering Layer)

50 g of mixture of pentaerythritol triacrylate with pentaerythritol tetraacrylate (PETA, manufactured by NIPPON Co., Ltd.) was diluted with 38.5 g of toluene. Further, 2 g of a polymerization initiator (Irgacure 907, manufactured by Ciba-Geigy) was added and the resultant mixture as mixed by stirring. A coating film obtained by applying this solution and hardening with ultraviolet light had a refractive index of 1.51.

Moreover, 1.7 g of a 30% toluene dispersion of crosslinked polystyrene particles (refractive index 1.60, SX-350 manufactured by SOKEN KAGAKU K.K.) having an average particle size of 3.5 μm and having been dispersed in a Polytron dispersing machine at 10000 rpm for 20 minutes and 13.3 g of a 30% toluene dispersion of crosslinked acryl-styrene particles (refractive index 1.55, manufactured by SOKEN KAGAKU K.K.) having an average particle size of 3.5 μm were added thereto. Finally, 0.75 g of a fluorine-based surface modifier (FP-1) and 10 g of a silane coupling agent (KBM-5103, manufactured by SHIN-ETSU CHEMICAL Co., Ltd.) were added to thereby complete the preparation of the liquid.

The above liquid mixture was filtered through a polypropylene filter having a pore size of 30 μm to thereby give a coating solution for light scattering layer.

<2-2-2>

(Preparation of Sol Solution a)

In a reactor provided with a stirrer and a reflux condenser, 120 parts of methyl ethyl ketone, 100 parts of acryloyloxypropyltrimethoxysilane (KBM-5103, manufactured by SHIN-ETSU CHEMICAL Co., Ltd.) and 3 parts of diisopropoxyalminum ethyl acetoacetate were mixed. After adding 30 parts of ion-exchanged water, the mixture was reacted at 60° C. for 4 hours and then cooled to room temperature to give a sol solution a. The weight-average molecular weight thereof was 1600 and components with molecular weight of from 1000 to 20000 amounted to 100% of oligomer components and higher. When analyzed by gas chromatography, no starting acryloyloxypropyltrimethoxysilane remained.

(Preparation of Coating Solution for Lower Refractive Index Layer)

13 g of a crosslinking fluoropolymer having a refractive index of 0.142 (JN-7228, solid content 6%, manufactured by JSR K.K.), 1.3 g of silica sol (Silica MEK-ST with different particle size, average particle size 45 nm, solid content 30%, manufactured by NISSAN CHEMICAL INDUSTRIES, Ltd.), 0.6 f of the sol solution, 5 g of methyl ethyl ketone and 0.6 g of cyclohexanone were mixed under stirring and then filtered through a polypropylene filter having a pore size of 1 µm to thereby prepare a coating solution for lower refractive index layer.

<2-2-3>

(Construction of Transparent Protective Film 01 Provided with Antireflective Layer)

A triacetyl cellulose film of 80 µm in thickness (TAC-TD80U, manufactured by FUJI PHOTOFILM Co., Ltd.) was unwound in a rolled state. Then the coating solution for functional layer (light scattering layer) as described above was applied by using a microgravure roll (diameter: 50 mm) having a gravure pattern of a line density of 180 lines/in. and a depth of 40 µm and a doctor blade at a gravure roll rotation speed of 30 rpm and a conveying speed of 30 m/min. After drying at 60° C. for 150 seconds, the coating layer was hardened by irradiating under nitrogen-purge with ultraviolet light at 250 mJ/cm$^2$ by using an air-cool metal halide lamp (manufactured by EYEGRAPHICS Co., Ltd.) at an illuminance of 400 mW/cm$^2$. Thus a functional layer of 6 µm in thickness was formed followed by winding.

The triacetyl cellulose film having the functional layer (light scattering layer) formed thereon was unwound again. In the light scattering layer side thereof, the coating solution for lower refractive index layer prepared above was applied by using a microgravure roll (diameter: 50 mm) having a gravure pattern of a line density of 180 lines/in. and a depth of 40 µm and a doctor blade at a gravure roll rotation speed of 30 rpm and a conveying speed of 15 m/min. After drying at 120° C. for 150 seconds and then at 140° C. for 8 minutes, the coating layer was hardened by irradiating under nitrogen-purge with ultraviolet light at 900 mJ/cm$^2$ by using an air-cool metal halide lamp (manufactured by EYEGRAPHICS Co., Ltd.) at an illuminance of 400 mW/cm$^2$. Thus a lower refractive index layer of 100 nm in thickness was formed followed by winding (corresponding to the functional layer/TAC2 in FIG. 2).

<2-3-1>

(Construction of Polarizing Plate 02)

Iodine was adsorbed by a stretched polyvinyl alcohol film to form a polarizer.

The transparent protective film 01 having the antireflective layer (corresponding to the functional layer/TAC2 in FIG. 2) constructed above was saponified as in (Construction of polarizing plate 01) and then bonded, in the side having no functional layer, to one side of a polarizer with the use of a polyvinyl alcohol-based adhesive.

Cellulose acylate films prepared in EXAMPLE 1 (1-1 to 1-41 and 1-1c to 1-3c: corresponding to TAC1 in FIG. 1) were similarly saponified and each bonded to the other side of the polarizer with the use of a polyvinyl alcohol-based adhesive, thereby giving a polarizing plate having the constitution of FIG. 2.

The slow axis of the cellulose acylate film prepared in EXAMPLE 1 was in parallel to the polarizing axis of the polarizer (FIG. 1). On the other hand, the slow axis of the marketed cellulose triacetate film was perpendicular to the transmission axis of the polarizer. Thus, polarizing plates 02 (B1-1 to B1-41 and B1-1c to B1-3c: polarizing plates integrated with functional layers and the optical compensation sheet in FIG. 2) were constructed.

Using a spectrophotometer (manufactured by JASCO ENGINEERING), spectral reflectivity at an incidence angle of 5° was measured from the functional layer side in a wavelength region or from 380 to 780 nm. The integrating sphere-average reflectivity at 450 to 650 nm thus determined was 2.3%.

Using a spectrophotometer (UV3100PC), the single plate transmittance TT, the parallel transmittance PT and the cross transmittance CT of the polarizing plate having the cellulose acylate film according to the invention inside of the polarizer were measured at 25° C. and 60% RH within a wavelength range of from 380 nm to 780 nm. Then the mean of 400 nm to 700 nm and the polarization degree P were determined. As a result, TT was from 40.8 to 44.7, PT was from 34 to 38.8, CT was 1.0 or less and P was from 99.98 to 99.99. The cross transmittances at 380 nm, 410 nm and 700 nm (T(380), T(410) and T(700)) were respectively 1.0 or less, 0.5 or less and 0.3 or less.

In a polarizing plate durability test performed at 60° C. and 95% RH for 500 hours, these factors fulfilled the requirements $-0.1 \leq \Delta CT \leq 0.2$ and $-2.0 \leq \Delta P \leq 0$. At 60° C. and 90% RH, these factors fulfilled the requirements $-0.05 \leq \Delta CT \leq 0.15$ and $-1.5 \leq \Delta P \leq 0$.

<2-4-1>

(Preparation of Coating Solution for Hard Coat Layer)

To 750.0 parts by weight of trimethylolpropane triacrylate (TMPTA, manufactured by NIPPON KAYAKU Co., Ltd.) were added 270.0 parts by weight of poly(glycidyl methacrylate) having a weight-average molecular weight of 3000, 730.0 g of methyl ethyl ketone, 500.0 g of cyclohexanone and 50.0 g of a polymerization initiator (Irgacure 184, manufactured by Ciba-Geigy) was added and the resultant mixture as mixed by stirring. Then it was filtered through a polypropylene filter having a pore size of 0.4 µm to give a coating solution for hard coat layer.

<2-4-2>

(Preparation of Dispersion of Fine Titanium Dioxide Particles)

As fine titanium dioxide particles, use was made of fine titanium dioxide particles containing cobalt and having been surface-treated with the use of aluminum hydroxide and zirconium hydroxide (MPT-129, manufactured by ISHIHARA SANGYO KAISHA, Ltd.).

257.1 g of these particles were mixed with 38.6 g of the following dispersant and 704.3 g of cyclohexanone and dispersed with Dynomil to thereby give a titanium dioxide dispersion having a weight-average diameter of 70 nm.

Dispersant

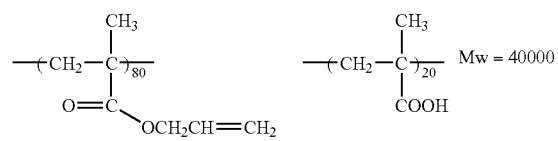

<2-4-3>

(Preparation of Coating Solution for Medium Refractive Index Layer)

To 88.9 g of the titanium dioxide dispersion as described above were added 58.4 g of a mixture of dipentaerythritol pentaacrylate with dipentaerythritol hexaacrylate (DHPA), 3.1 g of a photopolymerization initiator (Irgacure), 1.1 g of a photosensitizer (Kayacure DETX, manufactured by NIPPON KAYAKU Co., Ltd.), 482.4 g of methyl ethyl ketone and 1869.8 g of cyclohexanone and the resultant mixture was mixed by stirring. After sufficiently stirring, it was filtered through a polypropylene filter having a pore size of 0.4 μm to thereby give a coating solution for medium refractive index layer.

<2-4-2>

(Preparation of Coating Solution for Higher Refractive Index Layer)

To 586.8 g of the titanium dioxide dispersion as described above were added 47.9 g of a mixture of dipentaerythritol pentaacrylate with dipentaerythritol hexaacrylate (DHPA), 4.0 g of a photopolymerization initiator (Irgacure), 1.3 g of a photosensitizer (Kayacure DETX, manufactured by NIPPON KAYAKU Co., Ltd.), 455.8 g of methyl ethyl ketone and 1427.8 g of cyclohexanone and the resultant mixture was mixed by stirring. Next, it was filtered through a polypropylene filter having a pore size of 0.4 μm to thereby give a coating solution for higher refractive index layer.

<2-4-5>

(Preparation of Coating Solution for Lower Refractive Index Layer)

The following copolymer (P-1) was dissolved in methyl isobutyl ketone to give a concentration of 7% by weight. Then, 3% (based on the solid content) a terminal methacrylate group-containing silicone resin X-22-164C (manufactured by SHIN-ETSU CHEMICAL Co., Ltd.) and 5% by weight (based on the solid content) of a photo radical generator Irgacure 907 (trade name) were added to thereby give a coating solution for lower refractive index layer.

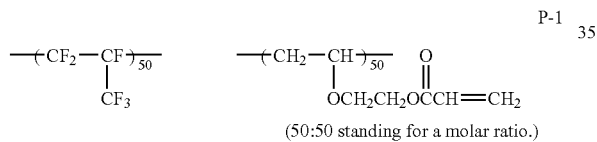

(50:50 standing for a molar ratio.)

<2-4-6>

(Construction of Transparent Protective Film 02 Having Antireflective Layer)

On a triacetyl cellulose film having a film thickness of 80 μm (TD-80UF, manufactured by FUJI PHOTOFILM Co., Ltd.), the coating solution for hard coat layer was applied with the use of a gravure coater. After drying at 100° C., the coating layer was hardened by irradiating under nitrogen-purge to regulate the atmospheric oxygen concentration to 1.0% by volume or less with ultraviolet light at 300 mJ/cm$^2$ by using an air-cool metal halide lamp (manufactured by EYE-GRAPHICS Co., Ltd.) of 160 W/cm at an illuminance of 400 mW/cm$^2$. Thus a hard coat layer of 8 μm in thickness was formed.

On this hard coat layer, the coating solution for medium refractive index layer, the coating solution for higher refractive index layer and the coating solution for lower refractive index layer was continuously applied with the use of a gravure coater having three coating stations therefor.

The medium refractive index layer was dried at 100° C. for 2 minutes. Then it was hardened by irradiating under nitrogen-purge to regulate the atmospheric oxygen concentration to 1.0% by volume or less with ultraviolet light at 400 mJ/cm$^2$ by using an air-cool metal halide lamp (manufactured by EYEGRAPHICS Co., Ltd.) of 180 W/cm$^2$ at an illuminance of 400 mW/cm$^2$. After hardening, the medium refractive index layer had a refractive index of 1.639 and a film thickness of 67 nm.

The higher refractive index layer and the lower refractive index layer are each dried at 90° C. for 1 minute and then at 100° C. for 1 minute. Then it was hardened by irradiating under nitrogen-purge to regulate the atmospheric oxygen concentration to 1.0% by volume or less with ultraviolet light at 600 mJ/cm$^2$ by using an air-cool metal halide lamp (manufactured by EYEGRAPHICS Co., Ltd.) of 240 W/cm$^2$ at an illuminance of 600 mW/cm$^2$. After hardening, the higher refractive index layer had a refractive index of 1.905 and a film thickness of 107 nm while the lower refractive index layer had a refractive index of 1.440 and a film thickness of 85 nm. Thus, a transparent protective film 02 having an antireflective layer was constructed (corresponding to the functional layer/TAC2 in FIG. 2).

<2-5-1>

(Construction of Polarizing Plate 03)

Polarizing plates 03 (C1-1 to C1-41 and C1-1c to C1-3c; polarizing plates integrated with functional layers and the optical compensation sheet (polarizing plate shown in FIG. 2)) were constructed as in <2-3-1> but substituting the transparent protective film 01 having an antireflective layer by the transparent protective film 02 having an antireflective layer.

Using a spectrophotometer (manufactured by JASCO ENGINEERING), spectral reflectivity at an incidence angle of 5° was measured from the functional layer side in a wavelength region or from 380 to 780 nm. The integrating sphere-average reflectivity at 450 to 650 nm thus determined was 0.4%.

Example 3

(Mounting on TN Panel)

<3-0>

A pair of polarizing plates provided in a liquid crystal display (6E-A3, manufactured by SHARP CORPORATION) using a TN mode liquid crystal cell were stripped off. As substitutes therefor, the polarizing plates A1-16 and A1-2c constructed in EXAMPLE 2 were bonded in such a manner that the films prepared in EXAMPLE 2 were located in the liquid crystal cell side (the slow axes of A1-16 and A1-2c agreeing with the absorption axis of the polarizer). After allowing to stand under environmental temperature-humidity conditions (25° C. and 10% RH, 25° C. and 80% RH) each for 1 month, A1-2c showed remarkable lowering in panel contrast in each of the cases, compared with A1-16. A1-16 was superior in viewing angle characteristics to A1-2c. These results indicate that, with the passage of time, both of the polarizing plates suffered from changes in the optical characteristics and A1-16, which suffered from smaller changes than A1-2c, showed less lowering in panel contrast.

Example 3-1

(Mounting to VA Panel) (Two Sheet Type)

A liquid crystal display of FIG. 3 was constructed. Namely, an upper polarizing plate (TAC2 (functional layer yes/no), polarizer, TAC1), a liquid crystal cell of VA mode (upper substrate, liquid crystal layer, lower substrate) and a lower polarizing plate (TAC1, polarizer, TAC2) were laminated from the observation direction (top) and a backlight source was further provided.

<Construction of Liquid Crystal Cell>

In the liquid crystal cell, the gap between the substrates was set to 3.6 μm. A liquid crystal material having a negative dielectric anisotropy (MLC6608 manufactured by MERCK Co.) was dropped and sealed between the substrates to form a liquid crystal layer, thereby giving the liquid crystal cell. The retardation of the liquid crystal layer (i.e., the product of the liquid crystal layer thickness d (μm) and the refractive index anisotropy Δn: Δn·d) was adjusted to 300 nm. The liquid crystal material was vertically aligned.

To the upper and lower polarizing plates in the liquid crystal display (FIG. 3) using the vertically aligned liquid crystal cell as described above, the polarizing plates (A1-18 and A1-19) constructed in EXAMPLE 2 <2-1-1> by using the cellulose acylate films (1-18 and 1-19) prepared in EXAMPLE 1, which are performed as optical compensation sheets, were bonded with the use of a pressure-sensitive adhesive, i.e., one in the observer side and one in the backlight side, in such a manner that the cellulose acylate film (TAC1) prepared in EXAMPLE 1 was located in the liquid crystal cell side. The polarizing plates were in the cross Nicols arrangement with the transmission axis of the polarizing plate in the observer side being vertical and the transmission axis of the polarizing plate in the backlight side being horizontal.

When the liquid crystal display thus constructed was observed, neutral black images could be displayed both in the front direction and the viewing angle direction. Using a contrast meter (EZ-Contrast 160D, manufactured by ELDIM), viewing angle (giving a contrast ratio of 10 or more without reversing image in the black side) was measured in eight grades ranging from black image (L1) to white image (L8).

As the following Table 5 shows, the liquid crystal display according to the invention provided with the polarizing plates according to the invention achieved a wide viewing angle.

Example 3-2

To the lower polarizing plate in the liquid crystal display (FIG. 3) using the vertically aligned liquid crystal cell as described above, the polarizing plates (A1-18 and A1-19) constructed in EXAMPLE 2 <2-1-1> by using the cellulose acylate films (1-18 and 1-19) prepared in EXAMPLE 1, which are performed as optical compensation sheets, were bonded and, to the upper polarizing plate thereof, the polarizing plates (B1-18 and B1-19) constructed in EXAMPLE 2 <2-3-1> were bonded each with the use of a pressure-sensitive adhesive, i.e., one in the observer side and one in the backlight side, in such a manner that the cellulose acylate film (TAC1) prepared in EXAMPLE 1 was located in the liquid crystal cell side. The polarizing plates were in the cross Nicols arrangement with the transmission axis of the polarizing plate in the observer side being vertical and the transmission axis of the polarizing plate in the backlight side being horizontal.

When the liquid crystal display thus constructed was observed, neutral black images could be displayed both in the front direction and the viewing angle direction. Using a contrast meter (EZ-Contrast 160D, manufactured by ELDIM), viewing angle (giving a contrast ratio of 10 or more without reversing image in the black side) was measured in eight grades ranging from black image (L1) to white image (L8).

As the following Table 5 shows, the liquid crystal display according to the invention provided with the polarizing plates according to the invention achieved a wide viewing angle.

Example 3-3

To the lower polarizing plate in the liquid crystal display (FIG. 3) using the vertically aligned liquid crystal cell as described above, the polarizing plates (A1-18 and A1-19) constructed in EXAMPLE 2 <2-1-1> by using the optical cellulose acylate films (1-18 and 1-19) prepared in EXAMPLE 1, which are performed as optical compensation sheets, were bonded and, to the upper polarizing plate thereof, the polarizing plates (C1-18 and C1-19) constructed in EXAMPLE 2 <2-5-1> were bonded each with the use of a pressure-sensitive adhesive, i.e., one in the observer side and one in the backlight side, in such a manner that the cellulose acylate film (TAC1) prepared in EXAMPLE 1 was located in the liquid crystal cell side. The polarizing plates were in the cross Nicols arrangement with the transmission axis of the polarizing plate in the observer side being vertical and the transmission axis of the polarizing plate in the backlight side being horizontal.

When the liquid crystal display thus constructed was observed, neutral black images could be displayed both in the front direction and the viewing angle direction. Using a contrast meter (EZ-Contrast 160D, manufactured by ELDIM), viewing angle (giving a contrast ratio of 10 or more without reversing image in the black side) was measured in eight grades ranging from black image (L1) to white image (L8).

As the following Table 5 shows, the liquid crystal display according to the invention provided with the polarizing plates according to the invention achieved a wide viewing angle.

Comparative Example 3-1

To the upper and lower polarizing plates in the liquid crystal display (FIG. 3) using the vertically aligned liquid crystal cell as described above, the polarizing plates (A1-1c to A1-3c) constructed in EXAMPLE 2 <2-1-1> by using the cellulose acylate films (1-1c to 1-3c) prepared in COMPARATIVE EXAMPLE, which are performed as optical compensation sheets, were bonded with the use of a pressure-sensitive adhesive, i.e., one in the observer side and one in the backlight side, in such a manner that the cellulose acylate film (TAC1) prepared in EXAMPLE 1 was located in the liquid crystal cell side. The polarizing plates were in the cross Nicols arrangement with the transmission axis of the polarizing plate in the observer side being vertical and the transmission axis of the polarizing plate in the backlight side being horizontal.

When the liquid crystal display thus constructed was observed, neutral black images could be displayed both in the front direction and the viewing angle direction. Using a contrast meter (EZ-Contrast 160D, manufactured by ELDIM), viewing angle (giving a contrast ratio of 10 or more without reversing image in the black side) was measured in eight grades ranging from black image (L1) to white image (L8).

Table 5 shows the results. Thus, it can be understood that the viewing angle was narrower than the cases with the use of the polarizing plates according to the invention.

Comparative Example 3-2

To the lower polarizing plate in the liquid crystal display (FIG. 3) using the vertically aligned liquid crystal cell as described above, the polarizing plates (A1-1c to A1-3c) constructed in EXAMPLE 2 <2-1-1> by using the cellulose acylate films (1-1c to 1-3c) prepared in COMPARATIVE EXAMPLE, which are performed as optical compensation sheets, were bonded and, to the upper polarizing plate thereof, the polarizing plates (B1-1c to B1-3c) constructed in EXAMPLE 2 <2-3-1> were bonded each with the use of a pressure-sensitive adhesive, i.e., one in the observer side and one in the backlight side, in such a manner that the cellulose acylate film (TAC1) prepared in EXAMPLE 1 was located in the liquid crystal cell side. The polarizing plates were in the cross Nicols arrangement with the transmission axis of the polarizing plate in the observer side being vertical and the transmission axis of the polarizing plate in the backlight side being horizontal.

When the liquid crystal display thus constructed was observed, neutral black images could be displayed both in the front direction and the viewing angle direction. Using a contrast meter (EZ-Contrast 160D, manufactured by ELDIM), viewing angle (giving a contrast ratio of 10 or more without reversing image in the black side) was measured in eight grades ranging from black image (L1) to white image (L8).

Table 5 shows the results. Thus, it can be understood that the viewing angle was narrower than the cases with the use of the polarizing plates according to the invention.

Comparative Example 3-3

To the lower polarizing plate in the liquid crystal display (FIG. 3) using the vertically aligned liquid crystal cell as described above, the polarizing plates (A1-1c to A1-3c) constructed in EXAMPLE 2 <2-1-1> by using the cellulose acylate films (1-1c to 1-3c) prepared in EXAMPLE 1, which are performed as optical compensation sheets, were bonded and, to the upper polarizing plate thereof, the polarizing plates (C1-1c to C1-3c) constructed in EXAMPLE 2 <2-5-1> were bonded each with the use of a pressure-sensitive adhesive, i.e., one in the observer side and one in the backlight side, in such a manner that the cellulose acylate film (TAC1) prepared in EXAMPLE 1 was located in the liquid crystal cell side. The polarizing plates were in the cross Nicols arrangement with the transmission axis of the polarizing plate in the observer side being vertical and the transmission axis of the polarizing plate in the backlight side being horizontal.

When the liquid crystal display thus constructed was observed, neutral black images could be displayed both in the front direction and the viewing angle direction. Using a contrast meter (EZ-Contrast 160D, manufactured by ELDIM), viewing angle (giving a contrast ratio of 10 or more without reversing image in the black side) was measured in eight grades ranging from black image (L1) to white image (L8).

Table 5 shows the results. In each EXAMPLE and each COMPARATIVE EXAMPLE, the plurality of polarizing plates was exemplified (for example, A1-18 and A1-19 in EXAMPLE 3-1 were exemplified), but the same results shown in Table 5 were obtained when any of the exemplified polarizing plates was used for the liquid crystal display. Thus, it can be understood that the viewing angle was narrower than the cases with the use of the polarizing plates according to the invention.

TABLE 5

| Liquid crystal display | Viewing angle along a transmission axis direction of the upper polarizing plate | Viewing angle along a direction of 45° from transmission axis of the upper polarizing plate |
|---|---|---|
| EXAMPLE 3-1 | >80° | >80° |
| EXAMPLE 3-2 | >80° | >80° |
| EXAMPLE 3-2 | >80° | >80° |
| COMP. EXAMPLE 3-1 | 74° | 69° |
| COMP. EXAMPLE 3-2 | 76° | 71° |
| COMP. EXAMPLE 3-3 | 75° | 70° |

Example 3-4

(Mounting on VA Panel) (One Sheet Type)

A liquid crystal display of FIG. 3 was constructed. Namely, an upper polarizing plate (TAC2 (functional layer yes/no), polarizer, TAC1), a liquid crystal cell of VA mode (upper substrate, liquid crystal layer, lower substrate) and a lower polarizing plate (TAC1, polarizer, TAC2) were laminated from the observation direction (top) and a backlight source was further provided. In the following EXAMPLES, a polarizing plate integrated with an optical compensation sheet was employed as the lower polarizing plate with the use of a marketed polarizing plate (HLC2-5618, manufactured by SANRITZ).

<Construction of Liquid Crystal Cell>

In the liquid crystal cell, the gap between the substrates was set to 3.6 μm. A liquid crystal material having a negative dielectric anisotropy (MLC6608 manufactured by MERCK Co.) was dropped and sealed between the substrates to form a liquid crystal layer, thereby giving the liquid crystal cell. The retardation of the liquid crystal layer (i.e., the product of the liquid crystal layer thickness d (μm) and the refractive index anisotropy Δn: Δnd) was adjusted to 300 nm. The liquid crystal material was vertically aligned.

To the upper polarizing plate in the liquid crystal display (FIG. 3) using the vertically aligned liquid crystal cell as described above, a marketed super high contrast product (HLC2-5618) was bonded and, to the lower polarizing plate thereof, the polarizing plates (A1-20, A1-21, A1-22, A1-30, A1-32, A1-34, A1-36 and A1-40) constructed in EXAMPLE 2 <2-1-1> by using the cellulose acylate films (1-20, 1-21, 1-22, 1-30, 1-32, 1-34, 1-36 and 1-40) prepared in EXAMPLE 1, which are performed as optical compensation sheets, were bonded with the use of a pressure-sensitive adhesive, i.e., one in the observer side and one in the backlight side, in such a manner that the cellulose acylate film (TAC1) prepared in EXAMPLE 1 was located in the liquid crystal cell side. The polarizing plates were in the cross Nicols arrangement with the transmission axis of the polarizing plate in the observer side being vertical and the transmission axis of the polarizing plate in the backlight side being horizontal.

When the liquid crystal display thus constructed was observed, neutral black images could be displayed both in the front direction and the viewing angle direction. Using a contrast meter (EZ-Contrast 160D, manufactured by ELDIM), viewing angle (giving a contrast ratio of 10 or more without reversing image in the black side) was measured in eight grades ranging from black image (L1) to white image (L8).

As the following Table 6 shows, the liquid crystal display according to the invention provided with the polarizing plates according to the invention achieved a wide viewing angle.

Comparative Example 3-4

The procedure of EXAMPLE 3-4 was followed but using the polarizing plates (A1-1c to A1-3c) in the lower polarizing plate.

Table 6 shows the results. In each of EXAMPLE and COMPARATIVE EXAMPLE, the plurality of polarizing plates was exemplified, but the same results shown in Table 5 were obtained when any of the exemplified polarizing plates was used for the liquid crystal display. Thus, it can be understood that the viewing angle was narrower than the cases with the use of the polarizing plates according to the invention.

TABLE 6

| Liquid crystal display | Viewing angle along a transmission axis direction of the upper polarizing plate | Viewing angle along a direction of 45° from transmission axis of the upper polarizing plate |
|---|---|---|
| EXAMPLE 3-4 | >80° | >80° |
| COMP. EXAMPLE 3-4 | 74° | 71° |

The present application claims foreign priority based on Japanese Patent Application Nos. JP2003-434145, JP2004-175118 and JP2004-269819, filed Dec. 26, 2003, Jun. 14, 2003 and Sep. 16, 2004, respectively, the contents of which is incorporated herein by reference.

What is claimed is:

1. A cellulose acylate film, which comprises a cellulose acylate, wherein the cellulose acylate is a mixed fatty acid ester of a cellulose; a hydroxyl group of the cellulose is substituted by an acetyl group; and another hydroxyl group of the cellulose is substituted by an acyl group having 3 or more carbon atoms, wherein, the cellulose acylate satisfies formulae (I) and (II):

$$2.0 \leq A+B \leq 3.0 \quad (I)$$

$$1.60 \leq B \quad (II)$$

wherein A is a degree of substitution by the acetyl group; and B is a degree of substitution by the acyl group having 3 or more carbon atoms;
wherein the acyl group having 3 or more carbon atoms comprises a butanoyl group; and wherein Re(λ) and Rth(λ), which are defined by formulae (III) and (IV), satisfy formulae (V) and (VI):

$$Re(\lambda)=(nx-ny)\times d \quad (III)$$

$$Rth(\lambda)=\{(nx+ny)/2-nz\}\times d \quad (IV)$$

$$30 \text{ nm} \leq Re_{(633)} \leq 200 \text{ nm} \quad (V)$$

$$70 \text{ nm} \leq Rth_{(633)} \leq 400 \text{ nm} \quad (VI)$$

wherein Re(λ) is a retardation value in a film plane of the cellulose acylate film at a wavelength of λ nm, and the retardation value is expressed in nm;
Rth(λ) is a retardation value in a direction perpendicular to the film plane at the wavelength of λ nm, and the retardation value is expressed in nm;
nx is a refractive index along a slow axis in the film plane;
ny is a refractive index along a fast axis in the film plane;
nz is a refractive index along the direction perpendicular to the film plane; and
"d" is a film thickness of the cellulose acylate film.

2. The cellulose acylate film as claimed in claim 1, wherein a total degree of substitution of a hydroxyl group at 6-position of the cellulose is 0.75 or more.

3. The cellulose acylate film as claimed in claim 1, wherein $Rth_{(633)}$ satisfies formula (VII):

$$230 \text{ nm} \leq Rth_{(633)} \leq 300 \text{ nm}. \quad (VII)$$

4. The cellulose acylate film as claimed in claim 1, which comprises a retardation increasing agent comprising at least one of a rod-like compound and a discotic compound.

5. The cellulose acylate film as claimed in claim 1, which further comprises at least one of a plasticizer, an ultraviolet absorbing agent and a peeling accelerator.

6. The cellulose acylate film as claimed in claim 1, which has a film thickness of 40 to 180 μm.

7. The cellulose acylate film as claimed in claim 1, which has a glass transition temperature Tg of 70 to 150° C.

8. The cellulose acylate film as claimed in claim 1, which has an elastic modulus of 1500 to 4000 MPa.

9. The cellulose acylate film as claimed in claim 1, which has ΔRe of 0 to 10 nm and ΔRth of 0 to 30 nm,
wherein ΔRe represents a difference between a Re value of a wavelength of 633 nm at 25° C. and 10% RH and another Re value of the wavelength of 633 nm at 25° C. and 80% RH; and
ΔRth represents a difference between a Rth value of the wavelength of 633 nm at 25° C. and 10% RH and another Rth value of the wavelength of 633 nm at 25° C. and 80% RH.

10. The cellulose acylate film as claimed in claim 1, which has a $Re_{(633)}$ and $Rth_{(633)}$ value at 25° C. and 60% RH, the $Re_{(633)}$ and $Rth_{(633)}$ value satisfying formulae (A) to (C):

$$46 \leq Re_{(633)} \leq 150 \quad (A)$$

$$Rth_{(633)}=a-5.9Re_{(633)} \quad (B)$$

$$580 \leq a \leq 670 \quad (C)$$

wherein $Re_{(633)}$ is a retardation value in a film plane of the cellulose acylate film at a wavelength of 633 nm, and the retardation value is expressed in nm;
$Rth_{(633)}$ is a retardation value by nm in a direction perpendicular to the film plane at the wavelength of 633 nm, and the retardation value is expressed in nm; and
"a" is an adjustable parameter of optical characteristics, and the adjustable parameter is expressed in nm.

11. The cellulose acylate film as claimed in claim 1, which has an equilibrium moisture content of 3.2% or less at 25° C. and 80% RH.

12. The cellulose acylate film as claimed in claim 1, which has a water vapor permeability of 400 $g/m^2 \cdot 24$ hr to 1800 $g/m^2 \cdot 24$ hr in terms of a film thickness of 80 μm under a condition of 60° C. and 95% RH for 24 hours.

13. The cellulose acylate film as claimed in claim 1, which has a haze of 0.01 to 2%.

14. The cellulose acylate film as claimed in claim 1, which comprises a silicon dioxide particle having an average secondary particle size of 0.2 to 1.5 μm.

15. The cellulose acylate film as claimed in claim 1, which shows a weight change of 0 to 5% when allowed to stand at 80° C. and 90% RH for 48 hours.

16. The cellulose acylate film as claimed in claim 1, which shows a dimensional change of 0 to 5% when allowed to stand at 60° C. and 95% RH for 24 hours and when allowed to stand at 90° C. and 5% RH for 24 hours.

17. The cellulose acylate film as claimed in claim 1, which has a photoelastic coefficient of $50 \times 10^{-3}$ $cm^2/dyne$ or less.

18. A polarizing plate comprising:
a polarizer; and
two protective films for the polarizer, wherein at least one of the two protective films comprising a cellulose film as described in claim 1.

19. The polarizing plate as claimed in claim 18, which satisfies at least one of formulae (a) to (d):

$$40.0 \leq TT \leq 45.0 \quad (a)$$

$$30.0 \leq PT \leq 40.0 \quad (b)$$

$$CT \leq 2.0 \quad (c)$$

$$95.0 \leq P \quad (d)$$

wherein TT represents a single plate transmittance at 25° C. and 60% RH;

PT represents a parallel transmittance at 25° C. and 60% RH;

CT represents a cross transmittance at 25° C. and 60% RH; and

P represents a polarization degree at 25° C. and 60% RH.

20. The polarizing plate as claimed in claim 18, which satisfies at least one of formulae (e) to (g):

$$T(380) \leq 2.0 \quad (e)$$

$$T(410) \leq 1.0 \quad (f)$$

$$T(700) \leq 0.5 \quad (g)$$

wherein T(X) represents a cross transmittance at the wavelength of λ nm.

21. The polarizing plate as claimed in claim 18, which satisfies at least one of formulae (j) and (k):

$$-6.0 \leq \Delta CT \leq 6.0 \quad (j)$$

$$-10.0 \leq \Delta P \leq 0.0 \quad (k)$$

wherein ΔCT and ΔP represents a change in cross transmittance and polarization degree, respectively, in a test that the polarizing plate is allowed to stand at 60° C. and 95% RH for 500 hours; and the change means a value calculated by subtracting a measurement value before the test from a measurement value after the test.

22. The polarizing plate as claimed in claim 18, wherein one of the two protective films comprises at least one of a hard coat layer, an antiglare layer and an antireflective layer.

23. A liquid crystal display comprising a polarizing plate as described claim 18.

24. The liquid crystal display as claimed in claim 23, which comprises a liquid crystal cell of OCB or VA mode, the liquid crystal cell having the polarizing plate above and below the liquid crystal cell.

25. The liquid crystal display as claimed in claim 23, which comprises: a liquid crystal cell of VA mode; and a backlight, wherein the polarizing plate is between the liquid crystal cell and the backlight.

26. A liquid crystal display comprising a cellulose acylate film as described in claim 1.

* * * * *